(12) United States Patent
Wong

(10) Patent No.: US 11,205,279 B2
(45) Date of Patent: Dec. 21, 2021

(54) IMAGING DEVICES AND DECODING METHODS THEREOF

(71) Applicant: Sony Semiconductor Solutions Corporation, Kanagawa (JP)

(72) Inventor: Ping Wah Wong, San Jose, CA (US)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 16/868,432

(22) Filed: May 6, 2020

(65) Prior Publication Data

US 2021/0183086 A1     Jun. 17, 2021

Related U.S. Application Data

(60) Provisional application No. 62/948,094, filed on Dec. 13, 2019, provisional application No. 62/948,079, (Continued)

(51) Int. Cl.
| | |
|---|---|
| *H04N 5/00* | (2011.01) |
| *G06T 7/00* | (2017.01) |
| *G06T 7/521* | (2017.01) |
| *G06T 7/70* | (2017.01) |
| *G01S 17/08* | (2006.01) |
| *G01S 17/894* | (2020.01) |
| *H04N 5/351* | (2011.01) |

(Continued)

(52) U.S. Cl.
CPC .............. *G06T 7/521* (2017.01); *G01B 11/22* (2013.01); *G01S 7/486* (2013.01); *G01S 17/08* (2013.01); *G01S 17/894* (2020.01); *G06T 7/55* (2017.01); *G06T 7/70* (2017.01); *H04N 5/23229* (2013.01); *H04N 5/345* (2013.01); *H04N 5/351* (2013.01); *H04N 5/3577* (2013.01); *H04N 5/36965* (2018.08); *H04N 5/378* (2013.01); *G06T 2207/10028* (2013.01)

(58) Field of Classification Search
CPC . G06T 7/521; G06T 7/70; G06T 2207/10028; G01S 17/894; G01S 17/08; H04N 5/351
See application file for complete search history.

(56) References Cited

U.S. PATENT DOCUMENTS

| | | | |
|---|---|---|---|
| 2017/0091946 A1* | 3/2017 | Wang | G06T 7/593 |
| 2018/0137793 A1* | 5/2018 | Ushijima | G09G 3/025 |

(Continued)

FOREIGN PATENT DOCUMENTS

| | | |
|---|---|---|
| WO | WO 2016/034408 | 3/2016 |

OTHER PUBLICATIONS

U.S. Appl. No. 16/868,387, filed May 6, 2020, Xiao et al.
(Continued)

*Primary Examiner* — Zhihan Zhou
(74) *Attorney, Agent, or Firm* — Sheridan Ross P.C.

(57) ABSTRACT

An imaging device includes a pixel section having a plurality of pixels, and a signal processor configured to apply control signals to the pixel section according to a Gray code coding scheme to generate a first pixel signal, a second pixel signal, and a third pixel signal based on light reflected from an object. The signal processor is configured to calculate a distance to the object based on the first pixel signal, the second pixel signal, and the third pixel signal.

15 Claims, 36 Drawing Sheets

Related U.S. Application Data filed on Dec. 13, 2019, provisional application No. 62/948,088, filed on Dec. 13, 2019.

(51) Int. Cl.
  *G06T 7/55* (2017.01)
  *G01B 11/22* (2006.01)
  *G01S 7/486* (2020.01)
  *H04N 5/232* (2006.01)
  *H04N 5/357* (2011.01)
  *H04N 5/369* (2011.01)
  *H04N 5/345* (2011.01)
  *H04N 5/378* (2011.01)

(56) References Cited

U.S. PATENT DOCUMENTS

| | | |
|---|---|---|
| 2018/0309970 A1 | 10/2018 | Gupta et al. |
| 2018/0348369 A1* | 12/2018 | Ohki ............... G01S 7/4861 |
| 2019/0146073 A1* | 5/2019 | Gutierrez ............ G01S 17/10 356/5.01 |
| 2020/0133272 A1* | 4/2020 | Chong ............ G01C 21/3602 |

OTHER PUBLICATIONS

U.S. Appl. No. 16/868,407, filed May 6, 2020, Wong et al.
Gupta et al., "What Are Optimal Coding Functions for Time-of-Flight Imaging?," UW-Madison CS Technical Reports, No. TR1848, dated Jun. 26, 2017, 24 pages.

\* cited by examiner

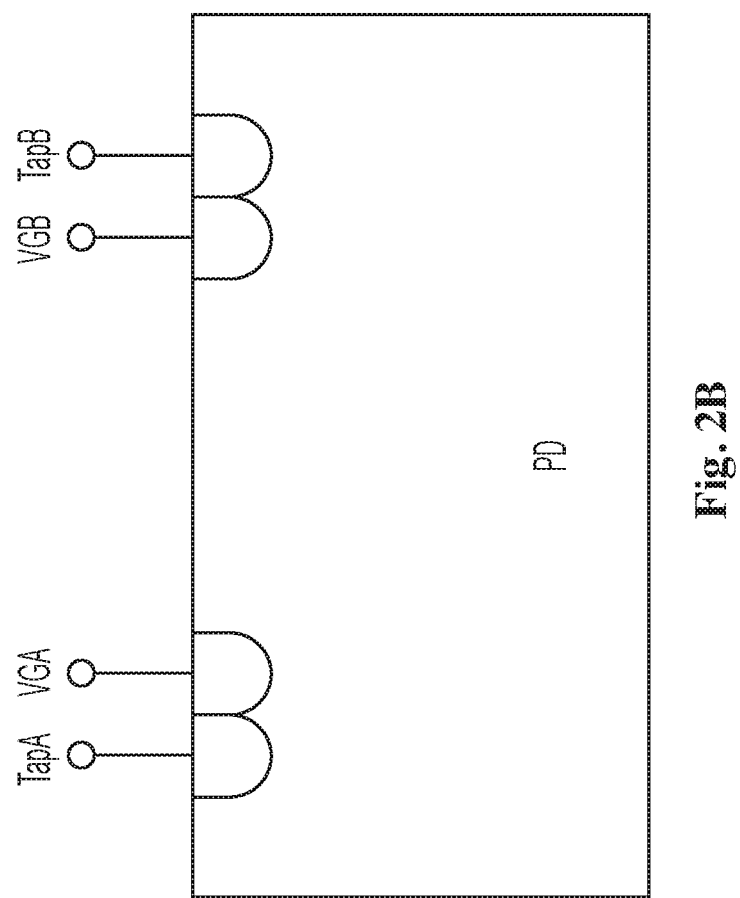

| Region | Decoding formula | Region | Decoding formula |
|---|---|---|---|
| A | $\dfrac{T}{12}\left(\dfrac{(d1+d3)/2}{(d1+d3)/2-d5}\right)$ | G | $\dfrac{T}{12}\left(\dfrac{(d2+d4)/2}{(d2+d4)/2-d5}+6\right)$ |
| B | $\dfrac{T}{12}\left(\dfrac{d5}{d5-(d2+d4)/2}+1\right)$ | H | $\dfrac{T}{12}\left(\dfrac{d5}{(d1+d3)/2+d5}+7\right)$ |
| C | $\dfrac{T}{12}\left(\dfrac{(d0-d4)/2}{(d0-d4)/2+d3}+2\right)$ | I | $\dfrac{T}{12}\left(\dfrac{(d0-d3)/2}{(d0-d3)/2+d4}+8\right)$ |
| D | $\dfrac{T}{12}\left(\dfrac{d3}{d3+(d5-d1)/2}+3\right)$ | J | $\dfrac{T}{12}\left(\dfrac{d4}{d4-(d2+d5)/2}+9\right)$ |
| E | $\dfrac{T}{12}\left(\dfrac{(d2+d5)/2}{(d2+d5)/2-d4}+4\right)$ | K | $\dfrac{T}{12}\left(\dfrac{(d1-d5)/2}{(d1-d5)/2-d3}+10\right)$ |
| F | $\dfrac{T}{12}\left(\dfrac{d1}{d1-(d0+d2)/2}+5\right)$ | L | $\dfrac{T}{12}\left(\dfrac{d2}{d2-(d0+d1)/2}+11\right)$ |

Fig. 9

| Tap A | | | Tap B | | |
|---|---|---|---|---|---|
| captured | | difference | captured | | difference |
| a0=p0+r0a+f0a | | d0=a0-a1 | b0=q0+r0b+f0b | | e0=b0-b1 |
| a1=p1+r1a+f1a | | d1=a1-a2 | b1=q1+r1b+f1b | | e1=b1-b2 |
| a2=p2+r2a+f2a | | d2=a2-a0 | b2=q2+r2b+f2b | | e2=b2-b0 |
| Invert decoding signal | | | | | |
| a0'=p0'+r0a+f0a | | d0'=a0'-a1' | b0'=q0'+r0b+f0b | | e0'=b0'-b1' |
| a1'=p1'+r1a+f1a | | d1'=a1'-a2' | b1'=q1'+r1b+f1b | | e1'=b1'-b2' |
| a2'=p2'+r2a+f2a | | d2'=a2'-a0' | b2'=q2'+r2b+f2b | | e2'=b2'-b0' |

Calculation using Tap A only
d0-d0'
= (p0+r0a+f0a) - (p1+r1a+f1a)
  -(p0'+r0a+f0a) + (p1'+r1a+f1a)
= (p0-p1) - (p0'-p1') +r0a - r1a - r0a' +r1a'
= 2(p0-p1) +r0a - r1a - r0a' +r1a'

FPN is cancelled. SNR is improved compared to using only tap A and not inverting the decoding signal.

Similarly fpn offsets in d1-d1' and d2-d2' are cancelled.

| FPN cancellation and SNR improvement | | |
|---|---|---|
| Tap A | Tap B | Taps A and B |
| d0 - d0' | e0 - e0' | (d0 - d0')-(e0 - e0') |
| d1 - d1' | e1 - e1' | (d1 - d1')-(e1 - e1') |
| d2 - d2' | e2 - e2' | (d2 - d2')-(e2 - e2') |

Calculation using Tap B only
e0-e0'
= (q0+r0b+f0b) - (q1+r1b+f1b)
  -(q0'+r0b+f0b) + (q1'+r1b+f1b)
= -2(p0-p1) +r0b - r1b - r0b' + r1b'

Similarly, fpn offsets in e1-e1' and e2-e2' are cancelled.

Calculation using both Taps A and B
(d0-d0') - (e0-e0')
= 4(p0-p1) +r0a-r1a-r0a' +r1a -r0b+r1b+r0b'-r1b'

FPN offsets are cancelled and SNR is improved.

Similarly, fpn offsets in (d1 - d1') - (e1 - e1') and
(d2 - d2') - (e2 - e2') are cancelled.

Fig. 13

| Tap A | | | Tap B | | |
|---|---|---|---|---|---|
| captured | difference | | captured | | difference |
| a0=p0+r0a+f0a | d0=a0-a1 | | b0=q0+r0b+f0b | | e0=b0-b1 |
| a1=p1+r1a+f1a | d1=a0-a2 | | b1=q1+r1b+f1b | | e1=b0-b2 |
| a2=p2+r2a+f2a | d2=a0-a3 | | b2=q2+r2b+f2b | | e2=b0-b3 |
| a3=p3+r3a+f3a | d3=a1-a2 | | b3=q3+r3b+f3b | | e3=b1-b2 |
| | d4=a1-a3 | | | | e4=b1-b3 |
| | d5=a2-a3 | | | | e5=b2-b3 |

Invert decoding signal

| captured | difference | | captured | difference |
|---|---|---|---|---|
| a0'=p0'+r0a'+f0a | d0'=a0'-a1' | | b0' =q0'+r0b'+f0b | e0' = b0'-b1' |
| a1'=p1'+r1a'+f1a | d1'=a0'-a2' | | b1' =q1'+r1b'+f1b | e1' = b0'-b2' |
| a2'=p2'+r2a'+f2a | d2'=a0'-a3' | | b2' =q2'+r2b'+f2b | e2' = b0'-b3' |
| a3'=p3'+r3a'+f3a | d3'=a1'-a2' | | b3' =q3'+r3b'+f3b | e3' = b1'-b2' |
| | d4'=a1'-a3' | | | e4' = b1'-b3' |
| | d5'=a2'-a3' | | | e5' = b2'-b3' |

| fpn cancellation and SNR improvement | | |
|---|---|---|
| Tap A | Tap B | Tap A and B |
| d0 - d0' | e0 - e0' | (d0 - d0') - (e0 - e0') |
| d1 - d1' | e1 - e1' | (d1 - d1') - (e1 - e1') |
| d2 - d2' | e2 - e2' | (d2 - d2') - (e2 - e2') |
| d3 - d3' | e3 - e3' | (d3 - d3') - (e3 - e3') |
| d4 - d4' | e4 - e4' | (d4 - d4') - (e4 - e4') |
| d5 - d5' | e5 - e5' | (d5 - d5') - (e5 - e5') |

Calculation using Tap A only
$d0-d0' = (p0+r0a+f0a) - (p1+r1a+f1a) - (p0'+r0a'+f0a) + (p1'+r1a'+f1a)$
$= (p0-p1) - (p0'-p1') + r0a - r1a - r0a' + r1a'$
$= 2(p0-p1) + r0a - r1a - r0a' + r1a'$
Fpn offsets are cancelled. SNR is improved compared to using only tap A and not inverting the decoding signal.
Similarly, fpn offsets in d1-d1', d2-d2', d3-d3', d4-d4' and d5-d5' are cancelled.

Calculation using Tap B only
$e0-e0' = (q0+r0b+f0b) - (q1+r1b+f1b) - (q0'+r0b'+f0b) + (q1'+r1b'+f1b)$
$= -2(p0-p1) + r0b - r1b - r0b' + r1b'$
Similarly, fpn offsets are cancelled, and SNR is improved.

Calculation using Taps A and B
$(d0-d0') - (e0-e0') = 4(p0-p1) + r0a - r1a - r0a' + r1a' - r0b - r1b + r0b' + r1b'$
Fpn offsets are cancelled, and SNR is improved.

Fig. 16

| # of pixels to capture 4 phases | # of taps | # of frames | FPN offset | SNR |
|---|---|---|---|---|
| 1 | 1 | 4 | cancelled | 1X |
| 1 | 2 | 4 | cancelled | 1.414X |
| 2 | 1 | 2 | remains | 1X |
| 2 | 2 | 2 | remains | 1.414X |
| 2 | 1 | 4 (with decode signal polarity reversal) | cancelled | 1.414X |
| 2 | 2 | 4 (with decode signal polarity reversal) | cancelled | 2X |
| 4 | 1 | 1 | remains | 1X |
| 4 | 2 | 1 | remains | 1.414X |
| 4 | 1 | 2 (with decode signal polarity reversal) | Cancelled | 1.414X |
| 4 | 2 | 2 (with decode signal polarity reversal) | Cancelled | 2X |

By difference signal calculation

By calculations

Fig. 17

| Region | Equation for Ambient | Region | Equation for Ambient |
|---|---|---|---|
| A' | (p1+q3)/2 | G' | (p2+q1)/2 |
| B' | (p0+p1)/2 | H' | (q0+q1)/2 |
| C' | (p0+q2)/2 | I' | (p3+q0)/2 |
| D' | (p0+p3)/2 | J' | (q0+q2)/2 |
| E' | (p0+q1)/2 | K' | (p1+q0)/2 |
| F' | (p2+q1)/2 | L' | (p1+q3)/2 |

Fig. 20

| region k' | ambient | region k' | ambient |
|---|---|---|---|
| 0' | $p1$ | 6' | $q1$ |
| 1' | $\dfrac{p0+p1}{2}$ | 7' | $\dfrac{q0+q1}{2}$ |
| 2' | $p0$ | 8' | $q0$ |
| 3' | $p0$ | 9' | $q0$ |
| 4' | $\dfrac{p0+q1}{2}$ | 10' | $\dfrac{p1+q0}{2}$ |
| 5' | $q1$ | 11' | $p1$ |

Fig. 26

| region k' | left half | right half |
|---|---|---|
| 1', 4', 7', 10' |  | $\frac{T}{12} * \left( \frac{3.5 * f_{(k'+1) \bmod 12} - 2.5 * f_{(k'-1) \bmod 12}}{f_{(k'+1) \bmod 12} + f_{(k'-1) \bmod 12}} + k' - 0.5 \right)$ |
| 0', 3', 6', 9' | $\frac{T}{12} * \left( \frac{1.5 * f_{(k'+1) \bmod 12} - f_{(k'-1) \bmod 12}}{f_{k'+1} + f_{k'-1}} + (k'-1) \bmod 12 + 0.5 \right)$ | $\frac{T}{12} * \left( \frac{2.5 * f_{(k'+1) \bmod 12} - 2.5 * f_{(k'-1) \bmod 12}}{f_{(k'+1) \bmod 12} + f_{(k'-1) \bmod 12}} + k' - 0.5 \right)$ |
| 2', 5', 8', 11' | $\frac{T}{12} * \left( \frac{3.5 * f_{(k'+1) \bmod 12} - 1.5 * f_{(k'-1) \bmod 12}}{f_{(k'+1) \bmod 12} + f_{(k'-1) \bmod 12}} + k' - 0.5 \right)$ | $\frac{T}{12} * \left( \frac{2 * f_{(k'+1) \bmod 12} - 0.5 * f_{(k'-1) \bmod 12}}{f_{(k'+1) \bmod 12} + f_{(k'-1) \bmod 12}} + k' - 0.5 \right)$ |

Fig. 28

IMAGING DEVICES AND DECODING METHODS THEREOF

CROSS REFERENCE TO RELATED APPLICATIONS

This application claims the benefit of U.S. Provisional Patent Application Ser. No. 62/948,094, filed Dec. 13, 2019, and claims the benefit of U.S. Provisional Patent Application Ser. No. 62/948,079 filed Dec. 13, 2019, and claims the benefit of U.S. Provisional Patent Application Ser. No. 62/948,088 filed Dec. 13, 2019, the disclosures of which are incorporated herein by reference in their entirety.

FIELD

Example embodiments are directed to imaging devices and decoding methods thereof.

BACKGROUND

Imaging devices are used in many applications, including depth sensing for object tracking, environment rendering, etc. Imaging devices used for depth sensing may employ time-of-flight (ToF) principles to detect a distance to an object or objects within a scene. In general, a ToF depth sensor includes a light source, an imaging device including a plurality of pixels for sensing reflected light, and optionally an optical bandpass or long-pass filter. In operation, the light source emits light (e.g., infrared light) toward an object or objects in the scene, and the pixels detect the light reflected from the object or objects. The elapsed time between the initial emission of the light and receipt of the reflected light by each pixel may correspond to a distance from the object or objects. Direct ToF imaging devices may measure the elapsed time itself to calculate the distance while indirect ToF imaging devices may measure the phase delay between the emitted light and the reflected light and translate the phase delay into a distance. The values of the pixels are then used by the imaging device to determine a distance to the object or objects, which may be used to create a three dimensional scene of the captured object or objects.

SUMMARY

According to at least one example embodiment, an imaging device includes a pixel section having a plurality of pixels, and a signal processor configured to apply control signals to the pixel section according to a Gray code coding scheme to generate a first pixel signal, a second pixel signal, and a third pixel signal based on light reflected from an object. The signal processor is configured to calculate a distance to the object based on the first pixel signal, the second pixel signal, and the third pixel signal.

The control signals include first, second, and third control signals.

The signal processor is configured to apply the first control signal to a first pixel of the plurality of pixels during a first time period to generate the first pixel signal, apply the second control signal to the first pixel during a second time period to generate the second pixel signal, and apply the third control signal to the first pixel during a third time period to generate the third pixel signal.

In at least one example embodiment, the control signals include a fourth control signal, and the signal processor is configured to apply the fourth control signal to the first pixel during a fourth time period.

The plurality of pixels includes first, second, and third pixels, and the signal processor is configured to apply the first control signal to the first pixel during a first time period to generate the first pixel signal, apply the second control signal to the second pixel during the first time period to generate the second pixel signal, and apply the third control signal to the third pixel during the first time period to generate the third pixel signal.

In at least one example embodiment, the control signals include a fourth control signal, and the plurality of pixels includes a fourth pixel. In this case, the signal processor is configured to apply the fourth control signal to the fourth pixel during the first time period to generate a fourth pixel signal.

According to at least one example embodiment, the signal processor is configured to calculate the distance to the object based on differences between the first, second, and third pixel signals. The differences include a difference between the first pixel signal and the second pixel signal, a difference between the second pixel signal and the third pixel signal, and a difference between the third pixel signal and the first pixel signal.

The signal processor is configured to determine a region in which the object is located based on signs of the differences.

The signal processor is configured to calculate the distance to the object using an equation that is associated with the determined region.

The signal processor is configured to apply the control signals to the pixel section generate the first pixel signal, the second pixel, and the third pixel signal, and a fourth pixel signal based on the light reflected from the object. The signal processor is configured to calculate the distance to the object based on the first pixel signal, the second pixel signal, the third pixel signal, and the fourth pixel signal.

In at least one example embodiment, the signal processor is configured to calculate the distance to the object based on differences between the first, second, third pixel, and fourth signals. The differences include a difference between the first pixel signal and the second pixel signal, a difference between the first pixel signal and the third pixel signal, a difference between the first pixel signal and the fourth pixel signal, a difference between the second pixel signal and the third pixel signal, a difference between the second pixel signal and the fourth pixel signal, and a difference between the third pixel signal and the fourth pixel signal.

The signal processor is configured to determine a region from among a plurality of regions in which the object is located based on the differences.

The signal processor is configured to calculate the distance to the object using an equation that is associated with the determined region.

According to at least one example embodiment, a number of the plurality of regions is equal to twelve.

At least one example embodiment is directed to an imaging device including a pixel section including a plurality of pixels, and a signal processor configured to apply binary control signals to the pixel section according to a coding scheme to generate pixel signals based on light reflected from an object. The signal processor is configured to calculate a distance to the object based on differences between the pixel signals.

In at least one example embodiment, the binary control signals include first, second, and third control signals, and the pixel signals include first, second, and third pixel signals.

In at least on example embodiment, the binary control signals include first, second, third, and fourth control signals, and the pixel signals include first, second, third, and fourth pixel signals.

At least one example embodiment is directed to a system that includes a light source configured to emit modulated light, and an imaging device including a pixel section including a plurality of pixels, and a signal processor. The signal processor is configured to apply binary control signals to the pixel section according to a Gray code coding scheme to generate pixel signals based on the modulated light reflected from an object, and calculate a distance to the object based on differences between the pixel signals.

BRIEF DESCRIPTION OF THE FIGURES

FIG. 2B illustrates an example cross-sectional view to illustrate voltage application areas and taps of a pixel according to at least one example embodiment;

FIG. 9 illustrates a table associating distance equations (or decoding formulas) with regions according to at least one example embodiment;

FIG. 13 illustrates tables describing noise cancellation according to at least one example embodiment;

FIG. 16 illustrates tables describing noise cancellation according to at least one example embodiment;

FIG. 17 illustrates a table showing noise cancellation and signal improvements according to at least one example embodiment;

FIG. 20 illustrates various parts of a method for calculating ambient as part of distance calculation to an object according to at least one example embodiment;

FIG. 26 illustrates parts of a method for calculating ambient as part of distance calculation to an object according to at least one example embodiment;

FIG. 28 illustrates parts of a method for calculating distance to an object according to at least one example embodiment;

DETAILED DESCRIPTION

Figure 1:
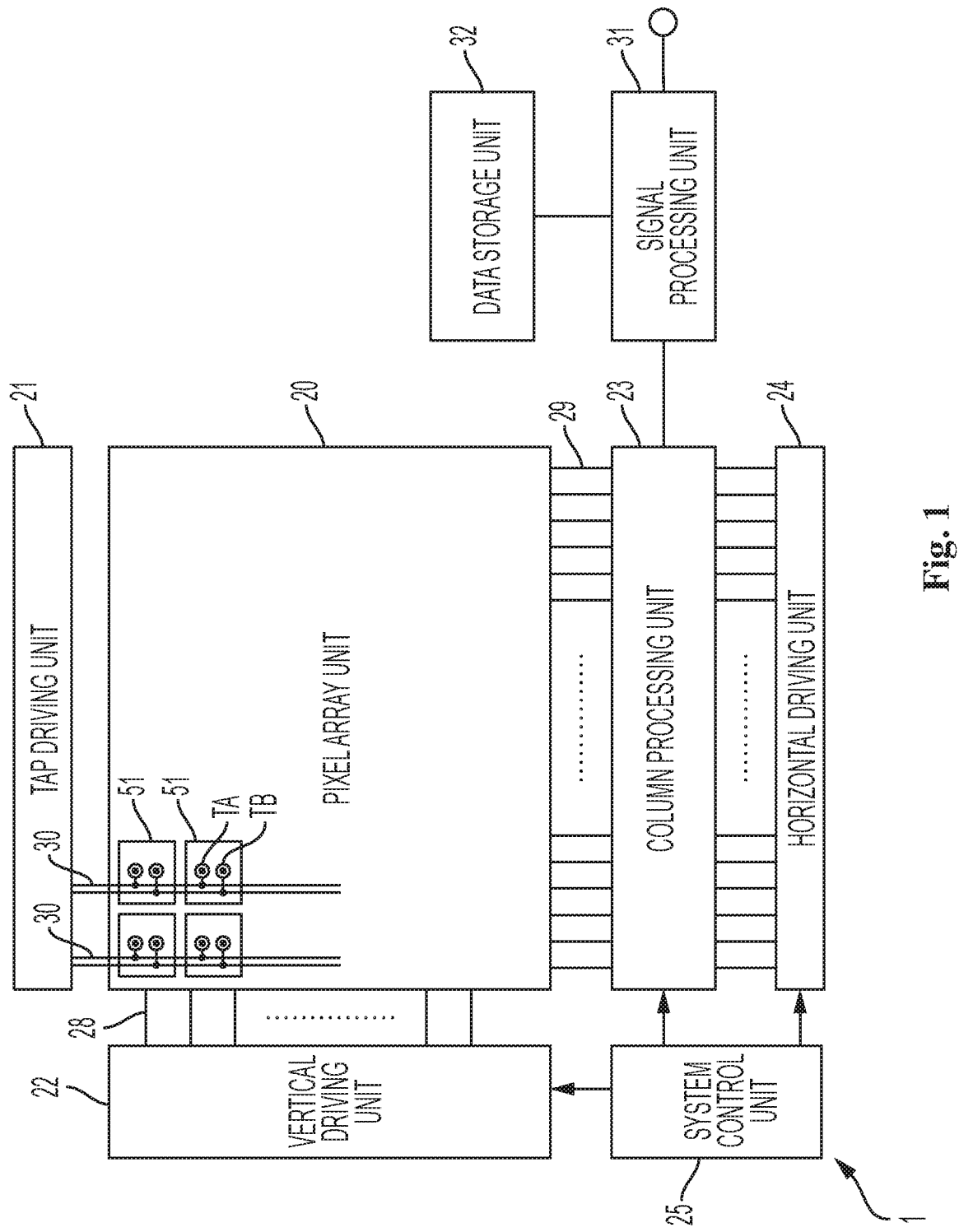
FIG. 1 is a block diagram of an imaging device according to at least one example embodiment.

FIG. 1 is a block diagram of an imaging device according to at least one example embodiment.

The imaging device 1 shown in FIG. 1 may be an imaging sensor of a front or rear surface irradiation type, and is provided, for example, in an imaging apparatus having a ranging function (or distance measuring function).

The imaging device 1 has a pixel array unit (or pixel array or pixel section) 20 formed on a semiconductor substrate (not shown) and a peripheral circuit integrated on the same semiconductor substrate the same as the pixel array unit 20. The peripheral circuit includes, for example, a tap driving unit (or tap driver) 21, a vertical driving unit (or vertical driver) 22, a column processing unit (or column processing circuit) 23, a horizontal driving unit (or horizontal driver) 24, and a system control unit (or system controller) 25.

The imaging device element 1 is further provided with a signal processing unit (or signal processor) 31 and a data storage unit (or data storage or memory or computer readable storage medium) 32. Note that the signal processing unit 31 and the data storage unit 32 may be mounted on the same substrate as the imaging device 1 or may be disposed on a substrate separate from the imaging device 1 in the imaging apparatus.

The pixel array unit 20 has a configuration in which pixels 51 that generate charge corresponding to a received light amount and output a signal corresponding to the charge are two-dimensionally disposed in a matrix shape of a row direction and a column direction. That is, the pixel array unit 20 has a plurality of pixels 51 that perform photoelectric conversion on incident light and output a signal corresponding to charge obtained as a result. Here, the row direction refers to an arrangement direction of the pixels 51 in a horizontal direction, and the column direction refers to the arrangement direction of the pixels 51 in a vertical direction. The row direction is a horizontal direction in the figure, and the column direction is a vertical direction in the figure.

The pixel 51 receives light incident from the external environment, for example, infrared light, performs photoelectric conversion on the received light, and outputs a pixel signal according to charge obtained as a result. The pixel 51 has a first charge collector that detects charge obtained by the photoelectric conversion PD by applying a predetermined voltage (first voltage) to a node VGA, and optionally a second charge collector that detects charge obtained by the photoelectric conversion by applying a predetermined voltage (second voltage) to node VGB. The first and second charge collector may include tap A and tap B, respectively. Depending on a circuit design of the pixel 51, both charge collectors may be controlled by the same voltage or different voltages. For example, the first voltage and the second voltage may be complementary (have opposite polarity) to each other where they are both driven by a single external waveform that provides the two voltages of opposite polarity to the pixel through an inverter connected to one of VGA or VGB. FIG. 2B, discussed in more detail below, illustrates additional details a pixel 51 with voltage application areas VGA and VGB to assist with channeling charge generated by the photoelectric conversion region PD toward tap A or tap B. Although two charge collectors are shown (i.e., tap A and node VGA, and tap B and node VGB) in FIG. 2B, more or fewer charge collectors may be included according to design preferences.

The tap driving unit 21 supplies the predetermined first voltage to the first charge collector of each of the pixels 51 of the pixel array unit 20 through a predetermined voltage supply line 30, and supplies the predetermined second voltage to the second charge collector thereof through the predetermined voltage supply line 30. Therefore, two voltage supply lines 30 including the voltage supply line 30 that transmits the first voltage and the voltage supply line 30 that transmits the second voltage are wired to one pixel column of the pixel array unit 20.

In the pixel array unit 20, with respect to the pixel array of the matrix shape, a pixel drive line 28 is wired along a row direction for each pixel row, and two vertical signal lines 29 are wired along a column direction for each pixel column. For example, the pixel drive line 28 transmits a drive signal for driving when reading a signal from the pixel. Note that, although FIG. 1 shows one wire for the pixel drive line 28, the pixel drive line 28 is not limited to one. One end of the pixel drive line 28 is connected to an output end corresponding to each row of the vertical driving unit 22.

The vertical driving unit 22 includes a shift register, an address decoder, or the like. The vertical driving unit 22 drives each pixel of all pixels of the pixel array unit 20 at the same time, or in row units, or the like. That is, the vertical driving unit 22 includes a driving unit that controls operation of each pixel of the pixel array unit 20, together with the system control unit 25 that controls the vertical driving unit 22.

The signals output from each pixel 51 of a pixel row in response to drive control by the vertical driving unit 22 are input to the column processing unit 23 through the vertical signal line 29. The column processing unit 23 performs a predetermined signal process on the pixel signal output from each pixel 51 through the vertical signal line 29 and temporarily holds the pixel signal after the signal process.

Specifically, the column processing unit 23 performs a noise removal process, a sample and hold (S/H) process, an analog to digital (AD) conversion process, and the like as the signal process.

The horizontal driving unit 24 includes a shift register, an address decoder, or the like, and sequentially selects unit circuits corresponding to pixel columns of the column processing unit 23. The column processing unit 23 sequentially outputs the pixel signals obtained through the signal process for each unit circuit, by a selective scan by the horizontal driving unit 24.

The system control unit 25 includes a timing generator or the like that generates various timing signals and performs drive control on the tap driving unit 21, the vertical driving unit 22, the column processing unit 23, the horizontal driving unit 24, and the like, on the basis of the various generated timing signals.

The signal processing unit 31 has at least a calculation process function and performs various signal processes such as a calculation process on the basis of the pixel signal output from the column processing unit 23. The data storage unit 32 temporarily stores data necessary for the signal processing in the signal processing unit 31. The signal processing unit 31 may control overall functions of the imaging device 1. For example, the tap driving unit 21, the vertical driving unit 22, the column processing unit 23, the horizontal driving unit 24, and the system control unit 25, and the data storage unit 32 may be under control of the signal processing unit 31. The signal processing unit or signal processor 31, alone or in conjunction with the other elements of FIG. 1, may control all operations of the systems discussed in more detail below with reference to the accompanying figures. Thus, the terms "signal processing unit" and "signal processor" may also refer to a collection of elements 21, 22, 23, 24, 25, and/or 31.

Figure 2A:
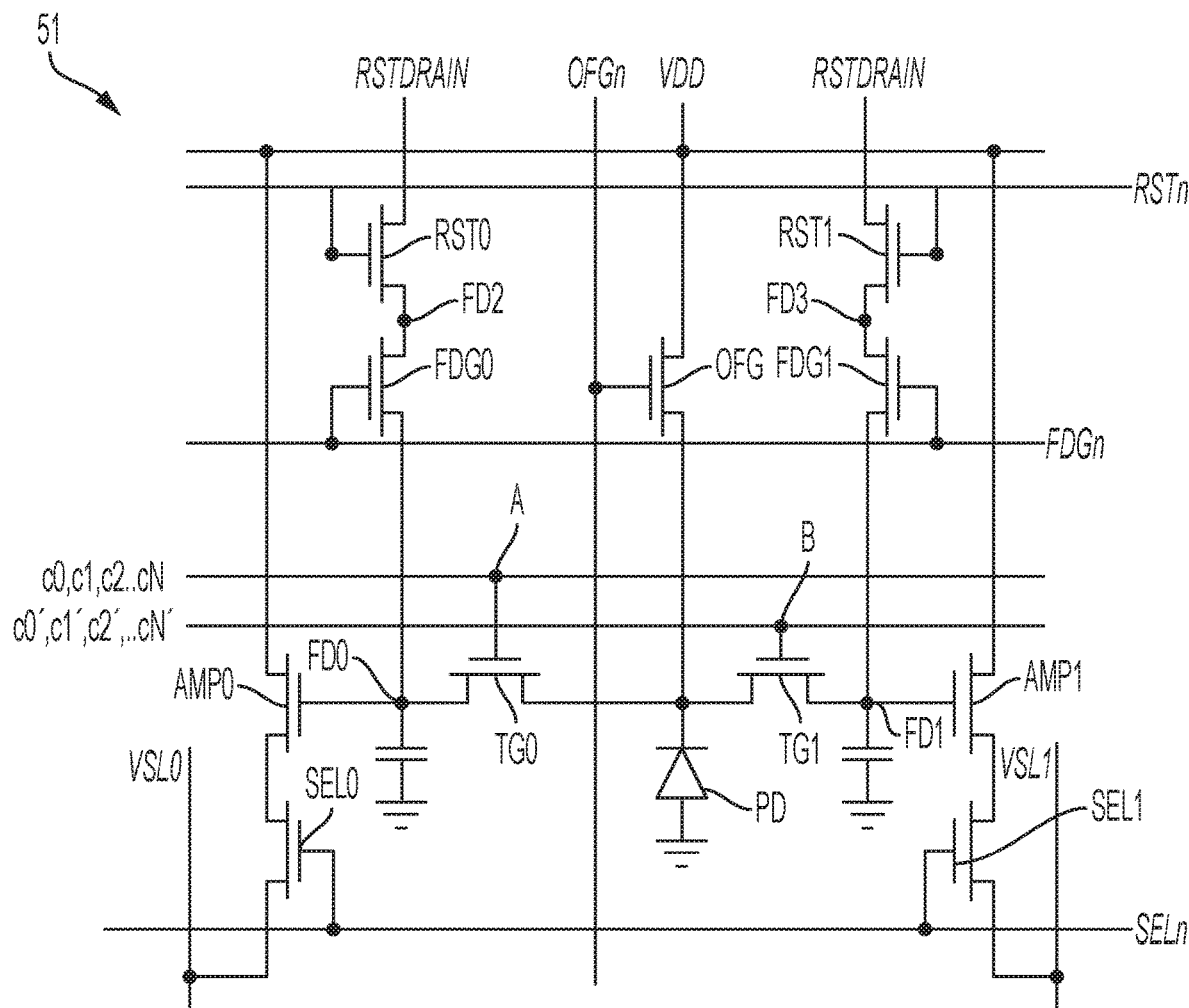
FIG. 2A illustrates an example schematic of a pixel according to at least one example embodiment.

FIG. 2A illustrates an example schematic of a pixel 51 from FIG. 1. The pixel 51 includes a photoelectric conversion region PD, such as a photodiode or other light sensor, transfer transistors TG0 and TG1, floating diffusion regions FD0 and FD1, reset transistors RST0 and RST1, amplification transistors AMP0 and AMP1, and selection transistors SEL0 and SEL1. The pixel 51 may further include an overflow transistor OFG, transfer transistors FDG0 and FDG1, and floating diffusion regions FD2 and FD3.

The pixel 51 may be driven according to control signals (or exposure control signals) c0, c1, c2, c3 . . . cN, c0', c1', c2', c3', cN' applied nodes VGA/VGB coupled to gates or taps A/B of transfer transistors TG0/TG1, reset signal RSTDRAIN, overflow signal OFGn, power supply signal VDD, selection signal SELn, and vertical selection signals VSL0 and VSL1. These signals are provided by various elements from FIG. 1, for example, the tap driver 21, vertical driver 22, system controller 25, etc.

As shown in FIG. 2A, the transfer transistors TG0 and TG1 are coupled to the photoelectric conversion region PD and have taps A/B that receive charge as a result of applying control signals c0, c1, c2, c3 . . . cN.

These control signals c0, c1, c2, c3 . . . cN may have different phases relative to a phase of a modulated signal from a light source (e.g., phases that differ 0 degrees, 90 degrees, 180 degrees, and/or 270 degrees). The control signals c0, c1, c2, c3 . . . cN may be applied in a manner that allows for depth information (or pixel values) to be captured in a desired number of frames (e.g., one frame, two frames, four frames, etc.). Details regarding the application of the control signals c0, c1, c2, c3 . . . cN to tap A and/or tap B are described in more detail below with reference to the figures.

It should be appreciated that the transfer transistors FDG0/FDG1 and floating diffusions FD2/FD3 are included to expand the charge capacity of the pixel 51, if desired. However, these elements may be omitted or not used, if desired. The overflow transistor OFG is included to transfer overflow charge from the photoelectric conversion region PD, but may be omitted or unused if desired. Further still, if only one tap is desired, then elements associated with the other tap may be unused or omitted (e.g., TG1, FD1, FDG1, RST1, SEL1, AMP1).

FIG. 2B illustrates an example cross-sectional view to illustrate voltage application areas of a pixel according to at least one example embodiment. As discussed above with respect to FIG. 1, FIG. 2B shows taps A and B, and voltage application areas that are connected to nodes VGA and VGB where control signals received at nodes VGA and VGB usually are in opposite polarity, i.e., one is high and the other is low. In an example embodiment, both nodes VGA and VGB can be controlled by a single external control signal through a connection of the control signal to VGA and a connection of the control signal to an inverter connected to VGB to provide two voltages of opposite polarity. FIGS. 11B to 11D illustrate examples for applying control signals $c_i(t)$ and $c_i'(t)$ to nodes VGA and VGB so that charge is collected through tap A and tap B.

Figure 3:
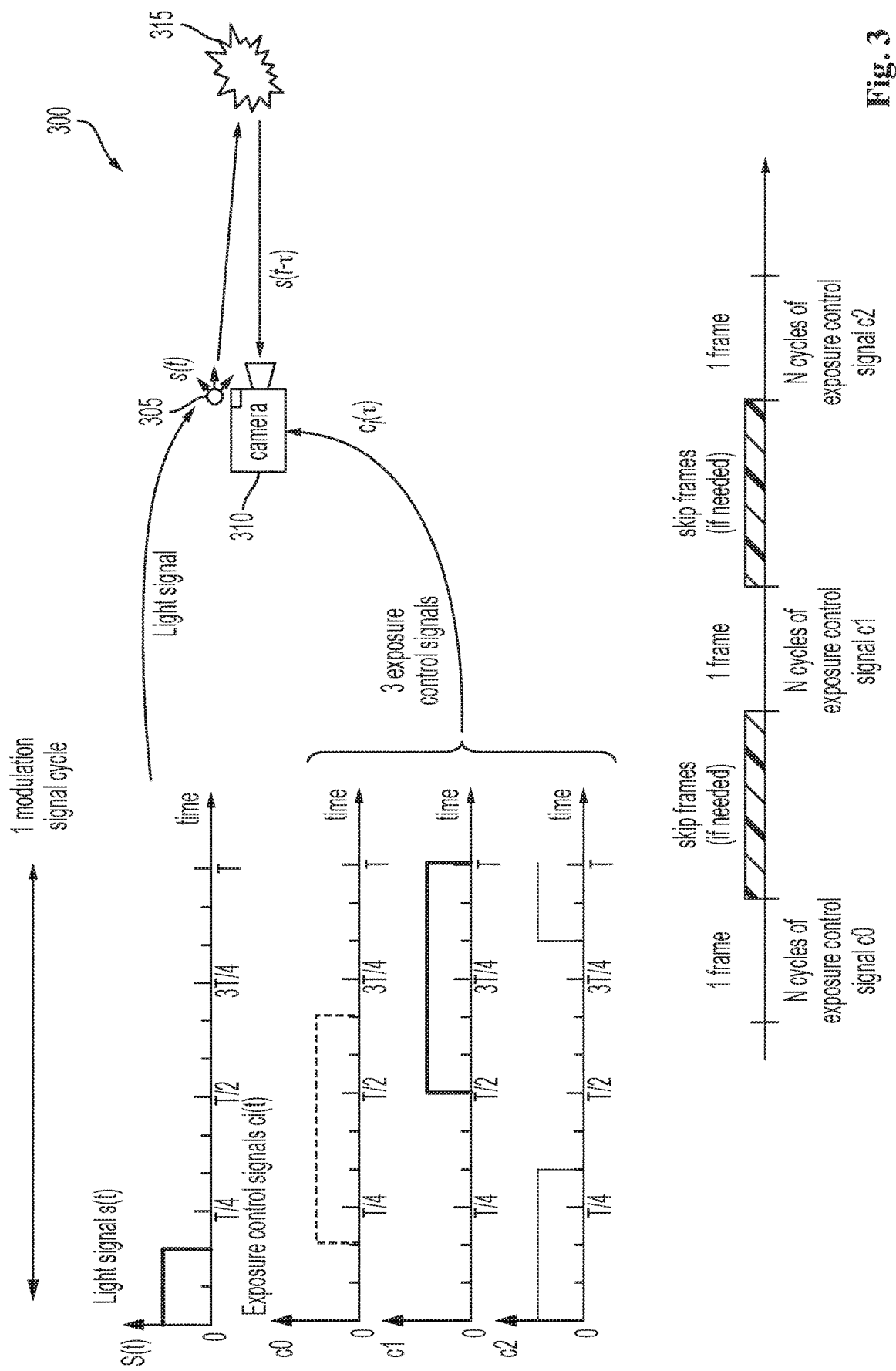
FIG. 3 illustrates a system and timing diagrams for operating the system according to at least one example embodiment.

FIG. 3 illustrates a system 300 and timing diagrams for operating the system 300 according to at least one example embodiment. The system 300 includes a light source 305 that emits a light signal s(t), a camera 310 including an imaging device 1, and an object 315. The light signal is a modulated waveform with a modulation frequency f. In an example embodiment, f may be 30 MHz. The time duration T=1/f represents one period of the modulated waveform. Light reflected from the object 315 returns to the camera 310 according to a function $s(t-\tau)$, where $\tau$ is a time delay that represents the delay between light emission from the light source 305 to reception of light reflected from the object by the camera 310. The objective of the system is to determine the time delay $\tau$ from the measured signals. The time delay is also referred to as the phase. Once the time delay is determined, the object distance $\delta$ can be calculated by $\delta = v*\tau/2$ where v is the velocity of light. The factor '2' in the denominator accounts for the emitted light to travel from the emitter to the object and the back to the camera. The imaging device 1 in the camera 310 may include a plurality of pixels 51 that are driven according to control signals $c_i(t)$. In the example of FIG. 3, the control signals include signals c0, c1, and c2. As shown, the control signals c0, c1, and c2 are binary signals that adhere to a scheme where, as time progresses across the time axis from the left to the right in the timing diagrams of FIG. 3, at most one of the control signals can change in value at any time instant. For example, there is a change in c0(t) at from 0 to 1 at a time instant T/6, whereas there is no change in c1(t) and c2(t) at that time instant. At time instant T/3, c2(t) changes from 1 to 0 but there is no change in c0(t) and c1(t). As a result, this is referred to as a third order Gray code coding scheme for a single modulation cycle of the light signal s(t). That is, over a duration of time T, the binary value of each control signal at each interval of T/6 adheres to a Gray code coding scheme. Sometimes this is also referred to as a third order Hamiltonian coding scheme. Both the light signal s(t) and the control signals ci(t) are periodic in time with a period T. That is, the signal level ci(t), where i can be 0, 1, and so on, has the same value as ci(t+T), ci(t+2T), and so on for each i and t. For example, at time 0, c0 has a binary value of 0, c1 has a binary value that transitions from 1 to 0, and c2 has a binary value of 1 (011 transitions to 001); at time T/6, c0 has a binary value that transitions from 0 to 1, c1 has a binary value of 0, and c2 has a binary value of 1 (001 transitions to 101); at time T/3, c0 has a binary value of 1, c1 has a binary value of 0, and c2 has a binary value that transitions from 1 to 0 (101 transitions to 100); and at time T/2, c0 has a binary value of 1, c1 has a binary value that transitions from 0 to 1, and c2 has a binary value of 0 (100 transitions to 110), and so on.

As further shown in FIG. 3, each control signal c0, c1, and c2 may be applied to all pixels in separate frames for N cycles in each frame. For example, in a first frame, the system 300 may perform N modulation cycles with the light signal s(t) and the control signal c0. In a second frame, the system 300 may perform N modulation cycles with the light signal s(t) and the control signal c1. In a third frame, the system 300 may perform N modulation cycles with the light signal s(t) and the control signal c2. In each frame, the respective control signal c0, c1, or c2 is applied to all pixels 51 being used for distance detection. In other words, each control signal c0, c1, c2 is applied globally in a separate frame. Thus, at least three frames are used to collect pixel values that are then used to determine a distance to the object 315. As shown, the system 300 may skip one or more frames in between application of control signals if desired. According to at least one example embodiment, N is a number selected according to how many cycles are useful for obtaining an accurate result. Thus, N may be a number based on empirical evidence and/or design preferences (for example, N is equal to 20000).

Here, it should be appreciated that the control signals c0, c1, and c2 may be applied to the pixel (one or both control nodes for taps A and B) to control charges collected in one of the taps A or B or both taps. In the case of using one tap, the other tap may be unused or omitted as noted above.

Figure 4:
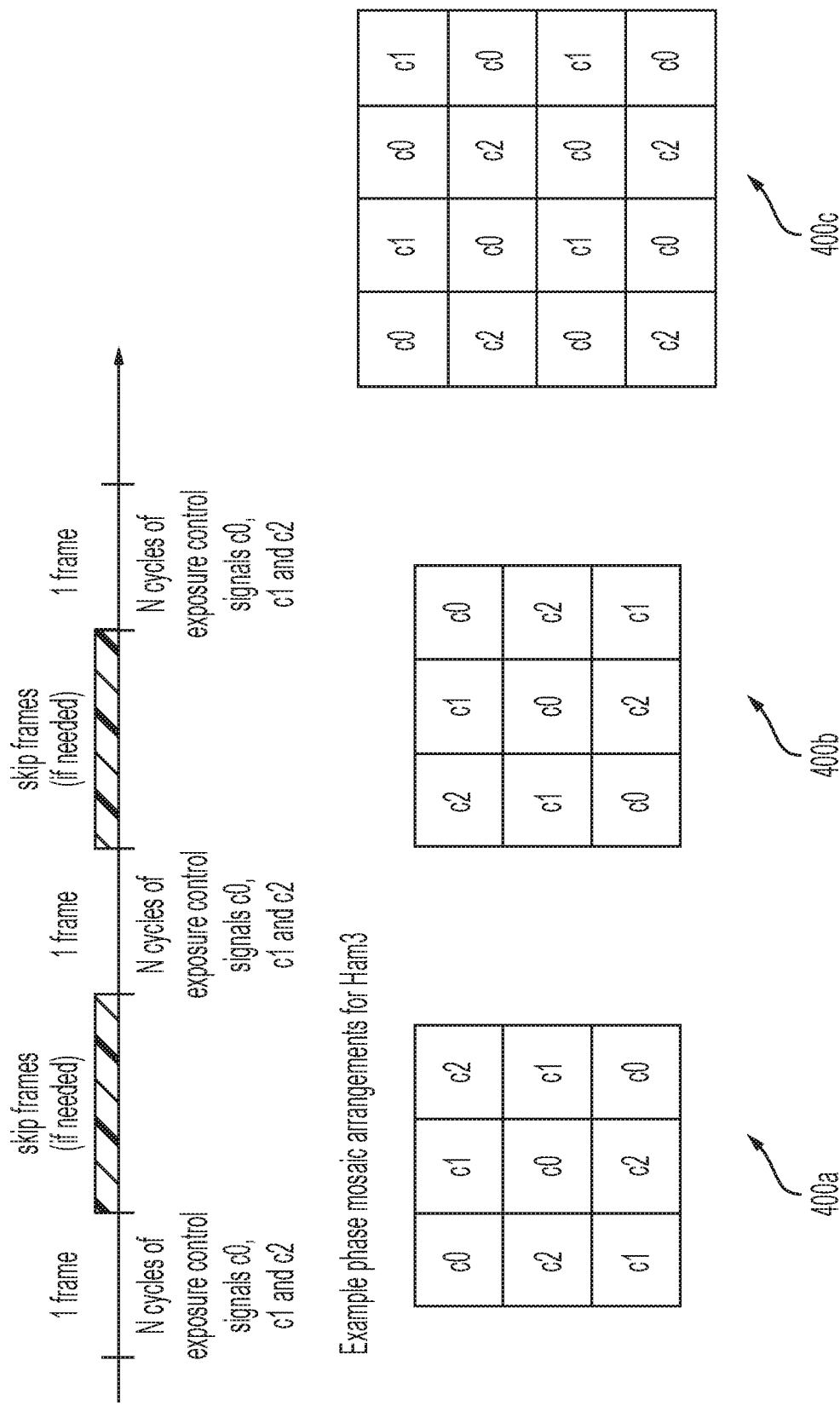
FIG. 4 illustrates phase mosaic arrangements and a timing diagram for operating the system in FIG. 3 according to at least one example embodiment.

FIG. 4 illustrates phase mosaic arrangements 400a, 400b, and 400c and a timing diagram for operating the system 300 in FIG. 3 according to at least one example embodiment. Compared to FIG. 3, FIG. 4 illustrates examples where pixel signals used for distance detection are captured in a single frame. Each arrangement 400a, 400b, and 400c represents an array of pixels 51 (e.g., 3×3 or 4×4). Each box in the arrangements 400a, 400b, and 400c represents one of the pixels 51 in the array, and each box is labeled with the control signal (c0, c1, or c2) that is applied to that pixel 51 in a single frame. For example, in arrangement 400a, the first row of pixels includes a first pixel that receives control signal c0, a second pixel that receives control signal c1, and a third pixel that receives control signal c2. As illustrated, the system 300 performs N modulation cycles of the light signal s(t) and control signals c0, c1, and c2 in each frame. As in FIG. 3, the system 300 may skip one or more frames in between frames where the controls signals c0, c1, and c2 are applied. The arrangements 400a, 400b, and 400c may be repeated for an entire array of pixels 51.

Figure 5:
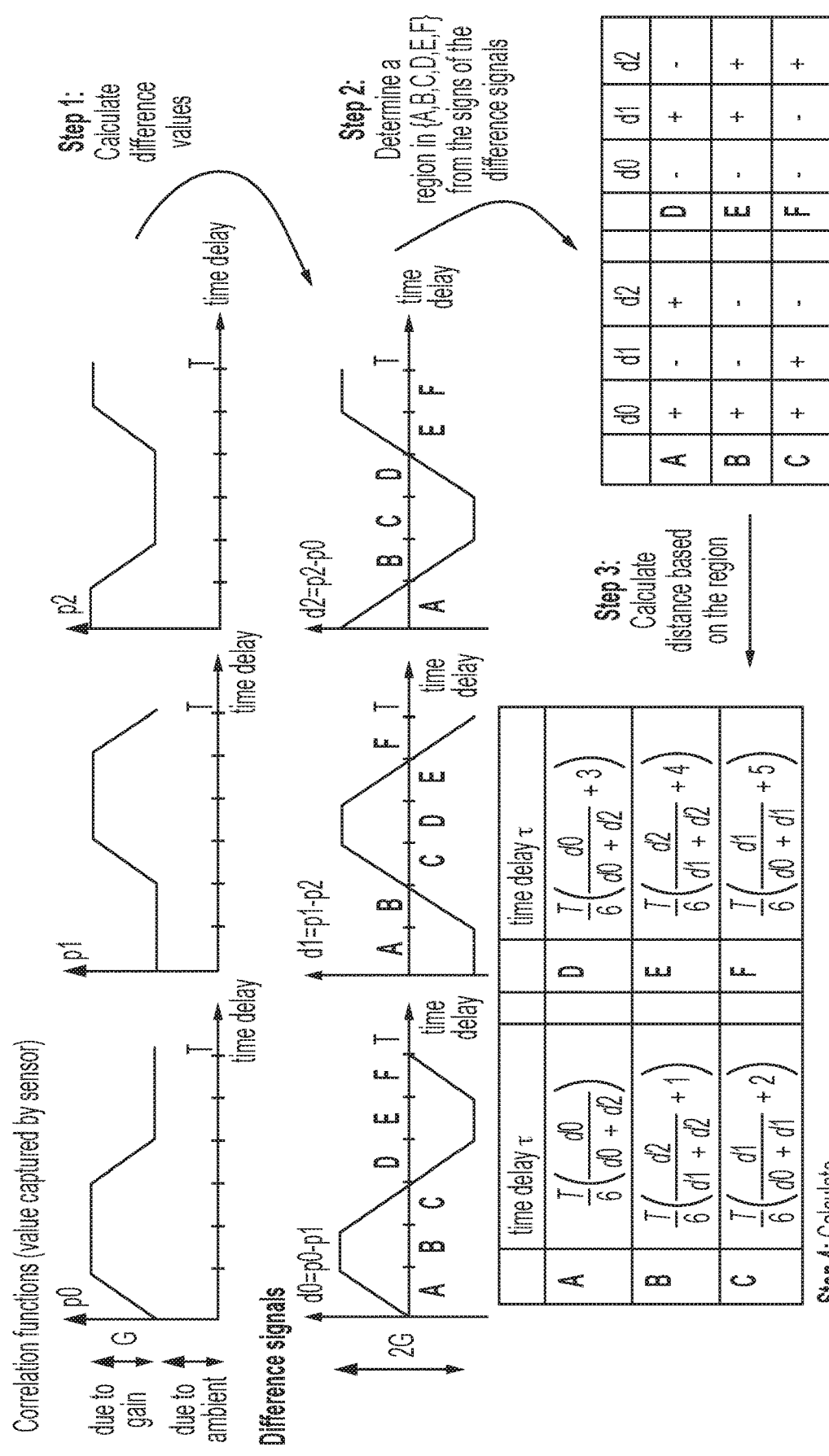
FIG. 5 illustrates operations for calculating a distance to an object according to at least one example embodiment.

FIG. 5 illustrates operations for calculating a distance to the object 315 using the control signals c0, c1, and c2 in FIGS. 3 and 4. As noted above, control signals c0, c1, and c2 are applied to pixel(s) 51 to generate pixel signals (or correlation functions) with varying values of amplitude at different points in time delay τ over a duration of time T. The pixel values pi(τ) are given by:

$$pi(\tau) = cor(ci, s, \tau) = \int_0^T ci(t) s(t-\tau) dt$$

for each i. In the above, the notation cor(ci,s, τ) represents the correlation function of ci(t) and s(t) with a delay τ.

In the example of FIG. 5, the duration of time delay τ includes six regions A, B, C, D, E, and F. Due to the relationship δ=v*τ/2, each region can be interpreted as corresponding to a sub-range of distances within a maximum range of the camera 310. According to at least one example embodiment, each sub-range spans an amount of distance. For example, if the maximum range of the camera 310 is 6 m, then each region A, B, C, D, E, and F corresponds to a 1 m sub-range with region A being closest to the camera 310 and region F being furthest from the camera 310.

In the example of FIG. 5, applying control signals c0, c1, and c2 causes the pixel(s) to output pixel signals p0, p1, and p2 having pixel values that vary according to the time delay τ which is the time for the light signal to travel from the light source 305 to the object 315 and then back to the camera 310. Control signal c0 is associated with pixel signal p0, control signal c1 is associated with pixel signal p1, and control signal c2 is associated with pixel signal p2. Each pixel signal p0, p1, and p2 shown in FIG. 5 may be an accumulation of respective pixel signals collected during the N cycles of a frame. For example, when the number of cycles in a frame is 20000, then the pixel signal p0 may be an integration of photons collected during the frame with control signal c0. As noted in FIG. 5, the pixel signals p0, p1, and p2 include portions that are due to ambient light and portions that are due to light reflected from the object.

After determining the pixel signals p0, p1, p2, the system 300 determines differences between the pixel signals p0, p1, and p2. For example, the difference signals d0, d1, and d2 are determined, where difference signal d0 is p0−p1, difference signal d1 is p1−p2, and difference signal d2 is p2−p0. Subsequently, the system 300 determines in which region A, B, C, D, E, or F the object 315 is located based on signs of the difference signals d0, d1, and d2, where the signs are positive or negative based on whether the difference signal is above or below zero. For example, if the system 300 determines that a sign of d0 is positive, a sign of d1 is negative, and a sign of d2 is negative, then the system 300 determines that the object 315 is in region B.

As shown in FIG. 5, each region A, B, C, D, E, and F has an associated equation that is used for calculating the time delay to the object 315, from which the distance to the object 315 can be calculated. In the above example, upon determining that the object 315 is in region B, the system 300 calculates the time delay to the object 315 using the equation associated with region B (time delay=(T/6)*(d2/(d1+d2)+1). Subsequent to distance calculation, the system 300 may further calculate a confidence signal as a sum of the absolute values of differences, i.e., |d0|+|d1|+|d2|. The confidence signal may be independent of phase and provide information on the strength of the received signal.

Figure 6A:
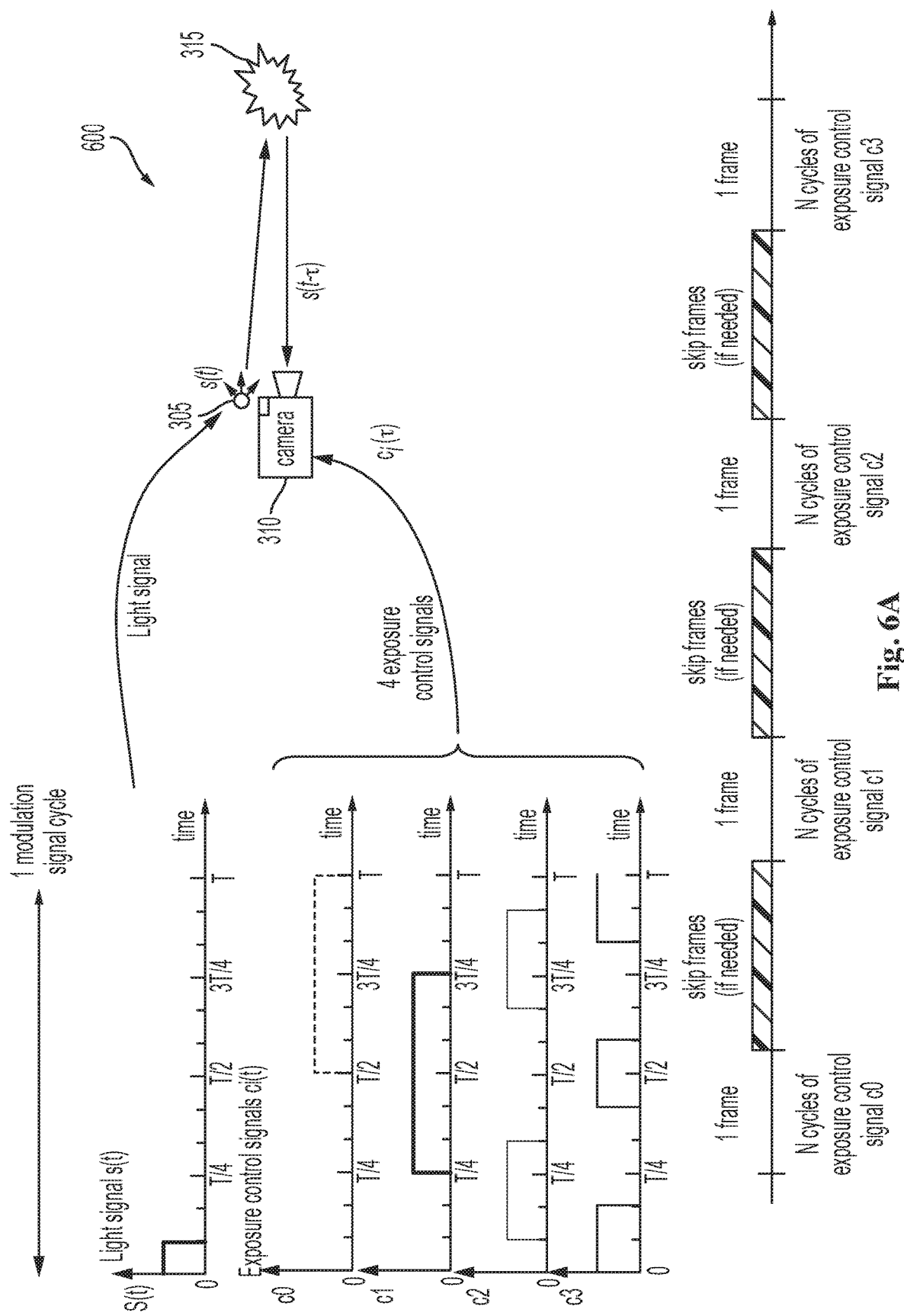
FIG. 6A illustrates a system and timing diagrams for operating the system according to at least one example embodiment.

FIG. 6A illustrates a system 600 and timing diagrams for operating the system 600 according to at least one example embodiment. The system 600 is similar to the system 300 in FIG. 3 except that a shorter duration light signal s(t) is employed and four control signals (or exposure control signals) c0, c1, c2, and c3 are applied to pixels 51 of the imaging device 1 within the camera 310. The control signals c0, c1, c2, and c3 adhere to a Gray code coding scheme. Thus, system 600 may be referred to as a fourth order Gray code system. Sometimes this is also referred to as a fourth order Hamiltonian coding system. As shown in FIG. 6A and similar to FIG. 3, N cycles of the light signal s(t) and each control signal c0, c1, c2, and c3 may be globally applied to all pixels 51 in a separate frame with one or more skipped frames in between if desired.

Figure 6B:
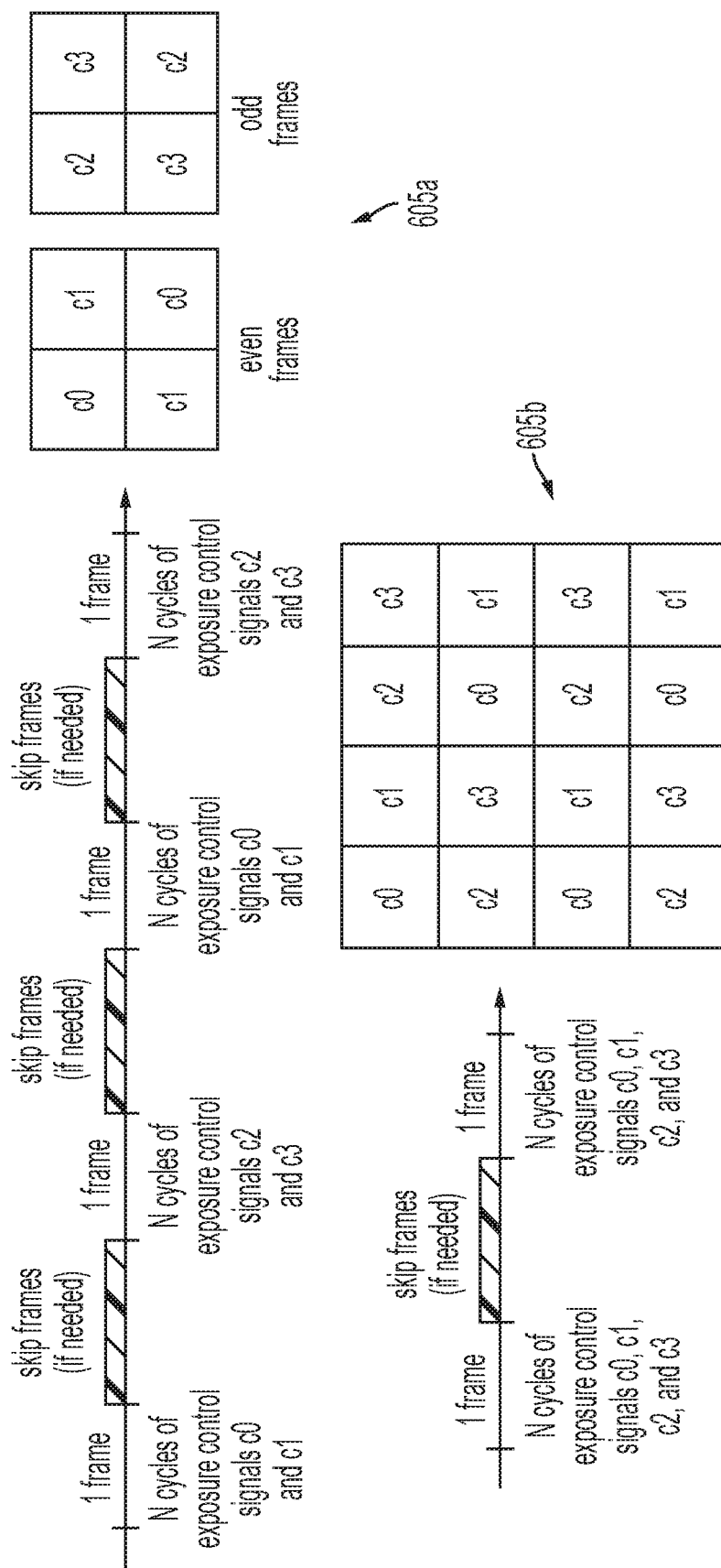
FIG. 6B illustrates phase mosaic arrangements and timing diagrams for operating the system in FIG. 6A according to at least one example embodiment.

FIG. 6B illustrates phase mosaic arrangements 605a and 605b and timing diagrams for operating the system in FIG. 6A according to at least one example embodiment. As in FIG. 4, each box in the arrangements 605a and 605b corresponds to a pixel 51 having a particular control signal c0, c1, c2, c3 applied thereto in order to reduce the number of frames for capturing signals used to calculate distance compared to FIG. 6A. For example, arrangement 605a illustrates applying control signals c0 and c1 in even frames, and applying control signals c2 and c3 in odd frames in order to capture the signals in two frames. As shown, N cycles of control signals c0 and c1 are applied in one frame while N cycles of control signals c2 and c3 are applied in another frame. One or more frames may be skipped in between these two frames.

FIG. 6B further illustrates arrangement 605b, which shows applying N cycles of control signals c0, c1, c2, and c3 to different pixels 51 in order to capture signals used for distance calculation in a single frame. As in FIG. 4, the number of cycles N in FIGS. 6A and 6B may be a design parameter based on empirical evidence and/or design preference. In at least one example embodiment, N is equal to 20000. The arrangements 605a and 605b may be repeated for an entire array of pixels 51.

Figure 7:
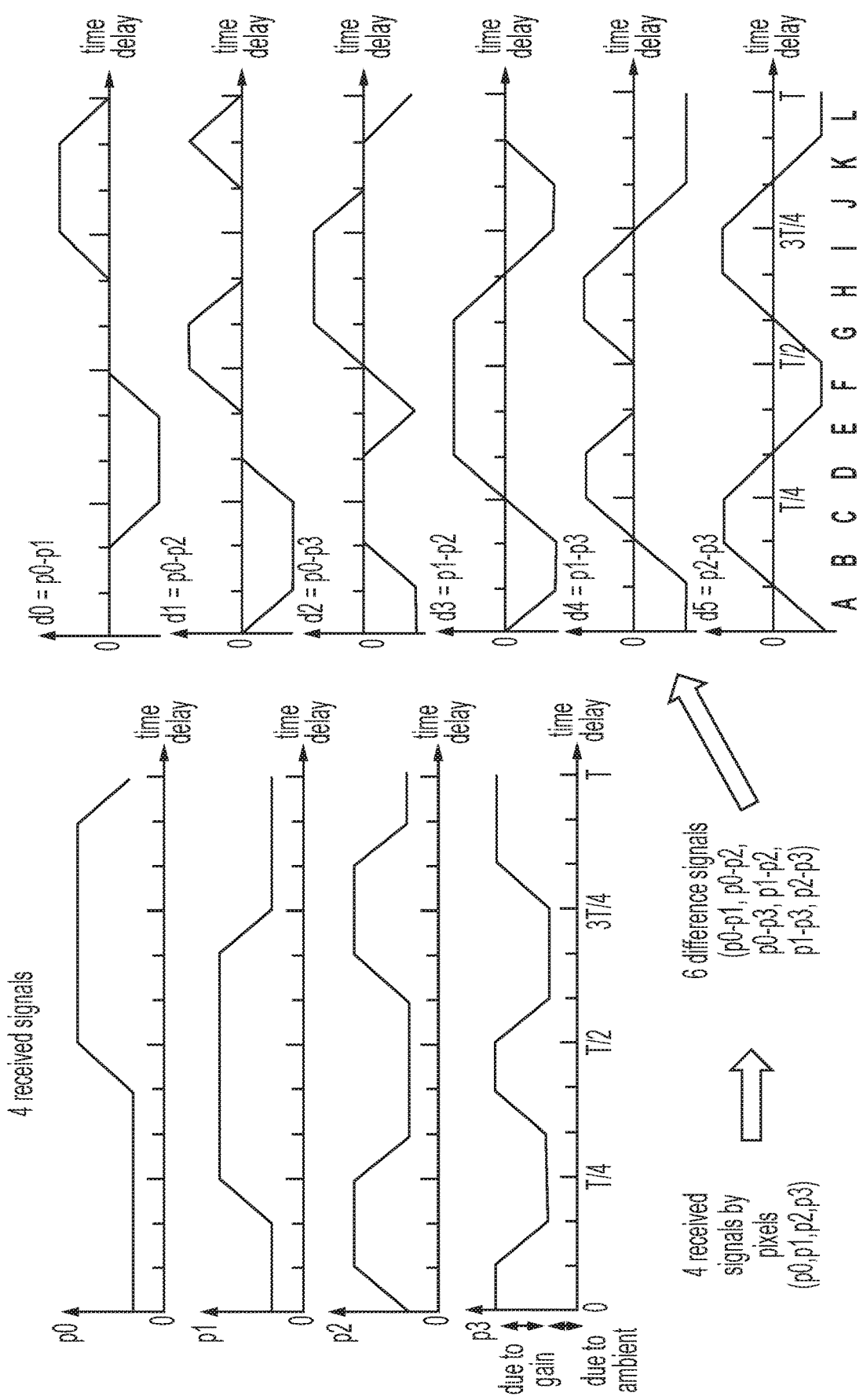
FIG. 7 illustrates pixel signals and difference signals for the system in FIGS. 6A and 6B according to at least one example embodiment.

FIG. 7 illustrates pixel signals and difference signals for the system 600 in FIGS. 6A and 6B. Similar to the third order Gray code system, the fourth order Gray code system generates pixel signals according to respective control signals. FIG. 7 illustrates four pixel signals p0, p1, p2, and p3 generated according to respective control signals c0, c1, c2, and c3. FIG. 7 further illustrates differences between pixels signals p0, p1, p2, and/or p3. In this example, the system 600 determines six difference signals as d0=p0−p1, d1=p0−p2, d2=p0−p3, d3=p1−p2, d4=p1−p3, and d5=p2−p3. As in the third order Gray code system, the fourth order Gray code system uses the difference signals d0 to d5 in order to determine a region in which the object 315 is located. In the fourth order Gray code system, a number of regions may be equal to 12, shown as regions A, B, C, D, E, F, G, H, I, J, K, and L. As in the third order system, each region represents a sub-range of distances within a maximum range of the camera 310. For example, the size of each region is 1/12 of the maximum range, where region A is closest to the camera 310 and region L is furthest from the camera 310.

Figure 8:
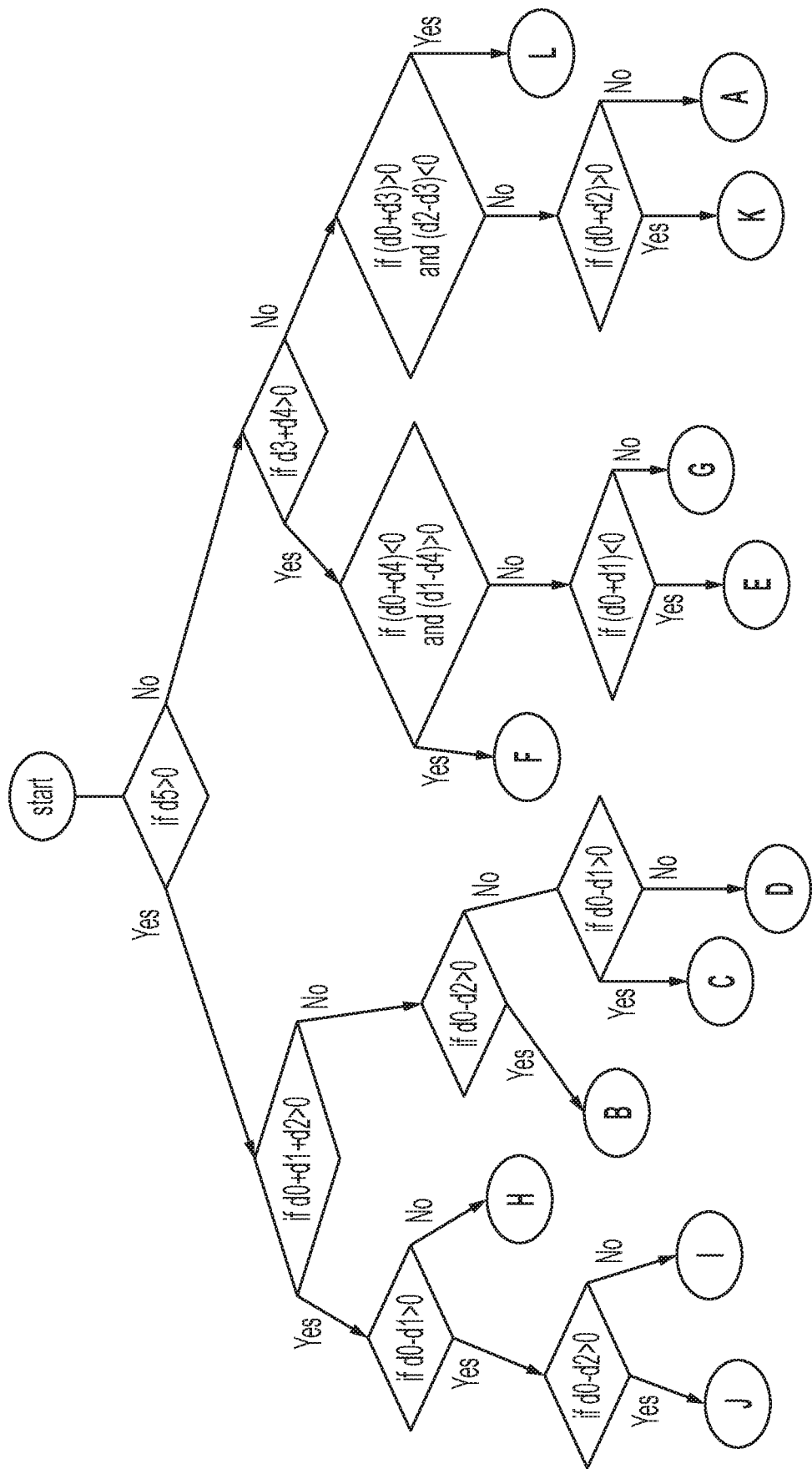
FIG. 8 illustrates a decision tree for determining a region in which an object is located according to at least one example embodiment.

FIG. 8 illustrates a decision tree for determining a region in which the object 315 is located using the difference signals d0 to d5 of FIG. 7, and FIG. 9 illustrates a table associating time delay equations (or decoding formulas) with regions. Upon determining that the object 315 is located in one of regions A to L, the system 600 determines which equation to use for calculating the time delay τ to the object 315 according to the chart depicted in FIG. 9. For example, if the system uses the decision tree in FIG. 8 to determine that the object 315 is in region C, then the system uses the equation associated with region C to determine the time delay associated with the object 315 to thereby calculate the distance from $\delta=v*\tau/2$.

Subsequently, the system 600 calculates a confidence signal as max(|d0|, |d1|, |d2|, |d3|, |d4|, |d5|) for all distances, or as avg_of_top_2(|d0|, |d1|, |d2|, |d3|, |d4|, |d5|) for all distances. Here the term avg_of_top_2 means to select the two largest values from the items inside the parenthesis, and then calculate the average of the two selected values.

Example embodiments directed to cancellation of fixed pattern noise (FPN) will now be described. In the case of relatively high ambient light, shot noise is dominated by the effect from ambient noise. However, in the case of relatively low ambient light, the light signal s(t) is the main contributor to shot noise.

Figure 10:
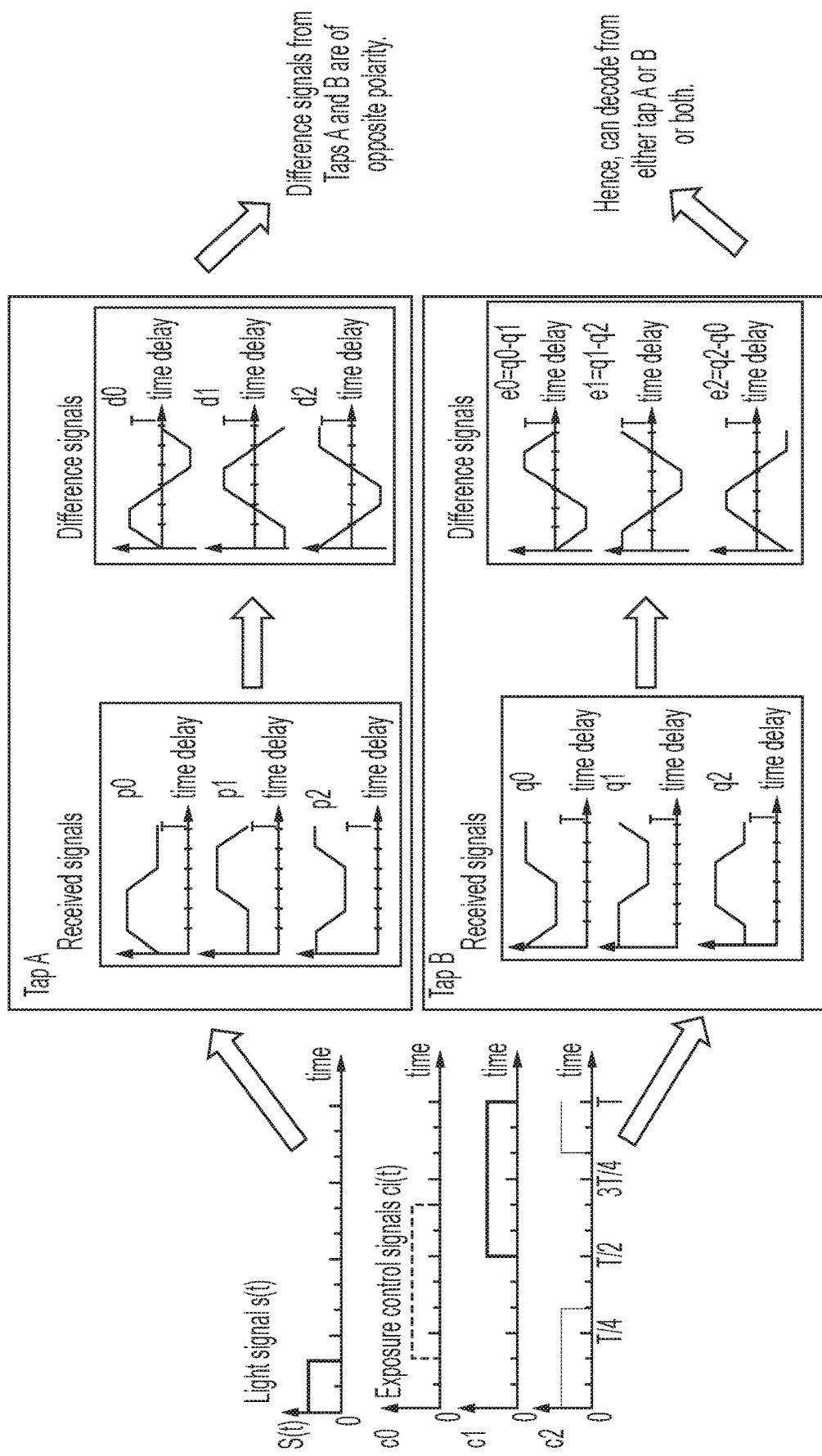
FIG. 10 illustrates pixel signals output through two taps according to at least one example embodiment.

With reference to FIGS. 10-17, cancellation of FPN according to example embodiments is discussed below for a pixel 51 that uses both taps A and B. The description for FIG. 10 through 17 can also be applicable to embodiments that use only one tap (e.g., tap A). In that case, calculation steps in FIGS. 10 to 17 that use tap B signals can be ignored. As discussed with reference to FIG. 2B, the pixel 51 may include voltage application control terminals or nodes VGA/VGB that receive control signals ci(t) and/or ci'(t). An external control signal ci(t) can be applied to one of VGA/VGB and to the other of terminals VGA/VGB via an inverter to assist with channeling charge toward tap A for a first time period and toward tap B for a second time period. Each of the first time period or the second time period may be formed by a union of several time intervals that may not be contiguous. Furthermore, the first time period and the second time period are disjoint, since charges are directed toward to either tap A or tap B at a given time instant. FIG. 10 illustrates additional details of how charge is collected through tap A for the first time period and through tap B for the second time period, where three control signals c0, c1, and c2 are used in a third order Gray code system, such as the system 300 in FIG. 3. For example, in one cycle, control signal c0 is applied to a pixel 51 (e.g., to node VGA), which causes charges generated from photons to move to tap A during a first time period and generate a pixel signal p0. In the same cycle, control signal c0 applied to the pixel 51 (e.g., to node VGB through the inverter) causes charges generated from photons to move to tap B during a second time period and generate a pixel signal q0. This cycle of applying c0 to a pixel in a cycle may be repeated a desired number of times (N cycles). The same or similar timing for application of control signals to a pixel and the same number of cycles may be used for control signals c1 and c2. Additional details of how control signals c0, c1, and c2 may be applied to a pixel 51 are described in more detail below with reference to FIGS. 11A-11D.

As illustrated in FIG. 10, the pixel signals p0, p1, and p2 output through tap A are substantially opposite in polarity to the pixel signals q0, q1, q2 output through tap B. Thus, the difference signals d0, d1, and d2 for tap A (same as those shown in FIG. 5) are also substantially opposite in polarity to the difference signals e0, e1, and e2 for tap B (where e0, e1, and e2 are calculated in the same manner as d0, d1, and d2 except using pixel signals q0, q1, and q2). As a result, the system 300 may calculate a distance using the same methods described above in FIGS. 3-5 using tap A and/or tap B. In any event, FPN and/or random noise may be present. Accordingly, it is desired to reduce or eliminate such noise.

Figure 11A:
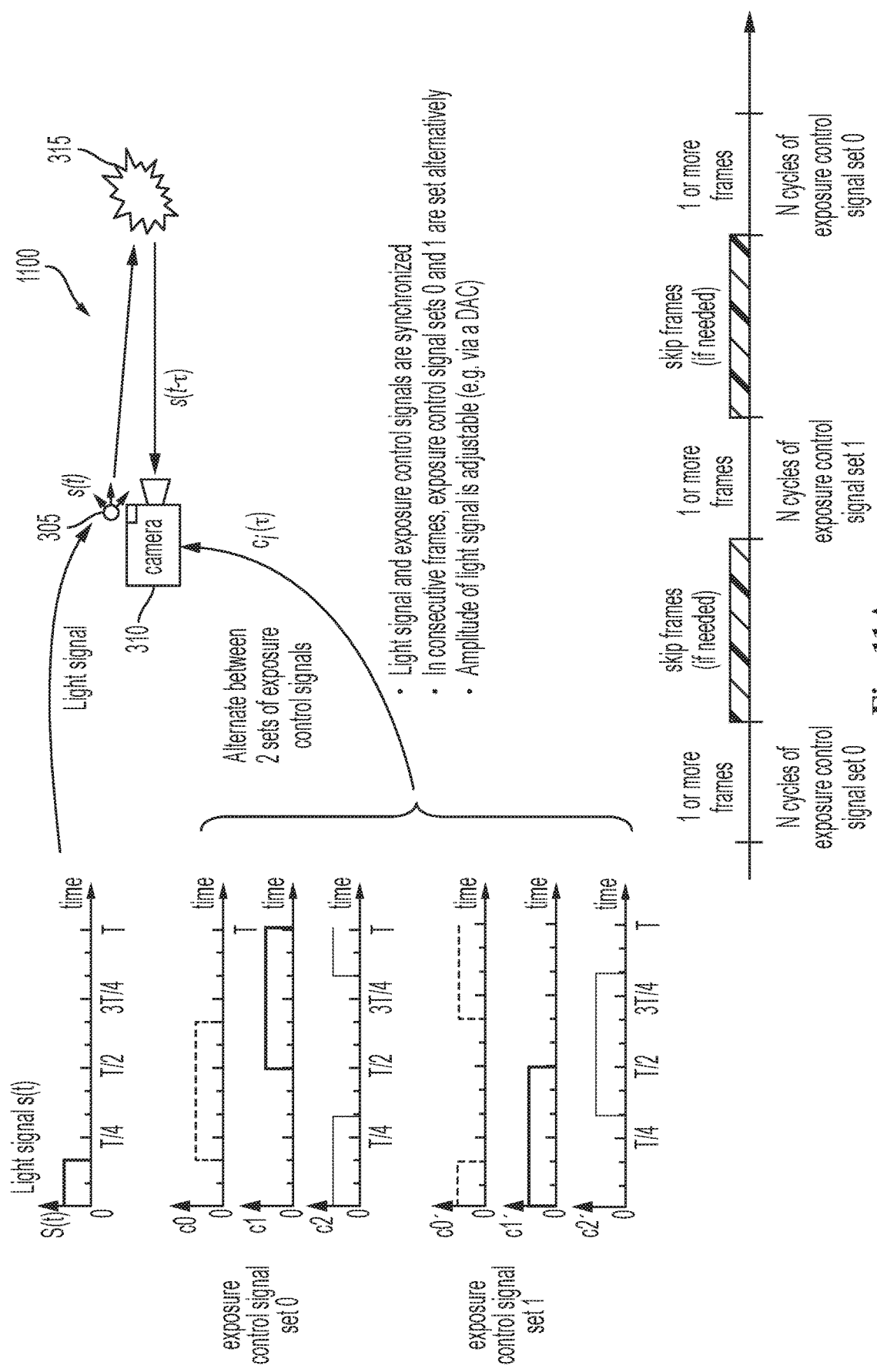
FIG. 11A illustrates a system for reducing or eliminating noise according to at least one example embodiment.
Figure 11B:
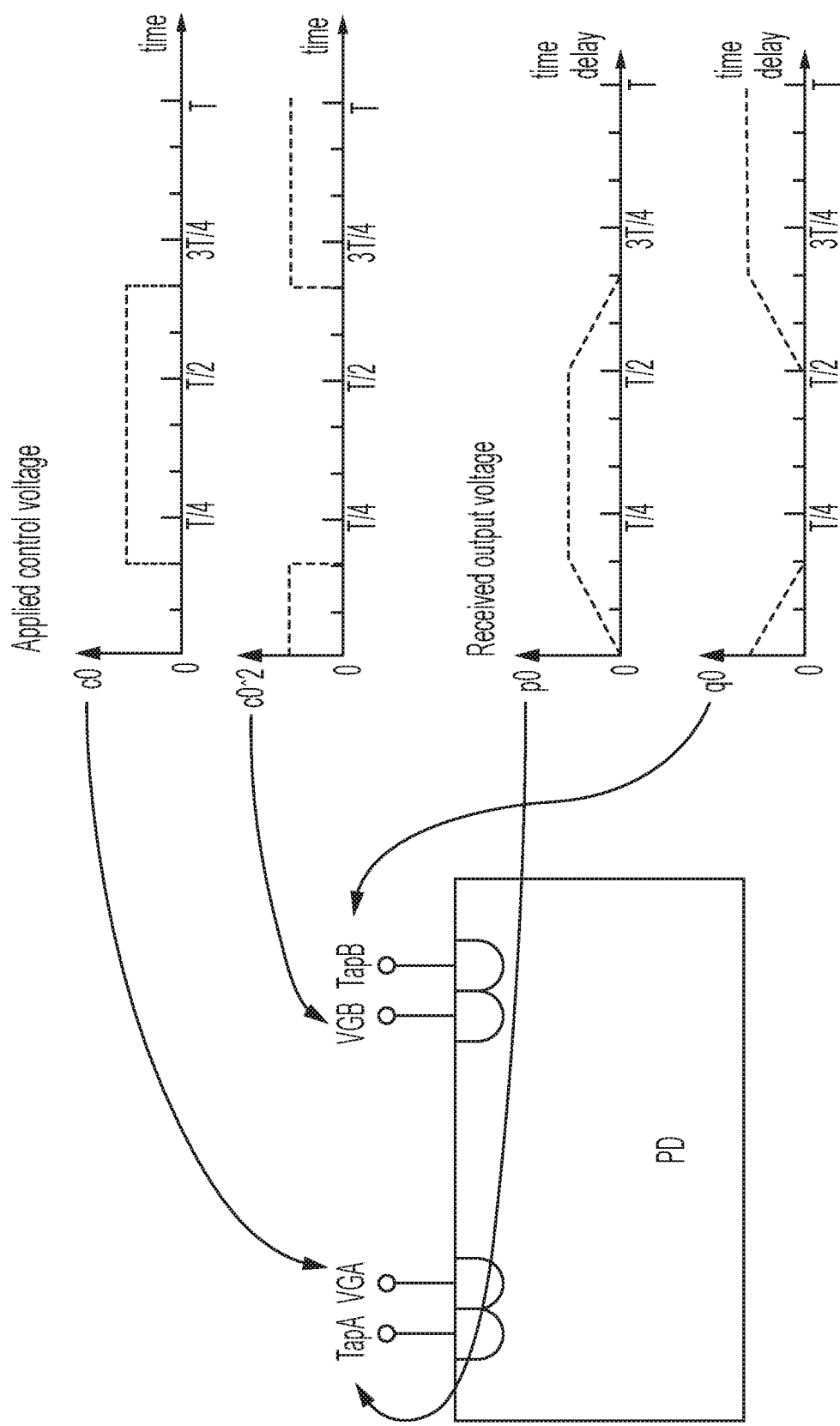
FIG. 11B illustrates application of control signals to a pixel to generate corresponding pixel signals according to at least one example embodiment.
Figure 11C:
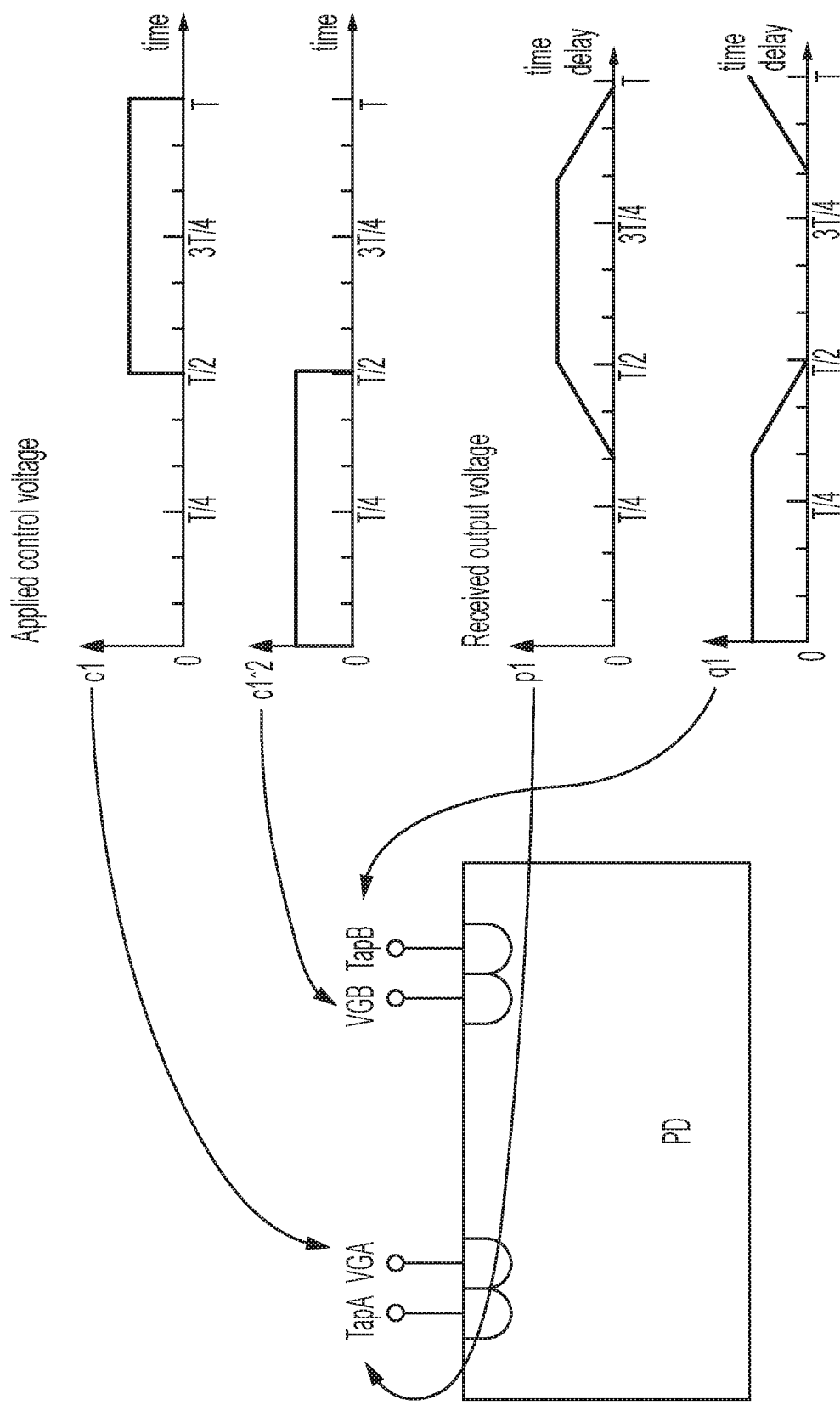
FIG. 11C illustrates application of control signals to a pixel to generate corresponding pixel signals according to at least one example embodiment.
Figure 11D:
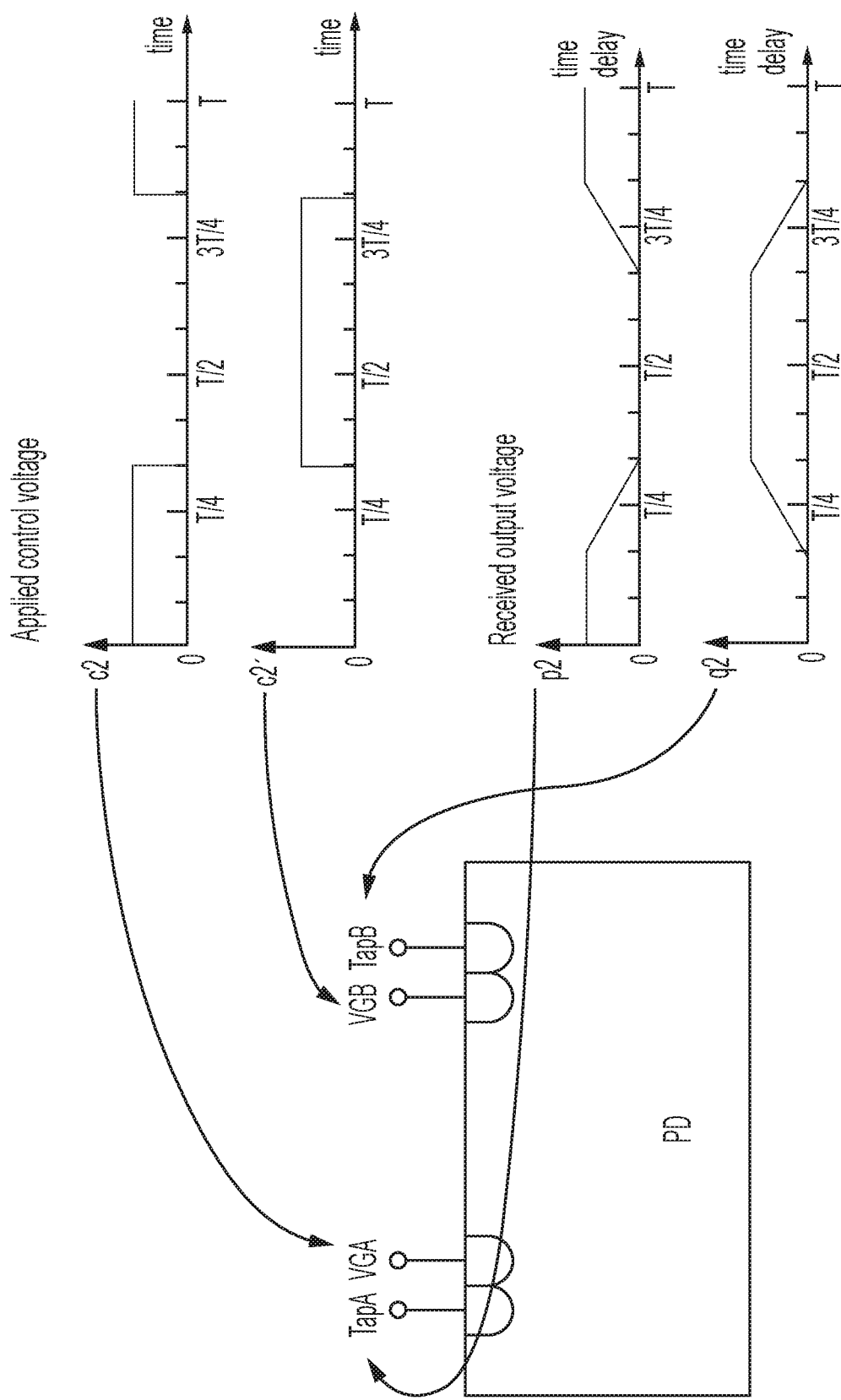
FIG. 11D illustrates application of control signals to a pixel to generate corresponding pixel signals according to at least one example embodiment.

FIG. 11A illustrates a system 1100 for reducing or eliminating noise. The system 1100 includes the same elements as the system 300, but the system 1100 is operated differently than the system 300. For example, as shown in FIG. 11A, two sets of control signals c0, c1, c2, and c0', c1', and c2' are used to control charge transfer from the photoelectric conversion region of each pixel 51 to tap A and tap B of each pixel. The two sets of control signals are applied alternately. For example, as shown, N cycles of the light signal s(t) and the first set of control signals c0, c1, and c2 are applied to one or more pixels 51 during one or more first frames, and N cycles of the second set of control signals c0', c1', and c2' are applied to the one or more pixels 51 during one or more second frames. As in FIGS. 3-5, control signals c0, c1, and c2 adhere to a Gray code coding scheme, and control signals c0', c1', and c2' are substantially the inverse or reverse polarity of control signals c0, c1, and c2, respectively. Here, it should be appreciated that both sets of controls signals may be applied globally, as in FIG. 3, or according to one of the phase mosaic arrangements in FIG. 4. As in FIG. 10, in one modulation cycle, control signal c0 is applied to a pixel 51 to generate p0 through tap A, and to generate q0 through tap B. This method of applying c0 to the pixel 51 may repeat a desired number of times (N cycles), and the same timing is true for all control signals in both sets.

FIGS. 11B-11D illustrate application of control signals to a pixel 51 to generate corresponding pixel signals at taps A and B according to at least one example embodiment. As shown in FIG. 11B, control signal c0 is applied to node VGA to generate a pixel signal p0 at tap A, and control signal c0' is applied to node VGB to generate a pixel signal q0 at tap B. As shown in FIG. 11C, control signal c1 is applied to node VGA to generate a pixel signal p1 at tap A, and control signal c1' is applied to node VGB to generate a pixel signal q1 at tap B. As shown in FIG. 11D, control signal c2 is applied to node VGA to generate a pixel signal p2 at tap A, and control signal c2' is applied to node VGB to generate a pixel signal p3 at tap B. Here, it should be appreciated that this manner of applying controls signals ci(t) and ci'(t) to nodes VGA and VGB to generate pixel signals pi and qi is carried out for example embodiments described above and below.

Figure 12:
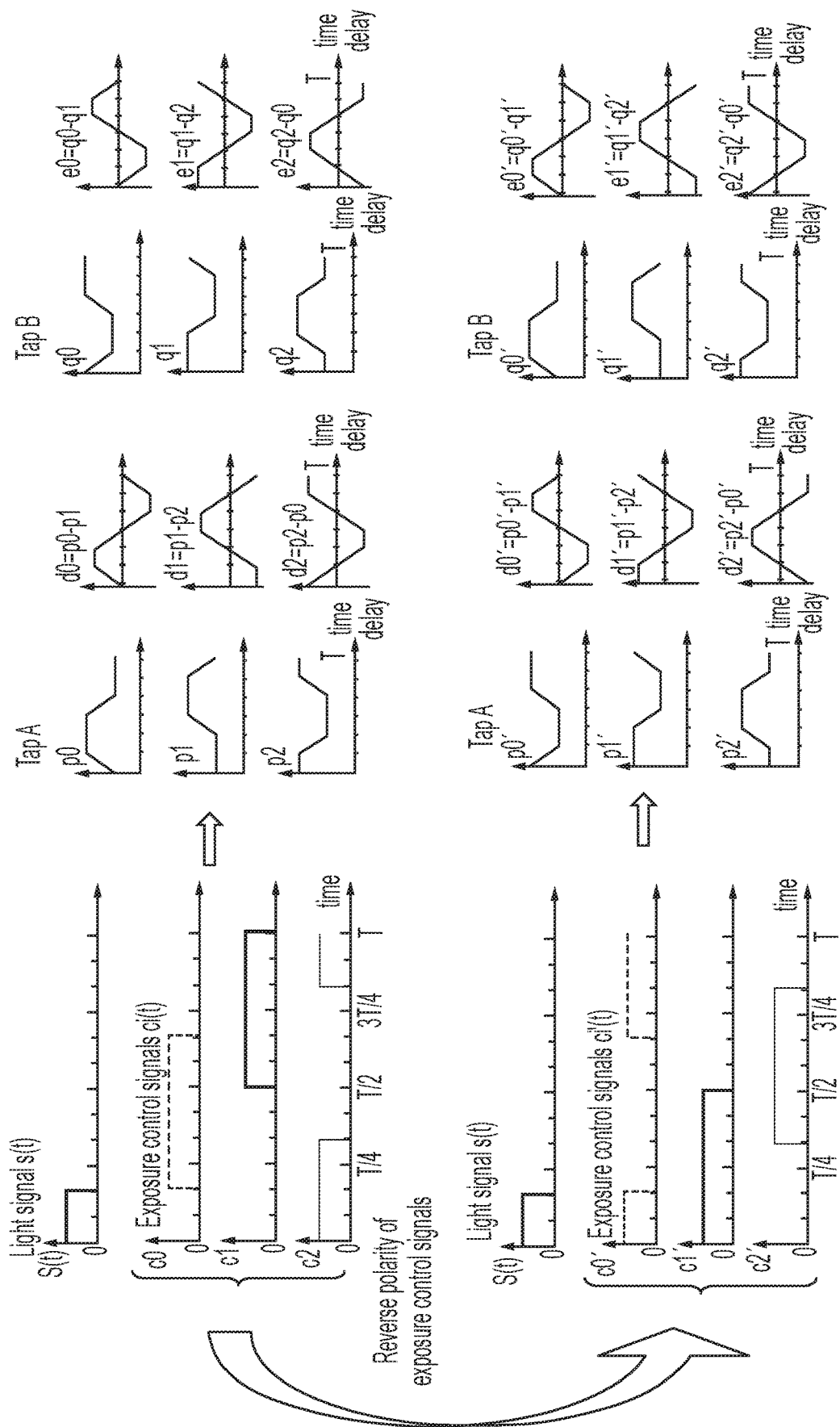
FIG. 12 illustrates pixels signals and difference signals according to at least one example embodiment.

FIG. 12 illustrates pixel signals p0, p1, p2, p0', p1', p2' of tap A and q0, q1, q2, q0', q1 q2' of tap B, and difference signals d0, d1, d2, d0', d1', d2' of tap A, and e0, e1, e2, e0', e1', and e2' of tap B of a pixel 51 driven according to FIGS. 11A-D. The difference signals d0', d1', d2', e0', e1', and e2' for the second set of control signals c0', c1', and c2' are calculated in the same manner as d0, d1, and d2, e0, e1, and e2, except using the second set of control signals c0', c1', c2' instead of the first set of control signals c0, c1, c2. As shown, in one or more first frames, the first set of control signals c0, c1, and c2 are sequentially applied to a pixel 51 while charge is transferred alternately through tap A and tap B. That is, as noted above, control signal c0 is applied to the pixel 51 which causes charge to travel through tap A during a first time period and through tap B during a second time period. Then, control signal c1 is applied to the pixel 51 to cause charge to travel through tap A during a third time period and through tap B during a fourth time period. Control signal c2 is applied to the pixel 51 to cause charge to travel through tap A during a fifth time period and through tap B during a sixth time period. Each control signal may be applied to the pixel 51 for N cycles. In the same manner and in one or more second frames, the second set of controls signals c0', c1', and c2' are sequentially applied to the pixel 51 while charge is transferred alternately through tap A and tap B.

FIG. 13 illustrates tables describing noise cancellation using the pixel signals and difference signals from FIG. 12.

In FIG. 13, a0, a1, a2 represent total captured signals through tap A, including pixel signals p0, p1, p2, random noise r0a, r1a, r2a, and FPN f0a, f1a, f2a. Similarly, b0, b1, b2 represent total captured signals through tap B, which includes pixel signals q0, q1, q2, random noise r0b, r1b, r2b, and FPN f0b, f1b, f2b. In each case, difference signals d0, d1, d2 and e0, e1, and e2 are calculated as shown. The same notation above applies to signals captured by inverted control signals c0', c1', and c2' to generate total signals a0', a1', a2' and b0', b1', and b2'.

In the total signals a0, a1, a2, a0', a1', and a2', the random noise components r0a, r1a, r2a, r0a', r1a', and r2a' are random in nature and generally have different values from each other. However, there are only three distinct FPN components f0a, f1a and f2a. Because FPN is fixed pattern in nature, the FPN value does not change according to the polarity of the control signal or the moment the pixel signal is captured. Similar observations are applicable to the total signals b0, b1, b2, b0', b1', and b2' where the random noise components r0b, r1b, r2b, r0b', r1b', and r2b' are random in nature and generally have different values from each other. However, there are only three distinct FPN components f0b, f1b and f2b.

FIG. 13 further illustrates calculating differences between d0 and d0' as d0−d0', and differences between e0 and e0' as e0−e0'. In both cases, FPN is cancelled and signal to noise ratio (SNR) is improved. Although not explicitly shown, FPN offsets are similarly cancelled with d1−d1', d2−d2', e1−e1', and e2−e2'. Furthermore, (d0−d0')−(e0−e0'), (d1−d1')−(e1−e1'), and (d2−d2')−(e2−e2') result in cancellation of FPN offsets and improved SNR, thereby increasing accuracy of the distance calculation. Accordingly, FPN offsets are cancelled and SNR improved using signals from tap A only, tap B only, and taps A and B.

Figure 14:
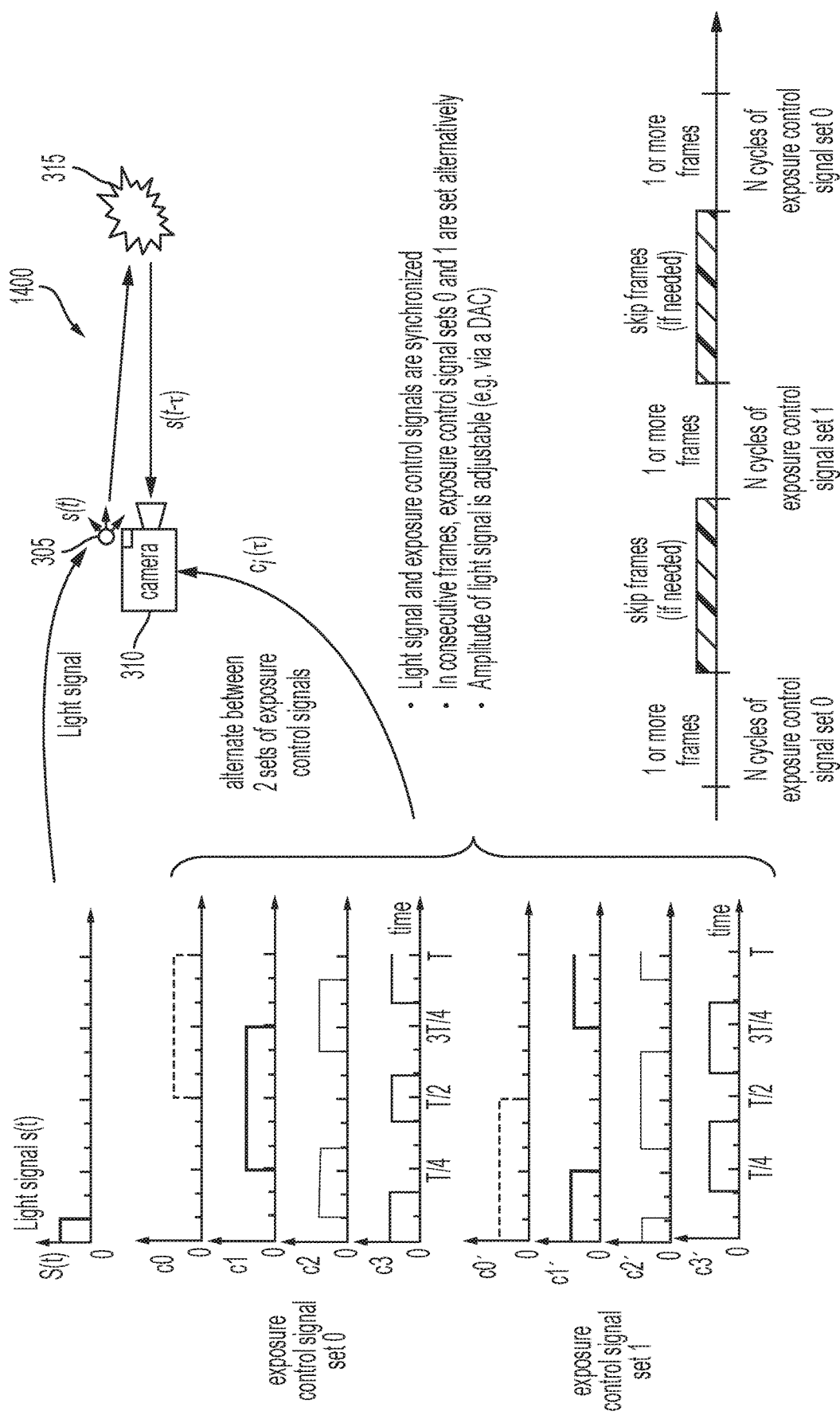
FIG. 14 illustrates a system for reducing or eliminating noise according to at least one example embodiment.

FIG. 14 illustrates a system 1400 for reducing or eliminating noise in a fourth order Gray code system (e.g., as in FIGS. 6-9). The system 1400 includes the same elements as the system 600, but the system 1400 is operated differently than the system 600. For example, as shown in FIG. 14, two sets of four control signals c0, c1, c2, c3 and c0', c1', c2', c3' are used to transfer charge from the photoelectric conversion region of each pixel through tap A and tap B of each pixel. The two sets of control signals are applied alternately in the same or similar manner as in FIGS. 11A-11D. For example, as shown, N cycles of the light signal s(t) and the first set of control signals c0, c1, c2, and c3 are sequentially applied to one or more pixels 51 during one or more first frames, and N cycles of the second set of control signals c0', c1', c2', and c3' are sequentially applied to the one or more pixels 51 during one or more second frames. As in FIGS. 6-9, control signals c0, c1, c2, c3 adhere to a Gray code coding scheme, and control signals c0', c1', c2', and c3' are substantially the inverse or reverse polarity of control signals c0, c1, c2, and c3, respectively. Here, it should be appreciated that both sets of controls signals may be applied globally, or according to a phase mosaic arrangement as in FIG. 6B.

Figure 15:
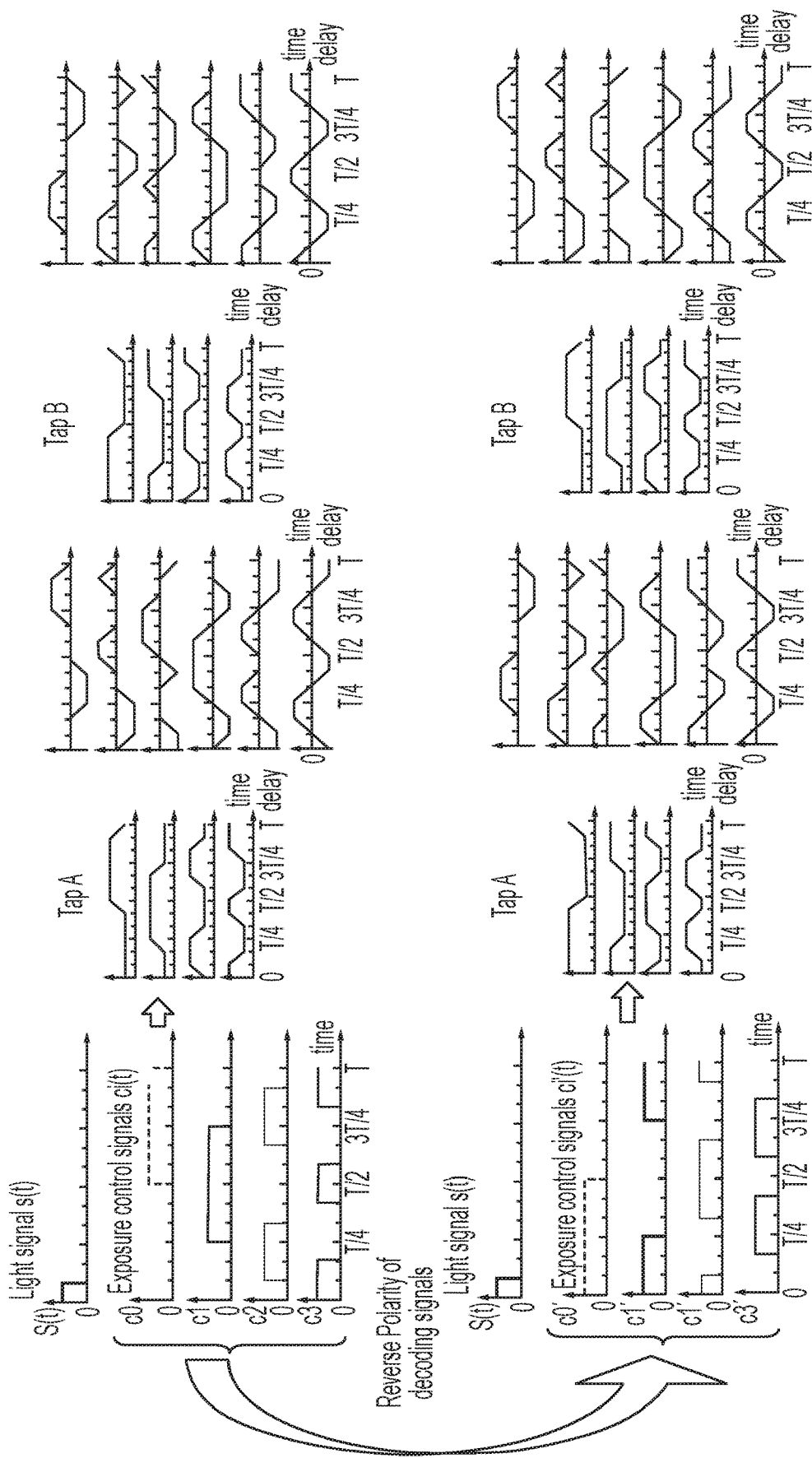
FIG. 15 illustrates pixels signals and difference signals according to at least one example embodiment.

FIG. 15 illustrates pixels signals p0, p1, p2, p3, p0', p1', p2', p3' for tap A and q0, q1, q2, q3, q0', q1', q2', q3' for tap B, and difference signals d0, d1, d2, d3, d4, d5, d0', d1', d2', d3', d4', d5' for tap A and e0, e1, e2, e3, e4, e5, e0', e1', e2', e3', e4', e5' for tap B of a pixel 51 driven according to FIG. 14. Difference signals d0, d1, d2, d3, d3, d4, d5, d0', d1', d2', d3', d4', d5' for tap A and e0, e1, e2, e3, e4, e5, e0', e1', e2', e3', e4', e5' for tap B are generated in the same manner as that shown and discussed with respect to FIG. 7 using a respective set of control signals. As shown in FIG. 14 and discussed above, in one or more first frames, the first set of control signals c0, c1, c2, and c3 are sequentially applied to a pixel 51 while charge is transferred alternately through tap A and tap B. In one or more second frames, the second set of controls signals c0', c1', c2', c3' are sequentially applied to the pixel 51 while charge is transferred alternately through tap A and tap B.

FIG. 16 illustrates tables describing noise cancellation using the pixel signals and difference signals from FIG. 15. In FIG. 16, a0, a1, a2, a3 represent total signals captured through tap A, including pixel signals p0, p1, p2, p3, random noise r0a, r1a, r2a, r3a, and FPN f0a, f1a, f2a, f3a. Similarly, b0, b1, b2, b3 represent total signals captured through tap B, which includes pixel signals q0, q1, q2, q3, random noise r0b, r1b, r2b, r3b and FPN f0b, f1b, f2b, f3b. In each case, difference signals d0, d1, d2, d3 and e0, e1, e2, e3 are calculated as shown. The same notation applies to signals captured by inverted control signals c0', c1', c2', c3' to generate total signals a0', a1', a2', a3' and b0', b1', b2', b3'. As shown, FPN offsets are cancelled and SNR improved for calculations using signals from tap A only, tap B only, and taps A and B.

FIG. 17 illustrates a table showing FPN offset cancellation and SNR improvements for various combinations of a number of pixels used to capture four phases, a number of taps used, and a number of frames for capturing the four phases. As shown, FPN offsets are cancelled and SNR is improved for methods that utilize two sets of control signals as described above with reference to FIGS. 10-16.

Figure 18:
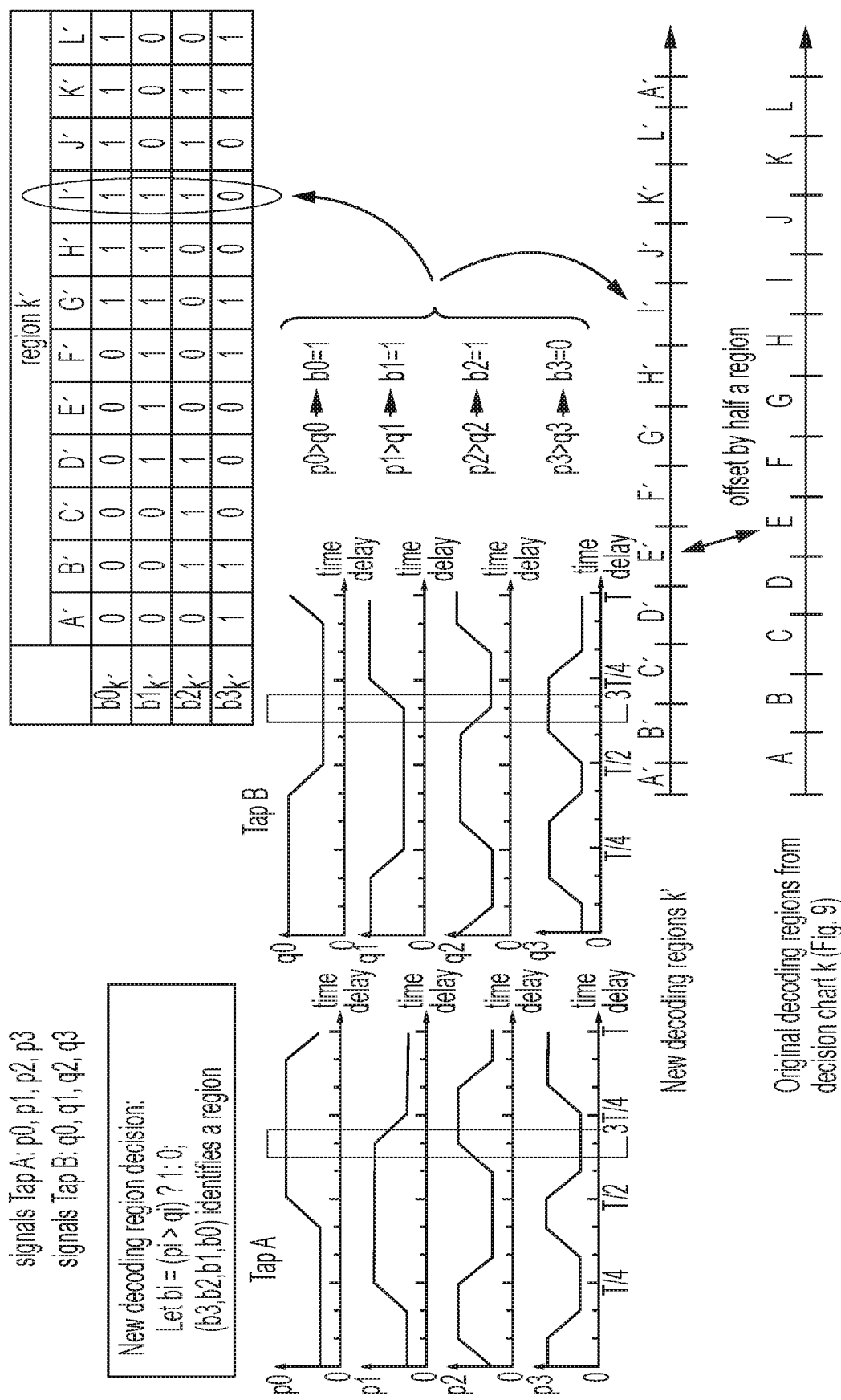
FIG. 18 illustrates various parts of a method for calculating distance to an object according to at least one example embodiment.
Figure 19:
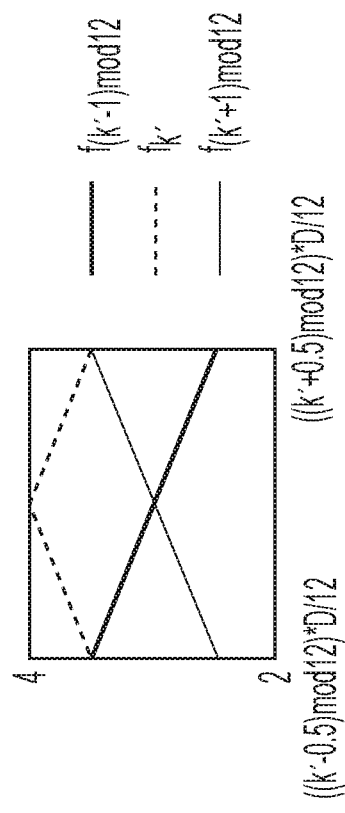
FIG. 19 illustrates various parts of a method for calculating distance to an object according to at least one example embodiment.

FIGS. 18-20 illustrate various parts of a method for calculating distance to an object for a system driven using the signals in FIG. 6A or FIG. 14. The method depicted in FIGS. 18-20 incorporates various elements and methods from FIGS. 1-17. For example, the method may be performed by the system 600 sequentially applying control signals c0, c1, c2, c3 from FIG. 6A to a pixel 51 to gather charge through tap A and through tap B of the pixel 51 in order to generate pixel signals p0, p1, p2, p3 and q0, q1, q2, and q3 in FIG. 18. The control signals c0, c1, c2, c3 may be applied globally or in accordance with a phase mosaic arrangement (as in FIG. 6B). FIGS. 6A-9 illustrate a method for calculating a distance to the object 315 based on differences between pixel signals. In FIGS. 18-20, however, the distance to the object 315 may be calculated based on comparisons between selected ones of these pixel signals, as discussed in more detail below.

In the following, pixel values p0, p1, p2, p3 from tap A and q0, q1, q2, q3 from tap B are used. In the case where only one tap (e.g. tap A) is used in the pixel 51, the signal values q0, q1, q2, q3 from tap B can be substituted by a set of pseudo tap B signal values r0, r1, r2, r3 given by:

$$ri = \max(p0, p1, p2, p3) - pi + \min(p0, p1, p2, p3) \quad i=0,1,2,3.$$

FIGS. 18-20 are discussed with reference to an example scenario where light emitted to and reflected from the object 315 incurs a time delay $2T/3$. As shown in FIG. 18, the method determines a region k' by comparing pixel signals (or values of pixel signals) p and q. If p0>q0, then b0 is set to 1. Otherwise, b0 is set to zero. Similar comparison between p1 and q1 produces the value b1, comparison between p2 and q2 produces the value b2, and comparison between p3 and q3 produces the value b3. The values b0, b1, b2 and b3 define a region k' according to the table in FIG. 18, where the region k' is denoted by $b0_{k'}$, $b1_{k'}$, $b2_{k'}$, and $b3_{k'}$. For example, consider the values of p0, p1, p2, p3, q0, q1, q2, and q3 to have the values corresponding to a time delay $2T/3$. The time delay is not known yet and the objective of the decoding algorithm is to determine the time delay from the values p0, p1, ... etc. In this example, p0 is compared to q0, p1 is compared to q1, p2 is compared to q2, and p3 is compared to q3. In each case, if a value of a respective pixel signal p is greater than a value of a respective pixel signal q, then a value of b corresponding to the p/q pair is 1. If not, then the value of b is 0. For the example in FIG. 18, b0=1, b1=1, b2=1, and b3=0, meaning that the determined region k' corresponds to I', as shown in the table.

As further shown in FIG. 18, regions k' (regions A' to L') are offset from regions k (regions A to L in FIGS. 7, 8 and 9) by half of one region. Similar to regions A to L, regions A' to L' each span a same subrange of distances, except that region half of region A' is closest to the camera 310 (before region B') while the other half of region A' is furthest from the camera 310 (after region L'). The span of each subrange may be the same for regions A to L and A' to L'.

As shown in FIG. 19, the system defines a function $f_{k'}$ (region function) for each region k' in operation 1905. The notation in operation(s) 1905 of FIG. 19 will be described with reference to the example in FIG. 18 where b=1110. A function $f_{k'}$ is defined by determining whether a value of b for a region k' is equal to 1 or 0, and then using a value of pixel signal p or a value of pixel q based on the result of that determination. For example, if b=1, then the method uses a value of the pixel signal p, and if b=0, then the method uses a value of the pixel signal q. This method ensures that, for each pair of pixel signals p0/q0, p1/q1, p2/q2, p3/q3, the stronger signal is used for the function $f_{k'}$. Thus, for region I' where b=1110, as in the example described with reference to FIG. 18, the region function $f_{k'}$ is equal to (p0+p1+p2+q3−ambient), where "ambient" is a value that represents ambient light in the system. If b=1010 in FIG. 18, then the region function $f_{k'}$ is equal to (p0+q1+p2+q3−ambient), and so on for other values of b in the table of FIG. 18.

The ambient value in a function $f_{k'}$ may be based on values of selected ones of the pixel signals p and q at a particular time delay. FIG. 20 illustrates equations for obtaining ambient values for each region A' to L'. In the example where b=1110 (i.e., region I'), the equation for determining the ambient value is (p3+q0)/2, where values p3 and q0 are the ones used for determination of the value b. Thus, a function $f_{k'}$ for region I' is equal to (p0+p1+p2+q3−((p3+q0)/2)).

As shown in FIG. 19, the system defines functions for two regions that neighbor (e.g., immediately neighbor) a determined region k'. FIG. 19 illustrates these functions as $f_{(k'+1)mod12}$ and $f_{(k'-1)mod12}$. In the example of FIG. 18 where the determined region is I', $f_{(k'+1)mod12}$ is the function for region J' and $f_{(k'-1)mod12}$ is the function for region H', where each function $f_{(k'+1)mod12}$ and $f_{(k'-1)mod12}$ is determined in the same manner as discussed above with respect to I'.

Upon determining functions $f_{(k'+1)mod12}$ and $f_{(k'-1)mod12}$, the system determines the time delay τ according to the equation shown in FIG. 19. In this equation, T is a period of the modulation frequency used by the system (i.e., T determines a maximum range of the camera 310), and T is the time delay for the light signal s(t) to travel to the object 315 and reflect from the object 315 back to the pixel 51 at issue. The system may calculate the distance δ to the object 315 from the time delay τ by δ=v*τ/2. Here, the equation for calculating for time delay τ is the same regardless of which region k' includes the object 315 (i.e., the calculation is the same for each region k').

Figure 21:
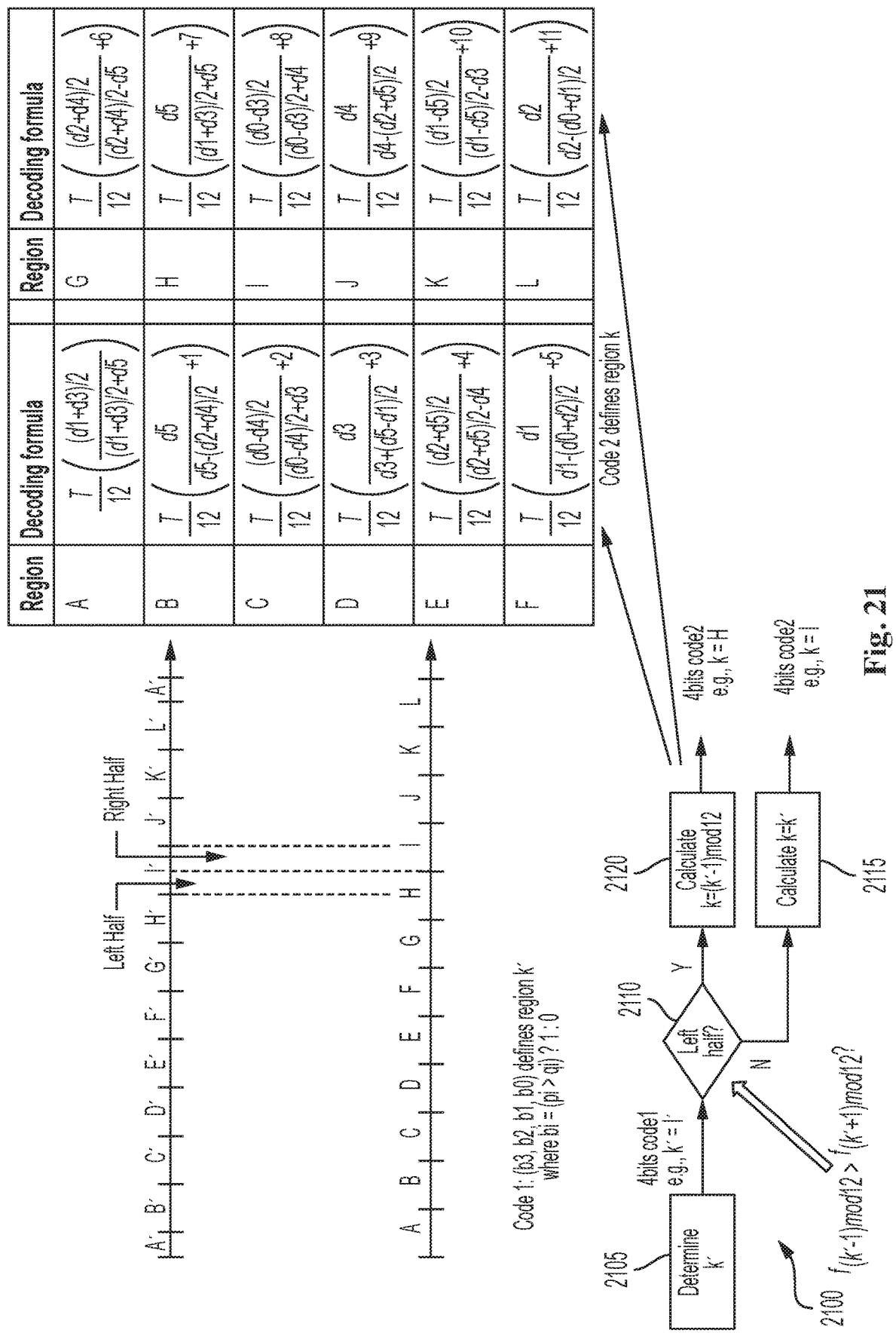
FIG. 21 illustrates various parts of a method for calculating distance to an object according to at least one example embodiment.

FIG. 21 illustrates a method for calculating distance to an object according to at least one example embodiment. In operation 2105, example embodiments according to FIG. 21 determine a region k' and functions $f_{(k'+1)mod12}$ and $f_{(k'-1)mod12}$ in the same manner as that described above with reference to FIGS. 18-20 (e.g., using system 600). However, in FIG. 21, instead of using the equation in FIG. 19 to arrive at the distance to the object 315, the system determines whether the function value $f_{(k'-1)mod12}$ is greater than (or greater than or equal to) function value $f_{(k'+1)mod12}$ (operation 2110). If so, then the object 315 is located in a left half of the region k' and if not, then the object 315 is located in a right half of the region k'. Given that the regions k and k' in FIG. 18 are offset by one half of a region, it is then possible for the system to determine which equation to use for calculating the distance to the object 315 with the table from FIG. 9 for regions A to L (shown again in FIG. 21 for reference, where d0, d1, d2, d3, d4, and d5 are values of difference signals as in FIG. 7). With reference to the example of FIG. 18, where the determined region is I', the system calculating distance to the object 315 according to FIG. 21 determines whether the object 315 is located in the left half of region I' or the right half of region I'. If the object 315 is the right half of region I', then the method determines to use the time delay equation associated with region I (operation 2115). If the object 315 is in the left half of region I', then the method determines to use the equation associated with region H (operation 2120).

Figure 22:
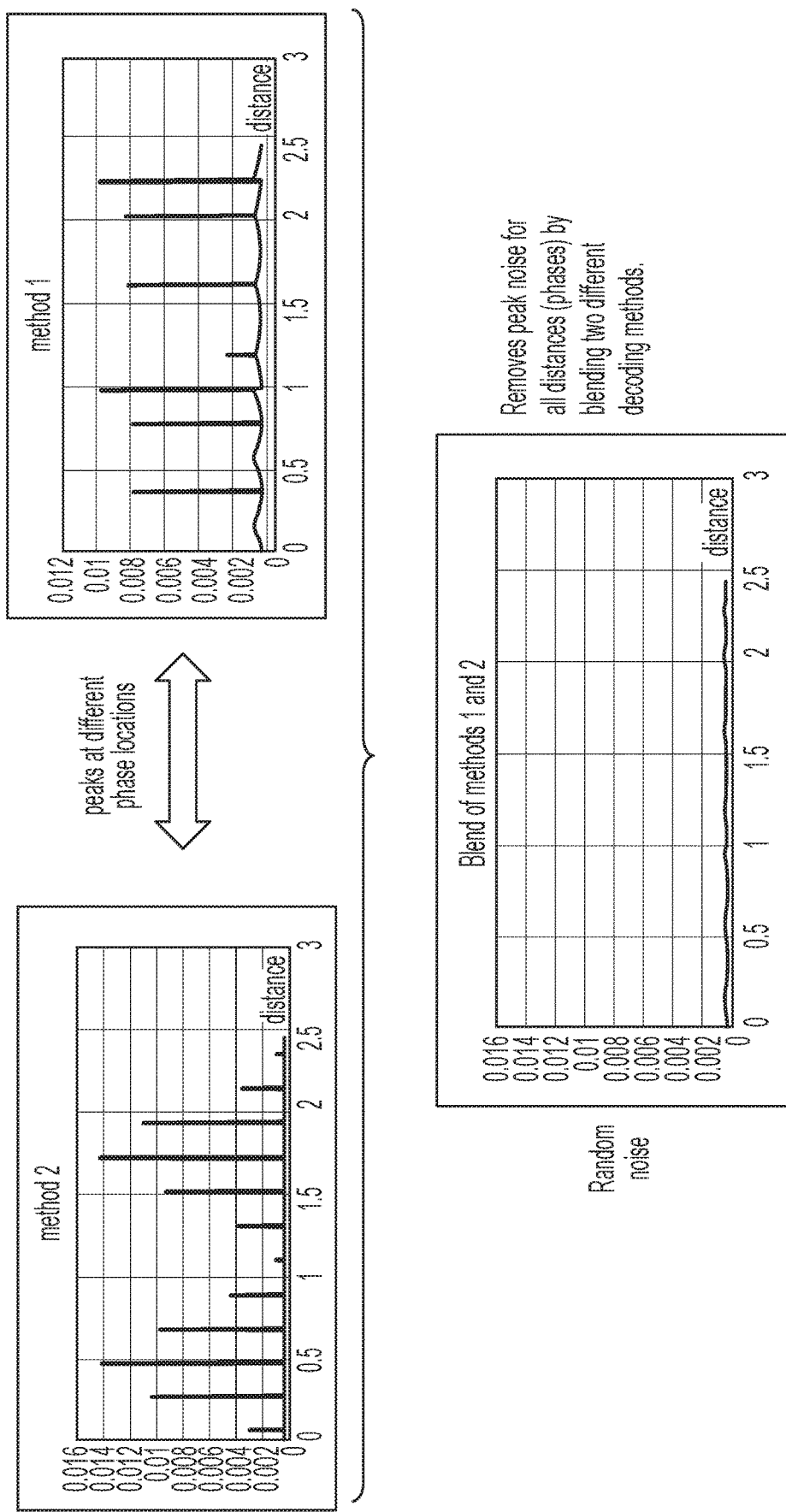
FIG. 22 illustrates noise reduction or elimination according to at least one example embodiment.

Here it should be appreciated that FIGS. 18-21 provide two different methods for calculating a distance to an object based on ToF principles. FIG. 22 illustrates graphs showing noise for a first method 1 (i.e., using one of the equations in FIG. 21) and noise for a second method 2 (i.e., using the equation for τ in FIG. 19). FIG. 22 further illustrates a graph showing noise reduction by blending the two methods as discussed in more detail below.

As shown, noise in each method peaks at different distances from the camera 310. For example, the peaks of noise for method 1 depicted in FIG. 22 tend to occur at boundaries between regions of k (e.g., at the transition between region A and region B) whereas peaks of noise for method 2 tend to occur at boundaries between regions of k' (e.g., at the transition between region A' and region B'). However, such noise peaks may be reduced or eliminated by using one method instead of the other and/or by averaging distances determined by the two methods.

According to at least one example embodiment, the system calculates a first distance to the object using the equation in FIG. 21, and calculates a second distance to the object using the method in FIG. 19. If the first distance is within a threshold amount (e.g., distance) of one of peaks of noise depicted in FIG. 22 for method 1, then the system may determine that the calculation of the first distance may be undesirably affected by noise. If the first distance is not within the threshold amount, then the system may determine that the first distance is sufficiently accurate and output the first distance as the final distance. When the system determines that the first distance is within the threshold amount of one of the peaks of noise, then the system may use the second distance as the final distance. As noted above, method 1 (FIG. 21) uses an equation based on regions k to calculate distance while method 2 (FIG. 19) uses equations associated with regions k' to calculate distance, where regions k' are offset from regions k. Because the regions of k and k' are offset, when the first distance is not sufficiently accurate due to noise, then the second distance should not be affected by such noise because the noise for method 2 does not occur in the same region as the noise for method 1. The above example uses the threshold amount with respect to the first distance, however, example embodiments are not limited thereto and the system may initially calculate the second distance and determine whether the second distance is within a threshold amount of one of the noise peaks in method 2. If so, then the system may use the first distance as the final distance.

If the first distance and the second distance are both not within the threshold amount(s) of the noise peaks depicted in FIG. 22, then the system may calculate the final distance as an average of the first distance and the second distance. For example, the system may calculate a weighted average of the first distance and the second distance. The first and second distances may be weighted according to how close each distance is to a respective noise peak. For example, the first distance may be given a heavier weight than the second distance if the calculated distance results are further away from a noise peak in method 1 than from a noise peak in method 2.

Here, it should be appreciated that example embodiments are not limited to performing the operations discussed with reference to FIG. 22 in the order described above. For example, the system may calculate the second distance using FIG. 19 before calculating the first distance, and determine whether the second distance is sufficiently accurate.

It should be further appreciated that the threshold amount(s) from the noise peaks in FIG. 22 may correspond to a range of distances on either side of a noise peak. For example, if noise tends to peak at a range of 1 m in method 1, then the threshold range of distance may be a desired distance away from 1 m on either side of 1 m (e.g., 0.97 m to 1.03 m). These threshold ranges of distances may be based on empirical evidence and/or design preferences, and may be different for each of methods 1 and 2. In addition, within each method 1 and 2, the threshold ranges may vary for each location where noise peaks. For example, if noise peaks at 1 m and 2 m for method 1, the threshold range of distances may be different for each location of peak noise (e.g., 0.97 m to 1.03 m and 1.95 to 2.05). Such variation may be based on empirical evidence and/or design preferences.

In any event, as shown by the bottom graph in FIG. 22, blending method 1 that uses the equation in FIG. 21 and method 2 from FIG. 19 in the manner described above results in removal of peak noise for all distances within range of the camera 310.

Figure 23:
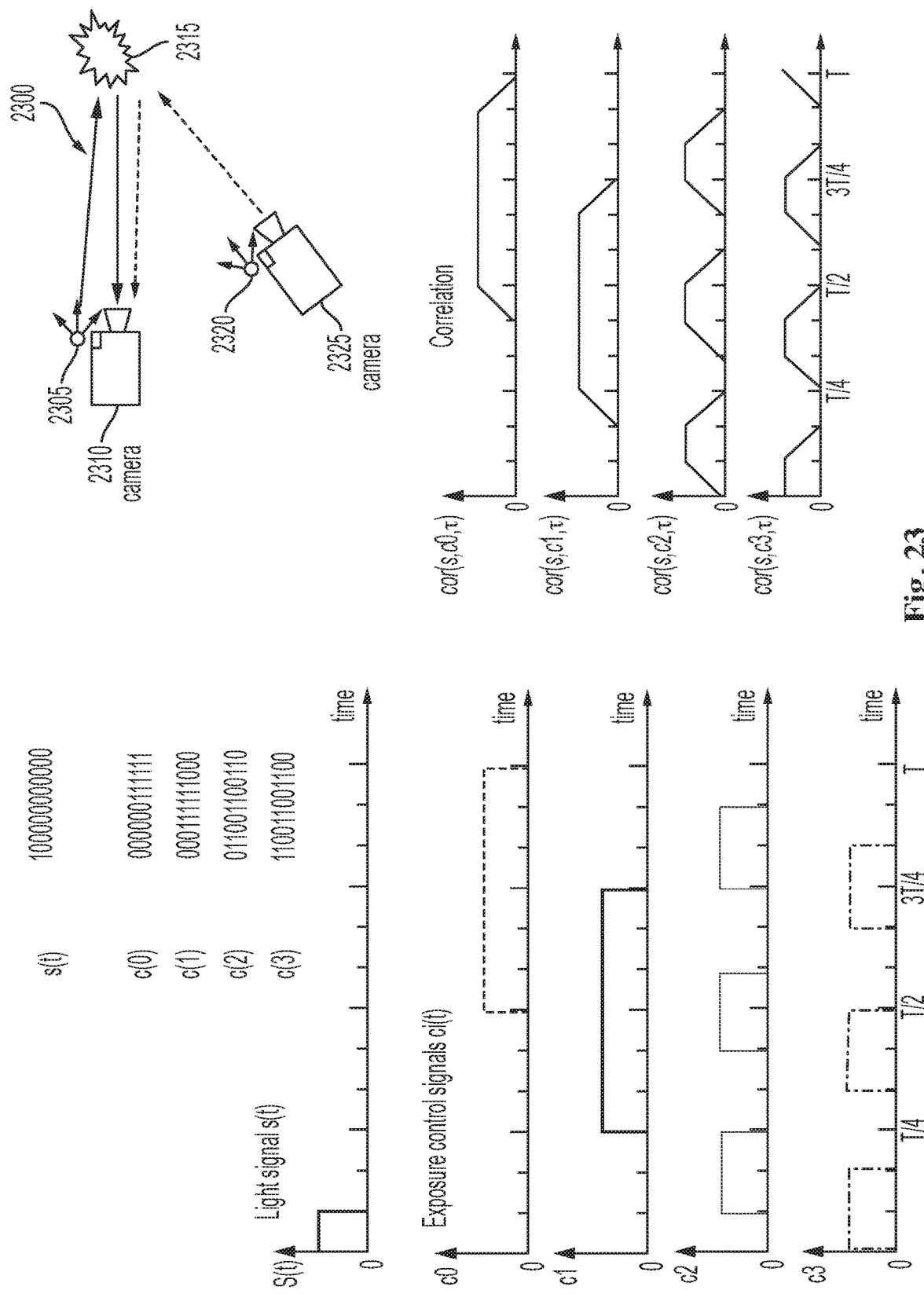
FIG. 23 illustrates a system, correlation signals, and timing diagrams according to at least one example embodiment.

FIG. 23 illustrates a system 2300 and timing diagrams according to at least one example embodiment.

As shown in FIG. 23, the system 2300 includes a light source 2305, a camera 2310, an object 2315, a light source 2320, and a camera 2325. The light sources 2305/2320 may be the same as or similar to the light sources 305, and the cameras 2310 and 2325 may be the same as or similar to camera 310. The system 2300 is a multi-camera system where the light source 2320 may interfere with camera 2310, and where the light source 2305 may interfere with camera 2325. Thus, at least one example embodiment is directed to operating an imaging device 1 within the camera 2310 and/or camera 2325 to reduce or eliminate interference from one or more light sources not associated with that particular camera. Example embodiments will be described with the assumption that it is desired to reduce interface at camera 2310.

FIG. 23 illustrates the light signal s(t), control signals c0, c1, c2, and c3, and correlation signals cor(s,ci,τ) where i=0, 1, 2, 3. As described above, control signals may be applied to a pixel 51 and output can be captured from one or both of taps A and B. For pixel designs that include two taps (taps A and B), control signals c0, c1, c2, and c3 generate correlation signals cor(s,ci,τ) and K−cor(s,ci,τ) where i=0, 1, 2, 3, and where K is a constant that represents the peak value of the correlation between s and ci. FIG. 23 further illustrates binary values for the light signal s(t) and control signals c0, c1, c2, and c3 at each time point (T/12)*(k+0.5) of a modulation cycle where k=0, 1, . . . , 11. As one may appreciate, the control signals c0, c1, c2, and c3 adhere to a fourth order a quasi-Gray code (QGC4) scheme, where neighboring columns of binary values generally differ by one digit, but occasionally differ by two digits (e.g., from the third to the fourth column counting from the left side). The controls signals c0, c1, c2, and c3 generate respective correlation signals cor(s,ci,τ).

Figure 24A:
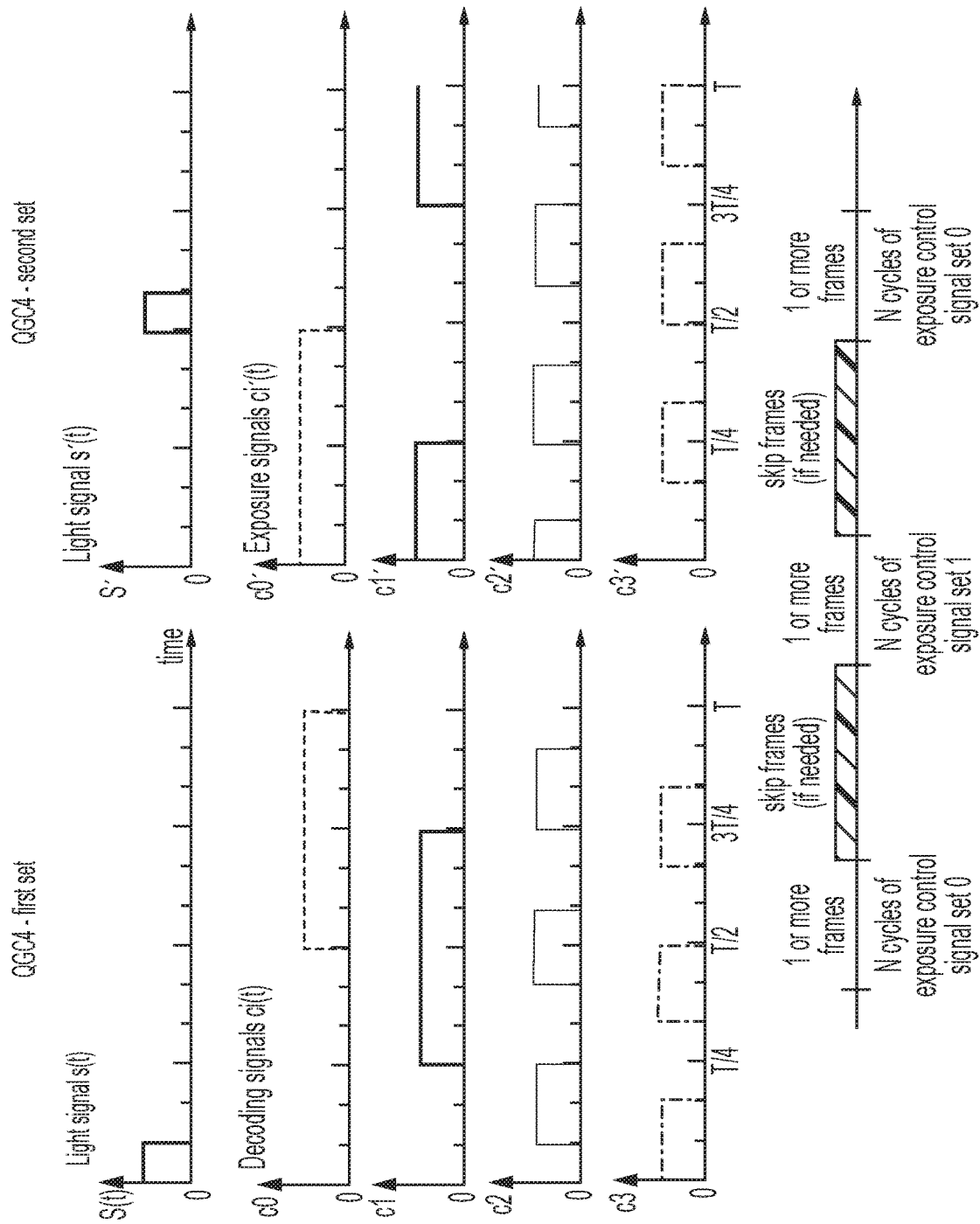
FIG. 24A illustrates time diagrams for two sets of light signals and two sets of control signals according to at least one example embodiment.

FIG. 24A illustrates time diagrams for two sets of light signals and two sets of control signals according to at least one example embodiment.

Figure 24B:
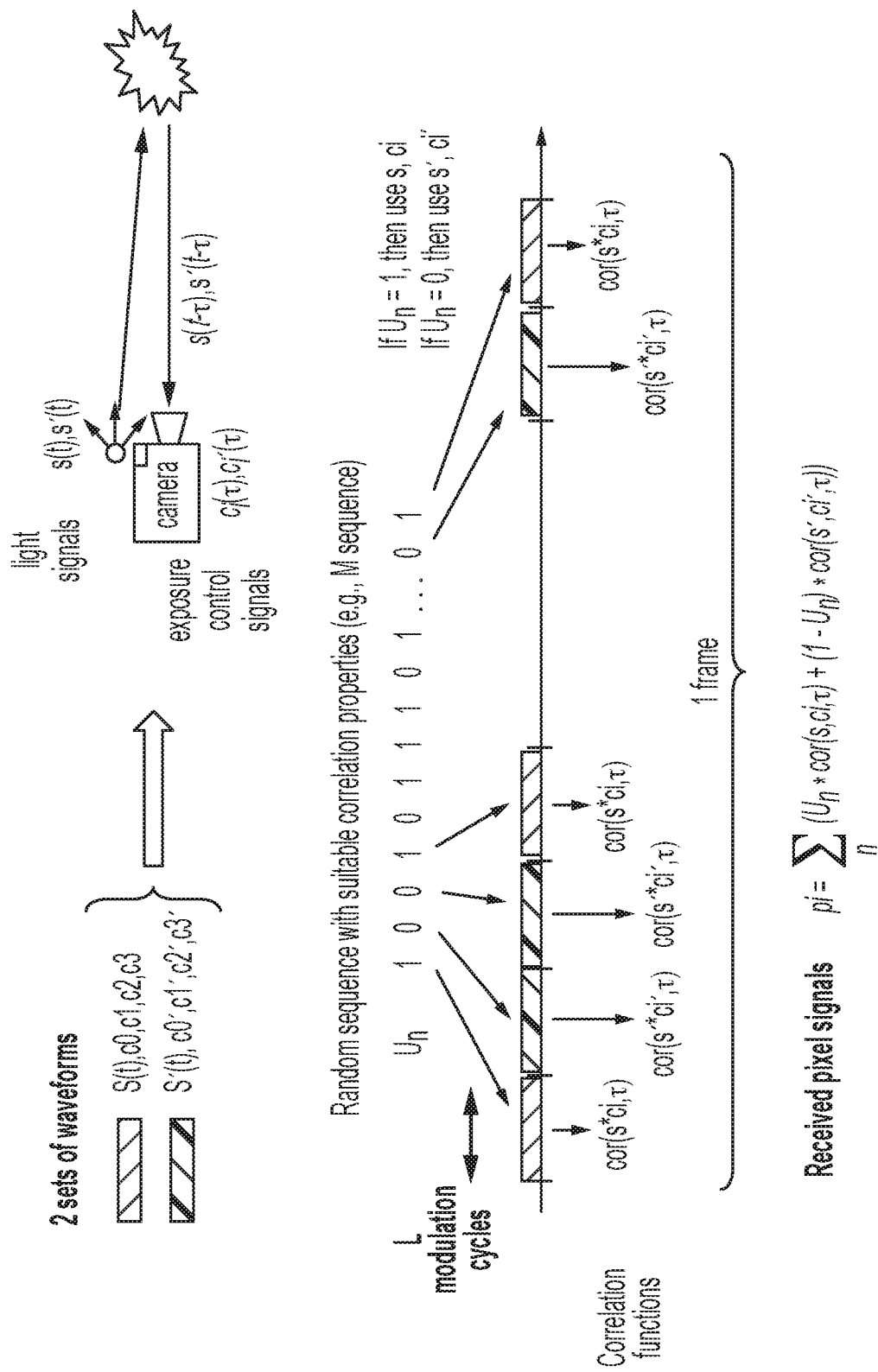
FIG. 24B illustrates a system using two sets of light signals and two sets of control signals according to at least one embodiment.

As shown in FIG. 24A, a first set of light signal s(t) and control signals c0, c1, c2, c3 is the same as in FIG. 23 while a second set of light signal s'(t) and control signals c0', c1', c2', and c3' should satisfy the conditions:

$$cor(s,ci,\tau)=cor(s',ci',\tau)=K-cor(s,ci',\tau)=K-cor(s',ci,\tau)$$

for each i. In the example of FIG. 24A and using a pixel 51 with two taps A and B, applying the first set of control signals c0, c1, c2, c3 to a pixel 51 for a light signal s(t) generates eight correlation signals, four from tap A and four from tap B. Similarly, applying the second set of control signals c0', c1', c2', and c3' for a light signal s'(t) generates another eight correlation signals, four from tap A and four from tap B. As discussed in more detail below, pixel signals (or pixel values) p0, p1, p2, p3, q0, q1, q2, and q3 are measured from these sixteen correlation signals. Here, it should be appreciated that a pixel with a single tap may be used if desired. In this case, the system will take additional time to gather the pixel signals. FIG. 24B shows an embodiment for applying the two sets of light signal and control signals. A pseudo random number generator is included in the signal processor for generating a sequence of random numbers $U_n$ which have values 0 or 1. The pseudo random number is selected so that the random sequence $U_n$ satisfies the condition that:

$$\frac{1}{N}\sum_{k=0}^{N-1}(2*U_n-1)*(2*U_{n+k}-1)=\begin{cases}1, & k=0\\ \sim 1/N, & k\neq 0\end{cases}$$

In other words, the autocorrelation of $U_n$ is small when the shift k is non-zero.

When $U_n$ equals 1, L cycles of the first set of light signal s(t) and control signals c0, c1, c2, c3 are applied. When $U_n$ equals 0, L cycles of the second set of light signal s'(t) and control signals c0', c1', c2', and c3' are applied. In an example embodiment, L may have the value between 4 and 32. This continues for the duration of a frame as shown in FIG. 24B. The pixel 51 integrates a received light signal which results in a pixel signal (or pixel value) equal to pi(τ)=Σ_n(U_n*cor(s, ci, τ)+(1−U_n)*cor(s', ci', τ)) which comprises contributions from the first set of light signal and control signals as well as from the second set of light signal and control signals. Because of the condition cor(s, ci, τ)=cor(s', ci', τ) described above, the received signal is equal to pi(τ)=Σ_n cor(s, ci, τ). The values pi(τ) are measured from the imaging device 1. The random nature of applying the two different sets of signals s(t)/ci(t) and s'(t)/ci'(t) assists with rejecting interference from one or more other cameras.

FIGS. 25-29 each illustrate parts of a method for calculating distance to an object for a system driven using the signals in FIG. 24A. Specifically, FIGS. 25-29 relate to example embodiments where two sets of light signals and two sets of control signals (from FIG. 24A) are applied to a pixel 51.

Figure 25:
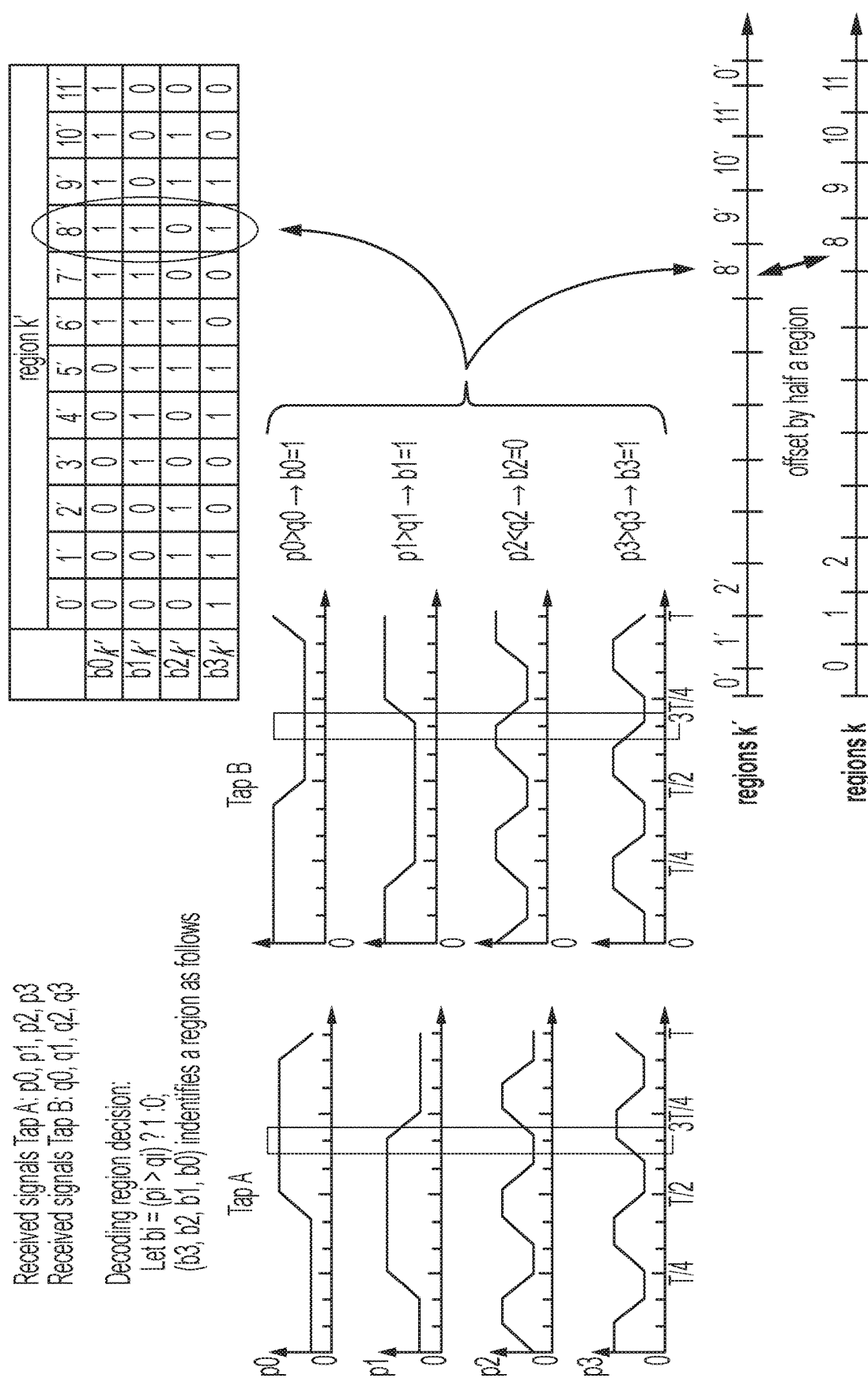
FIG. 25 illustrates parts of a method for calculating distance to an object according to at least one example embodiment.

FIG. 25 illustrates pixel signals p0, p1, p2, p3 received through tap A integrated according to the equation above (and repeated the bottom of FIG. 24B). FIG. 25 further illustrates pixel signals q0, q1, q2, and q3 received through tap B and integrated in the same manner as pixel signals p0 to p3 using the equation at the bottom of FIG. 24B for qi(τ). FIG. 25 is similar to FIG. 18 in that pixel signals p0, p1, p2, and p3 are compared to pixel signals q0, q1, q2, and q3, respectively, to obtain values of b (i.e., if p is greater than q, then b=1, and if not, then b=0). In FIG. 25, regions k include regions 0 to 11 while regions k' include regions 0' to 11'. Similar to FIG. 18, regions k and k' in FIG. 25 are offset from one another by one half of a region. In addition, each region 0 to 11 and 0' to 11' may span a same sub-range of distances within a maximum range of the camera 2310.

According to at least one example embodiment, the system 2300 defines a function $f_{k'}$ (region function) for each region k' in the same manner as that described with reference to FIG. 19, where for region 8' in FIG. 25 having b equal 1101, $f_{k'}$ for region 8' is equal to (p0+p1+q2+p3−ambient). However, the ambient value in function $f_{k'}$ for the system 2300 is defined as shown in the table of FIG. 26, where each region k' has a corresponding ambient value. In the case of region 8', the ambient value is q0.

The system 2300 then defines functions as $f_{(k'+1)mod12}$ and $f_{(k'-1)mod12}$ in the same manner as that described above with respect to FIG. 19. In the example of FIG. 25 where the determined region is 8', $f_{(k'+1)mod12}$ is the function for region 9' and $f_{(k'-1)mod12}$ is the function for region 7', and each function $f_{(k'+1)mod12}$ and $f_{(k'-1)mod12}$ is determined in the same manner as discussed above with respect to FIG. 19. Upon determining functions $f_{(k'+1)mod12}$ and $f_{(k'-1)mod12}$, the system 2300 determines in which half of the region k' the object 2315 is located.

Figure 27:
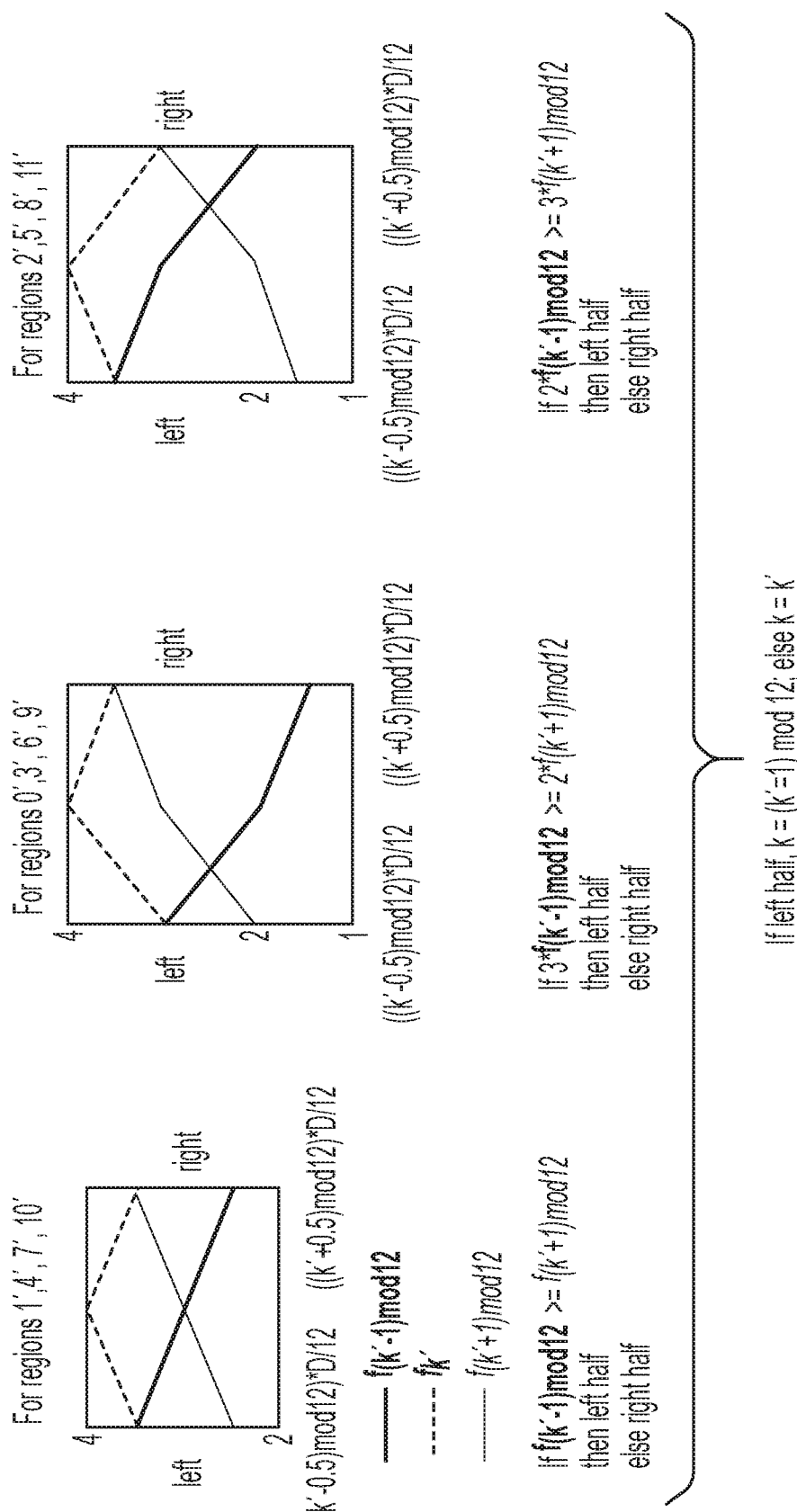
FIG. 27 illustrates parts of a method for calculating distance to an object according to at least one example embodiment.

FIG. 27 illustrates equations for determining which half of a region k' the object 2315 is located using $f_{(k'+1)mod12}$ and $f_{(k'+1)mod12}$ as determined above. As shown, the comparison of $f_{(k'+1)mod12}$ and $f_{(k'-1)mod12}$ is different depending on which region k' is determined in FIG. 25. For example, for regions 1', 4', 7', and 10', if and $f_{(k'-1)mod12}$ is greater than or equal to $f_{(k'+1)mod12}$, then the object 2315 is determined to be in the left half of the region. If not, then the object 2315 is determined to be in the right half of the region. For regions 0', 3', 6', and 9', if $3*f_{(k'-1)mod12}$ is greater than or equal to $2*f_{(k'+1)mod12}$, then the object 2315 is determined to be in the left half of the region. If not, then the object 2315 is determined to be in the right half the region. For regions 2', 5', 8', and 11', if $2*f_{(k'-1)mod12}$ is greater than or equal to $3*f_{(k'+1)mod12}$, then the object 2315 is determined to be in the left half of the region. If not, the object 2315 is determined to be in the right half of the region.

FIG. 28 illustrates equations for determining a time delay τ depending on the outcome of the comparison between $f_{(k'-1)mod12}$ and $f_{(k'+1)mod12}$ in FIG. 27 for the region k' determined in FIG. 25. The time delay τ may be used to calculate the distance to the object with the same equation as that described above.

Figure 29:
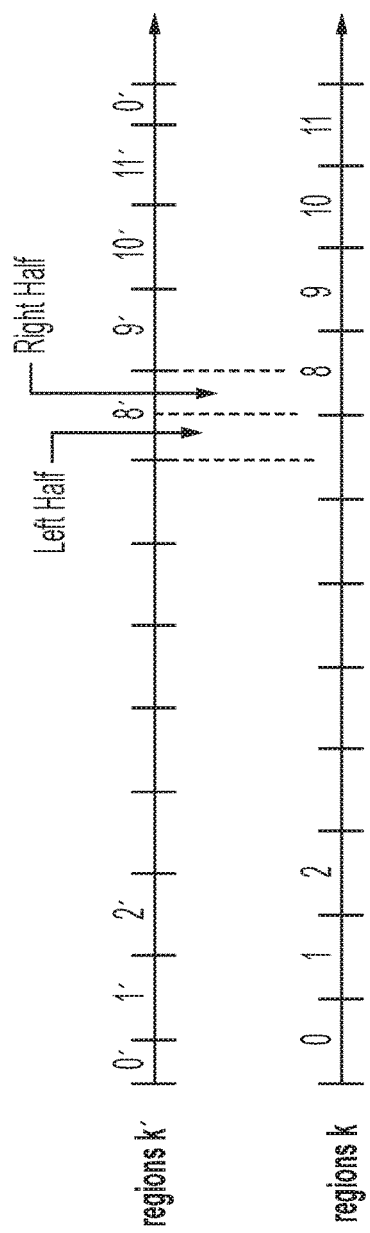
FIG. 29 illustrates parts of a method for calculating distance to an object according to at least one example embodiment.

FIG. 29 illustrates a method for selecting a time delay equation used for calculating a distance to the object for regions k from 0 to 11 in FIG. 25 according to at least one example embodiment. In FIG. 23, the system 2300 determines whether the object 2315 is in a left half or a right half of a region k' according to the equations in FIG. 27. As shown in FIG. 29 and with reference to the example in FIG. 25 where the region k' is region 8', if the determination in FIG. 27 is that the object 2315 is in a left half of region 8', then the system 2300 determines to use the time delay equation associated with region 7 in FIG. 29. If the object 2315 is in a right half of the region 8', then the system 2300 determines to use the time delay equation associated with region 8 in FIG. 29.

Here, it should be appreciated that FIGS. 23-29 illustrate two different methods for calculating a distance to an object, where multi-camera interference may be reduced or eliminated, thereby improving an accuracy of the distance calculation. One method is outlined in FIGS. 23-28 and uses the time delay equations in FIG. 28, while the other method is described with respect to FIGS. 23-27 and 29 and uses the time delay equations in FIG. 29.

Example embodiments will now be described with reference to FIGS. 1-29. According to at least one example embodiment, an imaging device 1 includes a pixel section 20 having a plurality of pixels 51, and a signal processor (e.g., one or more of 21, 22, 23, 24, 25, and 31) configured to apply control signals ci(t) to the pixel section 20 according to a Gray code coding scheme to generate a first pixel signal p0, a second pixel signal p1, and a third pixel signal p2 based on light reflected from an object 315. The signal processor is configured to calculate a distance to the object 315 based on the first pixel signal p0, the second pixel signal p1, and the third pixel signal p2.

The control signals include first, second, and third control signals c0, c1, and c2. The signal processor is configured to apply the first control signal c0 to a first pixel 51 of the plurality of pixels during a first time period to generate the first pixel signal p0, apply the second control signal c1 to the first pixel 51 during a second time period to generate the second pixel signal p1, and apply the third control signal c2 to the first pixel 51 during a third time period to generate the third pixel signal p2.

In at least one example embodiment, the control signals include a fourth control signal c3, and the signal processor is configured to apply the fourth control signal c3 to the first pixel 51 during a fourth time period.

The plurality of pixels includes first, second, and third pixels, and the signal processor is configured to apply the first control signal c0 to the first pixel during a first time period to generate the first pixel signal p0, apply the second control signal c1 to the second pixel during the first time period to generate the second pixel signal p1, and apply the third control signal c2 to the third pixel during the first time period to generate the third pixel signal p2. This sequence may correspond to one of the phase mosaic arrangements illustrated in FIG. 4.

In at least one example embodiment, the control signals include a fourth control signal c3, and the plurality of pixels includes a fourth pixel. In this case, the signal processor is configured to apply the fourth control signal c3 to the fourth pixel during the first time period to generate a fourth pixel signal p3 (see, for example, the mosaic arrangements of FIG. 6B).

According to at least one example embodiment, the signal processor is configured to calculate the distance to the object based on differences between the first, second, and third pixel signals p0, p1, and p2. The differences include a difference d0 between the first pixel signal p0 and the second pixel signal p1, a difference d1 between the second pixel signal p1 and the third pixel signal p2, and a difference d2 between the third pixel signal p2 and the first pixel signal p0 (see, e.g., FIG. 5). As shown in FIG. 5, for example, the signal processor is configured to determine a region (A, B, C, D, E, or F) in which the object 315 is located based on signs of the differences, and the signal processor is configured to calculate the distance to the object 315 using an equation that is associated with the determined region.

According to at least one example embodiment (see FIGS. 6A and 6B, for example), the signal processor is configured to apply the control signals c0, c1, c2, c3 to the pixel section generate the first pixel signal p0, the second pixel p1, and the third pixel signal p2, and a fourth pixel signal p3 based on the light reflected from the object 315. The signal processor is configured to calculate the distance to the object 315 based on the first pixel signal p0, the second pixel signal p1, the third pixel signal p2, and the fourth pixel signal p3. For example, the signal processor is configured to calculate the distance to the object 315 based on differences between the first, second, third pixel, and fourth signals. The differences include a difference d0 between the first pixel signal p0 and the second pixel signal p1, a difference d1 between the first pixel signal p0 and the third pixel signal p3, a difference d2 between the first pixel signal p0 and the fourth pixel signal p3, a difference d3 between the second pixel signal p1 and the third pixel signal p2, a difference d4 between the second pixel signal p1 and the fourth pixel signal p3, and a difference d5 between the third pixel signal p2 and the fourth pixel signal p4. As shown in FIG. 7, for example, the signal processor is configured to determine a region from among a plurality of regions (A thru L) in which the object 315 is located based on the differences. The signal processor is configured to calculate the distance to the object 315 using an equation that is associated with the determined region. According to at least one example embodiment, a number of the plurality of regions is equal to twelve (A thru L).

At least one example embodiment is directed to an imaging device 1 including a pixel section 20 including a plurality of pixels 51, and a signal processor configured to apply binary control signals ci(t) to the pixel section 20 according to a coding scheme to generate pixel signals based on light reflected from an object 315. The signal processor is configured to calculate a distance to the object based on differences between the pixel signals. In at least one example embodiment, the binary control signals include first, second, and third control signals c0, c1, c2, and the pixel signals include first, second, and third pixel signals p0, p1, and p2.

In at least on example embodiment, the binary control signals include first, second, third, and fourth control signals c0, c1, c2, c3, and the pixel signals include first, second, third, and fourth pixel signals p0, p1, p2, and p3.

At least one example embodiment is directed to a system that includes a light source 305 configured to emit modulated light, and an imaging device 1 including a pixel section 20 including a plurality of pixels, and a signal processor. The signal processor is configured to apply binary control signals ci(t) to the pixel section according to a Gray code coding scheme to generate pixel signals pi based on the modulated light reflected from an object 315, and calculate a distance to the object based on differences di between the pixel signals pi.

In view of FIGS. 1-29, it should be appreciated that at least one example embodiment is directed to an imaging device 1 including a pixel 51, and a signal processor (e.g., one or more of 21, 22, 23, 24, 25, and 31) configured to apply a first set of control signals ci(t) to the pixel 51 (e.g., to node VGA and/or node VGB) to generate a first pixel signal p0, a second pixel signal p1, a third pixel signal p2, and a fourth pixel signal p3 based on light reflected from an object 315. The signal processor is configured to apply a second set of control signals (e.g., signals that are complements to the first set of control signals like ci'(t)) to the pixel 51 to generate a fifth pixel signal q0, a sixth pixel signal q1, a seventh pixel signal q2, and an eighth pixel signal q3 based on the light reflected from the object 315 (see, e.g., FIG. 10). The signal processor is configured to calculate a distance to the object 315 based on comparisons between selected ones of the first, second, third, fourth, fifth, sixth, seventh, and eighth pixel signals p0 to p3 and q0 to q3.

According to at least one example embodiment, the first set of control signals ci(t) include first, second, third, and fourth control signals c0, c1, c2, and c3 that generate the first, second, third, and fourth pixel signals p0, p1, p2, and p3, respectively. The second set of control signals ci'(t) include fifth, sixth, seventh, and eighth control signals c0', c1', c2', and c3' that generate the fifth, sixth, seventh, and eighth pixel signals q0, q1, q2, and q3, respectively.

According to at least one example embodiment, the fifth, sixth, seventh, and eighth control signals c0', c1', c2', and c3' are opposite in polarity to the first, second, third, and fourth control signals c0, c1, c2, and c3, respectively.

According to at least one example embodiment, first set of control signals ci(t) and the second set of control signals ci'(t) adhere to a Gray code coding scheme.

According to at least one example embodiment, the signal processor is configured to determine a first region from among a first set of regions A' thru L' in which the object 315 resides based on the comparisons.

According to at least one example embodiment, the comparisons include a first comparison between the first pixel signal p0 and the fifth pixel signal q0, a second comparison between the second pixel signal p1 and the sixth pixel signal q1, a third comparison between the third pixel signal p2 and the seventh pixel signal q2, and a fourth comparison between the fourth pixel signal p3 and the eighth pixel signal q3 (see, e.g., FIG. 18).

According to at least one example embodiment, the signal processor is configured to define a first function $f_{(k'+1) mod 12}$ for a second region in the first set of regions A' thru L' that neighbors the first region, and define a second function $f_{(k'-1) mod 12}$ for a third region in the first set of regions A' thru L' that neighbors the first region.

According to at least one example embodiment, the first function $f_{(k'+1) mod 12}$ and the second function $f_{(k'-1) mod 12}$ each include an ambient value that is based on selected ones of the first through eighth pixel signals (see, e.g., FIG. 20). For example, the ambient value for the first function $f_{(k'+1) mod 12}$ is calculated based on a first equation associated with the second region, and the ambient value for the second function $f_{(k'-1) mod 12}$ is calculated based on a second equation associated with the third region.

According to at least one example embodiment, the defined first and second functions $f_{(k'+1) mod 12}$ and $f_{(k'-1) mod 12}$ include values of selected ones of the first through eighth pixel signals p0 to p3 and q0 to q3.

According to at least one example embodiment, the signal processor is configured to calculate the distance to the object 315 based on an equation that uses the first function and the second function (see, e.g., FIG. 19).

According to at least one example embodiment, the signal processor is configured to compare the first function $f_{(k'+1) mod 12}$ to the second function $f_{(k'-1) mod 12}$, and determine a region in a second set of regions A thru L in which the object 315 resides based on the comparison of the first function $f_{(k'+1) mod 12}$ to the second function $f_{(k'-1) mod 12}$.

According to at least one example embodiment, the first set of regions A' thru L' and the second set of regions A thru L represent sub-ranges within a maximum range of the imaging device 1.

According to at least one example embodiment, the first set of regions A' thru L' is offset from the second set of regions A thru L within the maximum range.

According to at least one example embodiment, a number regions in each of the first set of regions A' thru L' and the second set of regions A thru L is equal to twelve.

According to at least one example embodiment, the signal processor is configured to calculate the distance to the object 315 using an equation associated with the determined region in the second set of regions A thru L (see FIG. 21).

At least one example embodiment is directed to an imaging device 1 that includes a pixel 51, and a signal processor configured to apply a first set of control signals $ci(t)$ to the pixel 51 to generate a first pixel signal p0, a second pixel signal p1, a third pixel signal p2, and a fourth pixel signal p3 to p3, based on light reflected from an object 315. The signal processor is configured to apply a second set of control signals (e.g., generated with the first set of control signals by an inverter to achieve signals $ci'(t)$) to the pixel 51 to generate a fifth pixel signal q0, a sixth pixel signal q1, a seventh pixel signal q2, and an eighth pixel signal q3. The signal processor is configured to calculate a first distance to the object 315 using a first method (see FIG. 21), and calculate a second distance to the object 315 using a second method (see FIG. 19) different than the first method. The signal processor is configured to determine a final distance to the object 315 based on the first distance and the second distance.

According to at least one example embodiment, the first method includes determining a region from among a first set of regions A thru L in which the object 315 is located, and the second method includes determining a region from among a second set of regions A' thru L' in which the object 315 is located. The signal processor determines the final distance from the first distance and the second distance.

According to at least one example embodiment, the signal processor determines the final distance as the first distance when the second distance is within a first threshold distance of a border of the region in the second set of regions A' thru L'. The signal processor determines the final distance as the second distance when the first distance is within a second threshold distance of a border of the region in the first set of regions A thru L. The signal processor is configured to determine the final distance as a weighted average of the first distance and the second distance when the first distance is not within the first threshold distance of the border of the region in the first set of regions A thru L, and the second distance is not within the second threshold distance of the border of the region in the second set of regions A' thru L'.

At least one example embodiment is directed to a system including a light source 305 configured to emit modulated light, and an imaging device 1. The imaging device 1 includes a pixel 51, and a signal processor configured to apply a first set of control signals $ci(t)$ to the pixel 51 to generate a first pixel signal p0, a second pixel signal p1, a third pixel signal p2, and a fourth pixel signal p3 based on the modulated light reflected from an object 315. The signal processor is configured to apply a second set of control signals ($ci'(t)$) to the pixel 51 to generate a fifth pixel signal q0, a sixth pixel signal q1, a seventh pixel signal q2, and an eighth pixel signal q3 based on the modulated light reflected from the object. The signal processor is configured to calculate a distance to the object based on comparisons between selected ones of the first, second, third, fourth, fifth, sixth, seventh, and eighth pixel signals p0 to p3 and q0 to q3.

At least one example embodiment is directed to an imaging device 1 including a pixel 51, and a signal processor configured to randomly apply a first set of signals including a first driving signal $s(t)$ applied to a first light source 2305, and a first set of control signals $ci(t)$ applied to the pixel 51 that adhere to a quasi-Gray code scheme to generate first through eighth correlation signals based on light output from the first light source 2305 according to the first driving signal $s(t)$ and reflected from an object 2315. The signal processor is configured to randomly apply a second set of signals including a second driving signal $s'(t)$ applied to the first light source 2305, and a second set of control signals $ci'(t)$ applied to the pixel 51 that adhere to the quasi-Gray code scheme to generate ninth through sixteenth correlation signals based on light output from the first light source 2305 according to the second driving signal $s'(t)$ and reflected from the object 2315. The signal processor is configured to measure first through eighth pixel signals p0 to p3 and q0 to q3 based on the first through sixteenth correlation signals, and calculate a distance to the object 2315 based on the first through eighth pixel signals p0 to p3 and q0 to q3 (see FIGS. 23-29).

According to at least one example embodiment (see, e.g., FIG. 24B), the signal processor is configured to randomly apply the first set of signals and the second set of signals by generating a random sequence of binary bit values, applying a pre-determined number of cycles of the first light signal $s(t)$ and the first set of control signals $ci(t)$ when a bit of the binary random sequence equals a first value (e.g., 1), and applying a pre-determined number of cycles of the second light signal $s'(t)$ and the second set of control signals $ci'(t)$ when a bit of the binary random sequence equals a second value (e.g., 0).

According to at least one example embodiment, the second driving signal $s'(t)$ and the second set of control signals $ci'(t)$ are related to the first driving signal s and the first set of control signals $ci'(t)$ by the relationship $cor(s, ci, \tau) = cor(s', ci', \tau) = K - cor(s, ci', \tau) = K - cor(s', ci, \tau)$, where K is a constant representing a peak value of a correlation between s and ci, and $\tau$ is a time delay between a time light is output from the first light source 2305 and a time reflected light is received.

According to at least one example embodiment, the first set of control signals $ci(t)$ include first through fourth control signals c0, c1, c2, and c3 that generate the first through eighth correlation signals, respectively, and the second set of controls signals $ci'(t)$ include fifth through eighth control signals c0', c1', c2', and c3' that generate the ninth through sixteenth correlation signals, respectively.

According to at least one example embodiment, the signal processor is configured to determine a first region from among a first set of regions 0' thru 11' in which the object resides based on comparisons between selected ones of the first through eighth pixel signals p0 to p3 and q0 to q3.

According to at least one example embodiment, the comparisons include a first comparison between the first pixel signal p0 and the fifth pixel signal q0, a second comparison between the second pixel signal p1 and the sixth pixel signal q1, a third comparison between the third pixel signal p2 and the seventh pixel signal q2, and a fourth comparison between the fourth pixel signal p3 and the eighth pixel signal q3.

According to at least one example embodiment, the signal processor is configured to define a first function $f_{(k'+1) mod 12}$ for a second region in the first set of regions 0' thru 11' that neighbors the first region, and define a second function $f_{(k'-1)mod12}$ for a third region in the first set of regions 0' thru 11' that neighbors the first region.

According to at least one example embodiment, the first function $f_{(k'+1)mod12}$ and the second function $f_{(k'-1)mod12}$ each include an ambient value that is based on selected ones of the first through eighth pixel signals p0 to p3 and q0 to q3 (see FIG. 26).

According to at least one example embodiment, the ambient value for the first function $f_{(k'+1)mod12}$ is calculated based on a first equation associated with the second region, and the ambient value for the second function $f_{(k'-1)mod12}$ is calculated based on a second equation associated with the third region.

According to at least one example embodiment, the defined first and second functions $f_{(k'+1)mod12}$ and $f_{(k'-1)mod12}$ include selected ones of the first through eighth pixel signals p0 to p3 and q0 to q3.

According to at least one example embodiment, the signal processor is configured to calculate the distance to the object 2315 based on an equation that uses the first function $f_{(k'+1)mod12}$ and the second function $f_{(k'-1)mod12}$ (see, e.g., FIG. 28).

According to at least one example embodiment, the signal processor is configured to compare the first function $f_{(k'+1)mod12}$ to the second function $f_{(k'-1)mod12}$, and determine a region in a second set of regions 0 thru 11 in which the object 2315 resides based on the comparison of the first function $f_{(k'+1)mod12}$ to the second function $f_{(k'-1)mod12}$ (see, e.g., FIG. 29)

According to at least one example embodiment, the first set of regions 0' thru 11' and the second set of regions 0 thru 11 represent sub-ranges within a maximum range of the imaging device 1.

According to at least one example embodiment, the first set of regions 0' thru 11' is offset from the second set of regions 0 thru 11 within the maximum range. According to at least one example embodiment, a number regions in each of the first set of regions and the second set of regions is equal to twelve.

According to at least one example embodiment, the signal processor is configured to calculate the distance to the object 2315 using an equation associated with the determined region in the second set of regions 0 thru 11 (see FIG. 29).

At least one example embodiment is directed to a system including a first light source 2305, a second light source 2320, and a first imaging device (e.g., of camera 2310) including a first pixel 51, and a first signal processor configured to randomly apply a first set of signals including a first driving signal applied to the first light source 2305, and a first set of control signals ci(t) applied to the first pixel 51 that adhere to a quasi-Gray code scheme to generate a first group of correlation signals based on light output from the first light source 2305 according to the first driving signal s(t) and reflected from an object 2315. The signal processor is configured to randomly apply a second set of signals including a second driving signal s'(t) applied to the first light source 2305, and a second set of control signals ci'(t) applied to the first pixel 51 that adhere to the quasi-Gray code scheme to generate a second group of correlation signals based on light output from the first light source 2305 according to the second driving signal s'(t) and reflected from the object 2315. The signal processor is configured to measure a first group of pixel signals p0 to p3 and q0 to q3 based on the first and second groups of correlation signals, and calculate a distance to the object based on the first group of pixel signals. The system includes second imaging device 1 (e.g., of camera 2325) including a second pixel 51, and a second signal processor configured to randomly apply a third set of signals including a third driving signal s(t) applied to the second light source 2320, and a third set of control signals ci(t) applied to the second pixel 51 that adhere to the quasi-Gray code scheme to generate a third group of correlation signals based on light output from the second light source 2320 according to the third driving signal s(t) and reflected from the object 2315. The second signal processor is configured to randomly apply a fourth set of signals including a fourth driving signal s'(t) applied to the second light source 2320, and a fourth set of control signals ci'(t) applied to the second pixel 51 that adhere to the quasi-Gray code scheme to generate a fourth group of correlation signals based on light output from the second light source 2320 according to the fourth driving signal s'(t) and reflected from the object 2315. The second signal processor is configured to measure a second group of pixel signals p0 to p3 and q0 to q3 based on the third and fourth groups of correlation signals, and calculate a distance to the object 2315 based on the second group of pixel signals.

According to at least one example embodiment, the first set of control signals include first, second, third, and fourth control signals c0, c1, c2, and c3 that generate the first group of correlation signals, and the second set of control signals include fifth, sixth, seventh, and eighth control signals c0', c1', c2', and c3' that generate the second group of correlation signals.

According to at least one example embodiment, waveforms of the first set of control signals and the third set of control signals are the same, and waveforms of the second set of control signals and the fourth set of control signals are the same.

At least one example embodiment is directed to a system including a first light source 2305, a second light source 2320, and a first imaging device 1 to determine a first distance to a first object 2315 by randomly applying a first set of control signals c(t) and a second set of control signals c'(t) that adhere to a quasi-Gray code scheme, and calculating the first distance to the first object 2315 from a first group of pixel signals measured from the first imaging device 1 according to the first and second sets of control signals c(t) and ci'(t). The system includes a second imaging device 1 to determine a second distance to a second object by randomly applying a third set of control signals c(t) and a fourth set of control signals ci'(t) that adhere to the quasi-Gray code scheme, and calculating the second distance to the second object based on a second group of pixel signals measured from the second imaging device 1 according to the third and fourth sets of control signals c(t) and ci(t).

Figure 30:
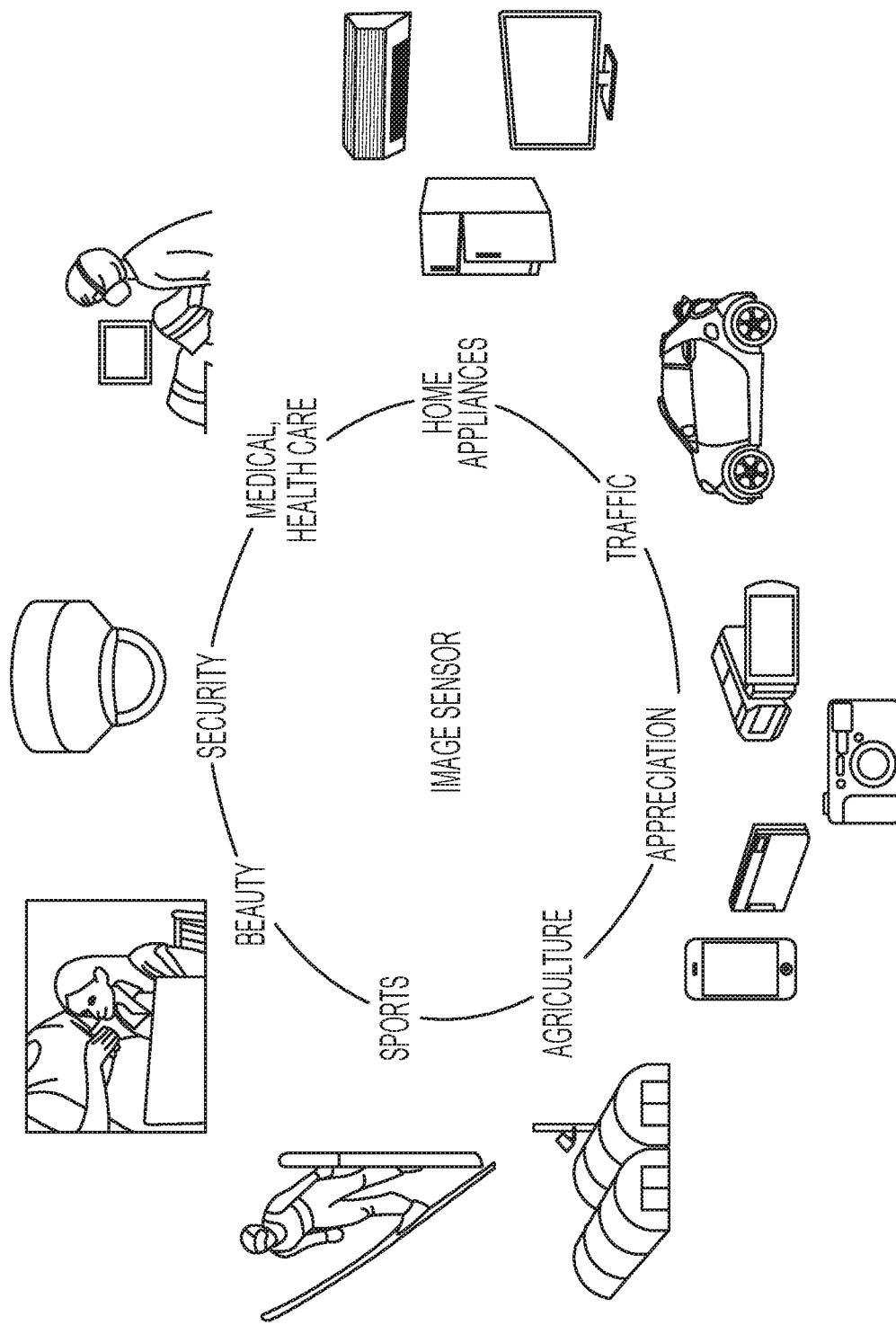
FIG. 30 is a diagram illustrating use examples of an imaging device according to at least one example embodiment.

FIG. 30 is a diagram illustrating use examples of an imaging device 1 according to at least one example embodiment.

For example, the above-described imaging device 1 (image sensor) can be used in various cases of sensing light such as visible light, infrared light, ultraviolet light, and X-rays as described below. The imaging device 1 may be included in apparatuses such as a digital still camera and a portable device with a camera function which capture images, apparatuses for traffic such as an in-vehicle sensor that captures images of a vehicle to enable automatic stopping, recognition of a driver state, measuring distance, and the like. The imaging device 1 may be included in apparatuses for home appliances such as a TV, a refrigerator, and an air-conditioner in order to photograph a gesture of a user and to perform an apparatus operation in accordance with the gesture. The imaging device 1 may be included in apparatuses for medical or health care such as an endoscope and an apparatus that performs angiography through reception of infrared light. The imaging device 1 may be included in apparatuses for security such as a security monitoring camera and a personal authentication camera. The imaging device 1 may be included in an apparatus for beauty such as a skin measuring device that photographs skin. The imaging device 1 may be included in apparatuses for sports such as an action camera, a wearable camera for sports, and the like. The imaging device 1 may be included in apparatuses for agriculture such as a camera for monitoring a state of a farm or crop.

In view of the above, it should be appreciated that example embodiments provide imaging devices that use binary functions for light signals and detection control signals (avoiding use of an analog multiplier). In addition, example embodiments provide differential decoding methods (using differences in pixel values) to reject ambient light, and also provide noise cancellation and SNR improvements, all of which improve the accuracy of calculations when determining a distance to an object. Example embodiments further provide for multi-camera interference rejection. Example embodiments may be combined with one another in any manner if desired. In addition, operations discussed above with reference to the figures may be performed in an order different than that described with departing from the scope of inventive concepts.

Any signal processors, processing devices, control units, processing units, etc. discussed above may correspond to one or many computer processing devices, such as a Field Programmable Gate Array (FPGA), an Application-Specific Integrated Circuit (ASIC), any other type of Integrated Circuit (IC) chip, a collection of IC chips, a microcontroller, a collection of microcontrollers, a microprocessor, Central Processing Unit (CPU), a digital signal processor (DSP) or plurality of microprocessors that are configured to execute the instructions sets stored in memory.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

In view of the above, one may appreciate that example embodiments described herein may be combined in any manner without limitation. Example embodiments may be configured according to the following:

(1) An imaging device, comprising:
a pixel section including a plurality of pixels; and
a signal processor configured to:
apply control signals to the pixel section according to a Gray code coding scheme to generate a first pixel signal, a second pixel signal, and a third pixel signal based on light reflected from an object; and
calculate a distance to the object based on the first pixel signal, the second pixel signal, and the third pixel signal.

(2) The imaging device of (1), wherein the control signals include first, second, and third control signals.

(3) The imaging device of one or more of (1) to (2), wherein the signal processor is configured to apply the first control signal to a first pixel of the plurality of pixels during a first time period to generate the first pixel signal, apply the second control signal to the first pixel during a second time period to generate the second pixel signal, and apply the third control signal to the first pixel during a third time period to generate the third pixel signal.

(4) The imaging device of one or more of (1) to (3), wherein the control signals include a fourth control signal, wherein the signal processor is configured to apply the fourth control signal to the first pixel during a fourth time period.

(5) The imaging device of one or more of (1) to (4), wherein the plurality of pixels includes first, second, and third pixels, and wherein the signal processor is configured to apply the first control signal to the first pixel during a first time period to generate the first pixel signal, apply the second control signal to the second pixel during the first time period to generate the second pixel signal, and apply the third control signal to the third pixel during the first time period to generate the third pixel signal.

(6) The imaging device of one or more of (1) to (5), wherein the control signals include a fourth control signal, wherein the plurality of pixels includes a fourth pixel, and wherein the signal processor is configured to apply the fourth control signal to the fourth pixel during the first time period to generate a fourth pixel signal.

(7) The imaging device of one or more of (1) to (6), wherein the signal processor is configured to calculate the distance to the object based on differences between the first, second, and third pixel signals.

(8) The imaging device of one or more of (1) to (7), wherein the differences include a difference between the first pixel signal and the second pixel signal, a difference between the second pixel signal and the third pixel signal, and a difference between the third pixel signal and the first pixel signal.

(9) The imaging device of one or more of (1) to (8), wherein the signal processor is configured to determine a region in which the object is located based on signs of the differences.

(10) The imaging device of one or more of (1) to (9), wherein the signal processor is configured to calculate the distance to the object using an equation that is associated with the determined region.

(11) The imaging device of one or more of (1) to (10), wherein the signal processor is configured to:
apply the control signals to the pixel section generate the first pixel signal, the second pixel, and the third pixel signal, and a fourth pixel signal based on the light reflected from the object; and
calculate the distance to the object based on the first pixel signal, the second pixel signal, the third pixel signal, and the fourth pixel signal.

(12) The imaging device of one or more of (1) to (11), wherein the signal processor is configured to calculate the distance to the object based on differences between the first, second, third pixel, and fourth signals.

(13) The imaging device of one or more of (1) to (12), wherein the differences include a difference between the first pixel signal and the second pixel signal, a difference between the first pixel signal and the third pixel signal, a difference between the first pixel signal and the fourth pixel signal, a difference between the second pixel signal and the third pixel signal, a difference between the second pixel signal and the fourth pixel signal, and a difference between the third pixel signal and the fourth pixel signal.

(14) The imaging device of one or more of (1) to (13), wherein the signal processor is configured to determine a region from among a plurality of regions in which the object is located based on the differences.

(15) The imaging device of one or more of (1) to (14), wherein the signal processor is configured to calculate the distance to the object using an equation that is associated with the determined region.

(16) The imaging device of one or more of (1) to (15), wherein a number of the plurality of regions is equal to twelve.

(17) An imaging device, comprising:
 a pixel section including a plurality of pixels; and
 a signal processor configured to:
 apply binary control signals to the pixel section according to a coding scheme to generate pixel signals based on light reflected from an object; and
 calculate a distance to the object based on differences between the pixel signals.

(18) The imaging device of (17), wherein the binary control signals include first, second, and third control signals, and wherein the pixel signals include first, second, and third pixel signals.

(19) The imaging device of one or more of (17) to (18), wherein the binary control signals include first, second, third, and fourth control signals, and wherein the pixel signals include first, second, third, and fourth pixel signals.

(20) A system, comprising:
 a light source configured to emit modulated light; and
 an imaging device, including:
 a pixel section including a plurality of pixels; and
 a signal processor configured to:
 apply binary control signals to the pixel section according to a Gray code coding scheme to generate pixel signals based on the modulated light reflected from an object; and
 calculate a distance to the object based on differences between the pixel signals.

(21) An imaging device, comprising:
 a pixel; and
 a signal processor configured to:
 apply a first set of control signals to the pixel to generate a first pixel signal, a second pixel signal, a third pixel signal, and a fourth pixel signal based on light reflected from an object;
 apply a second set of control signals to the pixel to generate a fifth pixel signal, a sixth pixel signal, a seventh pixel signal, and an eighth pixel signal based on the light reflected from the object; and
 calculate a distance to the object based on comparisons between selected ones of the first, second, third, fourth, fifth, sixth, seventh, and eighth pixel signals.

(22) The imaging device of (21), wherein the first set of control signals include first, second, third, and fourth control signals that generate the first, second, third, and fourth pixel signals, respectively, and wherein the second set of control signals include fifth, sixth, seventh, and eighth control signals that generate the fifth, sixth, seventh, and eighth pixel signals, respectively.

(23) The imaging device of one or more of (21) to (22), wherein the fifth, sixth, seventh, and eighth control signals are opposite in polarity to the first, second, third, and fourth control signals, respectively.

(24) The imaging device of one or more of (21) to (23), wherein the first set of control signals and the second set of control signals adhere to a Gray code coding scheme.

(25) The imaging device of one or more of (21) to (24), wherein the signal processor is configured to determine a first region from among a first set of regions in which the object resides based on the comparisons.

(26) The imaging device of one or more of (21) to (25), wherein the comparisons include a first comparison between the first pixel signal and the fifth pixel signal, a second comparison between the second pixel signal and the sixth pixel signal, a third comparison between the third pixel signal and the seventh pixel signal, and a fourth comparison between the fourth pixel signal and the eighth pixel signal.

(27) The imaging device of one or more of (21) to (26), wherein the signal processor is configured to define a first function for a second region in the first set of regions that neighbors the first region, and define a second function for a third region in the first set of regions that neighbors the first region.

(28) The imaging device of one or more of (21) to (27), wherein the first function and the second function each include an ambient value that is based on selected ones of the first through eighth pixel signals.

(29) The imaging device of one or more of (21) to (28), wherein the ambient value for the first function is calculated based on a first equation associated with the second region, and the ambient value for the second function is calculated based on a second equation associated with the third region.

(30) The imaging device of one or more of (21) to (29), wherein the defined first and second functions include values of selected ones of the first through eighth pixel signals.

(31) The imaging device of one or more of (21) to (30), wherein the signal processor is configured to calculate the distance to the object based on an equation that uses the first function and the second function.

(32) The imaging device of one or more of (21) to (31), wherein the signal processor is configured to compare the first function to the second function, and determine a region in a second set of regions in which the object resides based on the comparison of the first function to the second function.

(33) The imaging device of one or more of (21) to (32), wherein the first set of regions and the second set of regions represent sub-ranges within a maximum range of the imaging device.

(34) The imaging device of one or more of (21) to (33), wherein the first set of regions is offset from the second set of regions within the maximum range.

(35) The imaging device of one or more of (21) to (34), wherein a number regions in each of the first set of regions and the second set of regions is equal to twelve.

(36) The imaging device of one or more of (21) to (35), wherein the signal processor is configured to calculate the distance to the object using an equation associated with the determined region in the second set of regions.

(37) An imaging device, comprising:
 a pixel; and
 a signal processor configured to:
 apply a first set of control signals to the pixel to generate a first pixel signal, a second pixel signal, a third pixel signal, and a fourth pixel signal, based on light reflected from an object;
 apply a second set of control signals to the pixel to generate a fifth pixel signal, a sixth pixel signal, a seventh pixel signal, and an eighth pixel signal based on the light reflected from the object; and calculate a first distance to the object using a first method;
calculate a second distance to the object using a second method different than the first method; and
determine a final distance to the object based on the first distance and the second distance.

(38) The imaging device of (37), wherein the first method includes determining a region from among a first set of regions in which the object is located, wherein the second method includes determining a region from among a second set of regions in which the object is located, wherein the signal processor determines the final distance from the first distance and the second distance.

(39) The imaging device of one or more of (37) to (38), wherein the signal processor determines the final distance as the first distance when the second distance is within a first threshold distance of a border of the region in the second set of regions, wherein the signal processor determines the final distance as the second distance when the first distance is within a second threshold distance of a border of the region in the first set of regions, and wherein the signal processor is configured to determine the final distance as a weighted average of the first distance and the second distance when the first distance is not within the first threshold distance of the border of the region in the first set of regions, and the second distance is not within the second threshold distance of the border of the region in the second set of regions.

(40) A system, comprising:
a light source configured to emit modulated light; and
an imaging device, including:
a pixel; and
a signal processor configured to:
apply a first set of control signals to the pixel to generate a first pixel signal, a second pixel signal, a third pixel signal, and a fourth pixel signal based on the modulated light reflected from an object;
apply a second set of control signals to the pixel to generate a fifth pixel signal, a sixth pixel signal, a seventh pixel signal, and an eighth pixel signal based on the modulated light reflected from the object; and
calculate a distance to the object based on comparisons between selected ones of the first, second, third, fourth, fifth, sixth, seventh, and eighth pixel signals.

(41) An imaging device, comprising:
a pixel; and
a signal processor configured to:
randomly apply a first set of signals including a first driving signal applied to a first light source, and a first set of control signals applied to the pixel that adhere to a quasi-Gray code scheme to generate first through eighth correlation signals based on light output from the first light source according to the first driving signal and reflected from an object;
randomly apply a second set of signals including a second driving signal applied to the first light source, and a second set of control signals applied to the pixel that adhere to the quasi-Gray code scheme to generate ninth through sixteenth correlation signals based on light output from the first light source according to the second driving signal and reflected from the object;
measure first through eighth pixel signals based on the first through sixteenth correlation signals;
calculate a distance to the object based on the first through eighth pixel signals.

(42) The imaging device of (41), wherein the signal processor is configured to randomly apply the first set of signals and the second set of signals by:

generating a random sequence of binary bit values;
applying a pre-determined number of cycles of the first light signal and the first set of control signals when a bit of the binary random sequence equals a first value; and
applying a pre-determined number of cycles of the second light signal and the second set of control signals when a bit of the binary random sequence equals a second value.

(43) The imaging device of one or more of (41) to (42), wherein the second driving signal s' and the second set of control signals ci' are related to the first driving signal s and the first set of control signals ci' by the relationship cor(s, ci, $\tau$)=cor(s', ci', $\tau$)=K−cor(s, ci', $\tau$)=K−cor(s', ci, $\tau$), where K is a constant representing a peak value of a correlation between s and ci, and $\tau$ is a time delay between a time light is output from the first light source and a time reflected light is received.

(44) The imaging device of one or more of (41) to (43), wherein the first set of control signals include first through fourth control signals that generate the first through eighth correlation signals, respectively, and wherein the second set of controls signals include fifth through eighth control signals that generate the ninth through sixteenth correlation signals, respectively.

(45) The imaging device of one or more of (41) to (44), wherein the signal processor is configured to determine a first region from among a first set of regions in which the object resides based on comparisons between selected ones of the first through eighth pixel signals.

(46) The imaging device of one or more of (41) to (45), wherein the comparisons include a first comparison between the first pixel signal and the fifth pixel signal, a second comparison between the second pixel signal and the sixth pixel signal, a third comparison between the third pixel signal and the seventh pixel signal, and a fourth comparison between the fourth pixel signal and the eighth pixel signal.

(47) The imaging device of one or more of (41) to (46), wherein the signal processor is configured to define a first function for a second region in the first set of regions that neighbors the first region, and define a second function for a third region in the first set of regions that neighbors the first region.

(48) The imaging device of one or more of (41) to (47), wherein the first function and the second function each include an ambient value that is based on selected ones of the first through eighth pixel signals.

(49) The imaging device of one or more of (41) to (48), wherein the ambient value for the first function is calculated based on a first equation associated with the second region, and the ambient value for the second function is calculated based on a second equation associated with the third region.

(50) The imaging device of one or more of (41) to (49), wherein the defined first and second functions include selected ones of the first through eighth pixel signals.

(51) The imaging device of one or more of (41) to (50), wherein the signal processor is configured to calculate the distance to the object based on an equation that uses the first function and the second function.

(52) The imaging device of one or more of (41) to (51), wherein the signal processor is configured to compare the first function to the second function, and determine a region in a second set of regions in which the object resides based on the comparison of the first function to the second function.

(53) The imaging device of one or more of (41) to (52), wherein the first set of regions and the second set of regions represent sub-ranges within a maximum range of the imaging device.

(54) The imaging device of one or more of (41) to (53), wherein the first set of regions is offset from the second set of regions within the maximum range.

(55) The imaging device of one or more of (41) to (54), wherein a number regions in each of the first set of regions and the second set of regions is equal to twelve.

(56) The imaging device of one or more of (41) to (55), wherein the signal processor is configured to calculate the distance to the object using an equation associated with the determined region in the second set of regions.

(57) A system, comprising:
a first light source;
a second light source;
a first imaging device including:
a first pixel; and
a first signal processor configured to:
randomly apply a first set of signals including a first driving signal applied to the first light source, and a first set of control signals applied to the first pixel that adhere to a quasi-Gray code scheme to generate a first group of correlation signals based on light output from the first light source according to the first driving signal and reflected from an object;
randomly apply a second set of signals including a second driving signal applied to the first light source, and a second set of control signals applied to the first pixel that adhere to the quasi-Gray code scheme to generate a second group of correlation signals based on light output from the first light source according to the second driving signal and reflected from the object;
measure a first group of pixel signals based on the first and second groups of correlation signals; and
calculate a distance to the object based on the first group of pixel signals; and
a second imaging device including:
a second pixel; and
a second signal processor configured to:
randomly apply a third set of signals including a third driving signal applied to the second light source, and a third set of control signals applied to the second pixel that adhere to the quasi-Gray code scheme to generate a third group of correlation signals based on light output from the second light source according to the third driving signal and reflected from the object;
randomly apply a fourth set of signals including a fourth driving signal applied to the second light source, and a fourth set of control signals applied to the second pixel that adhere to the quasi-Gray code scheme to generate a fourth group of correlation signals based on light output from the second light source according to the fourth driving signal and reflected from the object;
measure a second group of pixel signals based on the third and fourth groups of correlation signals; and
calculate a distance to the object based on the second group of pixel signals.

(58) The system of (57), wherein the first set of control signals include first, second, third, and fourth control signals that generate the first group of correlation signals, wherein the second set of control signals include fifth, sixth, seventh, and eighth control signals that generate the second group of correlation signals.

(59) The system of one or more of (57) to (58), wherein waveforms of the first set of control signals and the third set of control signals are the same, and wherein waveforms of the second set of control signals and the fourth set of control signals are the same.

(60) A system, comprising:
a first light source;
a second light source;
a first imaging device to determine a first distance to a first object by:
randomly applying a first set of control signals and a second set of control signals that adhere to a quasi-Gray code scheme; and
calculating the first distance to the first object from a first group of pixel signals measured from the first imaging device according to the first and second sets of control signals; and
a second imaging device to determine a second distance to a second object by:
randomly applying a third set of control signals and a fourth set of control signals that adhere to the quasi-Gray code scheme; and
calculating the second distance to the second object based on a second group of pixel signals measured from the second imaging device according to the third and fourth sets of control signals.

Any one or more of the aspects/embodiments as substantially disclosed herein.

Any one or more of the aspects/embodiments as substantially disclosed herein optionally in combination with any one or more other aspects/embodiments as substantially disclosed herein. One or more means adapted to perform any one or more of the above aspects/embodiments as substantially disclosed herein.

It is claimed:

1. An imaging device, comprising:
a pixel section including a plurality of pixels; and
a signal processor configured to:
apply control signals to the pixel section according to a Gray code coding scheme to generate a first pixel signal, a second pixel signal, and a third pixel signal based on light reflected from an object; and
calculate a distance to the object based on the first pixel signal, the second pixel signal, and the third pixel signal by:
determining a region, from among a plurality of regions, in which the object is located based on differences, the differences including differences between the first pixel signal, the second pixel signal, and the third pixel signal; and
calculating the distance to the object using an equation that is associated with the determined region, wherein each region of the plurality of regions is associated with a different equation.

2. The imaging device of claim 1, wherein the control signals include first, second, and third control signals.

3. The imaging device of claim 2, wherein the signal processor is configured to apply the first control signal to a first pixel of the plurality of pixels during a first time period to generate the first pixel signal, apply the second control signal to the first pixel during a second time period to generate the second pixel signal, and apply the third control signal to the first pixel during a third time period to generate the third pixel signal.

4. The imaging device of claim 3, wherein the control signals include a fourth control signal, wherein the signal processor is configured to apply the fourth control signal to the first pixel during a fourth time period.

5. The imaging device of claim 2, wherein the plurality of pixels includes first, second, and third pixels, and wherein the signal processor is configured to apply the first control signal to the first pixel during a first time period to generate the first pixel signal, apply the second control signal to the second pixel during the first time period to generate the second pixel signal, and apply the third control signal to the third pixel during the first time period to generate the third pixel signal.

6. The imaging device of claim 5, wherein the control signals include a fourth control signal, wherein the plurality of pixels includes a fourth pixel, and wherein the signal processor is configured to apply the fourth control signal to the fourth pixel during the first time period to generate a fourth pixel signal.

7. The imaging device of claim 1, wherein the differences include a difference between the first pixel signal and the second pixel signal, a difference between the second pixel signal and the third pixel signal, and a difference between the third pixel signal and the first pixel signal.

8. The imaging device of claim 1, wherein the signal processor is configured to determine the region in which the object is located based on signs of the differences.

9. The imaging device of claim 1, wherein the signal processor is configured to:
apply the control signals to the pixel section generate the first pixel signal, the second pixel signal, the third pixel signal, and a fourth pixel signal based on the light reflected from the object, wherein the differences include differences between the first pixel signal, the second pixel signal, the third pixel signal, and the fourth pixel signal.

10. The imaging device of claim 9, wherein the differences include a difference between the first pixel signal and the second pixel signal, a difference between the first pixel signal and the third pixel signal, a difference between the first pixel signal and the fourth pixel signal, a difference between the second pixel signal and the third pixel signal, a difference between the second pixel signal and the fourth pixel signal, and a difference between the third pixel signal and the fourth pixel signal.

11. The imaging device of claim 1, wherein a number of the plurality of regions is equal to twelve.

12. An imaging device, comprising:
a pixel section including a plurality of pixels; and
a signal processor configured to:
apply binary control signals to the pixel section according to a coding scheme to generate pixel signals based on light reflected from an object; and
calculate a distance to the object based on differences between the pixel signals by:
determining a region, from among a plurality of regions, in which the object is located based on the differences between the pixel signals; and
calculating the distance to the object using an equation that is associated with the determined region, wherein each region of the plurality of regions is associated with a different equation.

13. The imaging device of claim 12, wherein the binary control signals include first, second, and third control signals, and wherein the pixel signals include first, second, and third pixel signals.

14. The imaging device of claim 12, wherein the binary control signals include first, second, third, and fourth control signals, and wherein the pixel signals include first, second, third, and fourth pixel signals.

15. A system, comprising:
a light source configured to emit modulated light; and
an imaging device, including:
a pixel section including a plurality of pixels; and
a signal processor configured to:
apply binary control signals to the pixel section according to a Gray code coding scheme to generate pixel signals based on the modulated light reflected from an object; and
calculate a distance to the object based on differences between the pixel signals by:
determining a region, from among a plurality of regions, in which the object is located based on the differences between the pixel signals; and
calculating the distance to the object using an equation that is associated with the determined region, wherein each region of the plurality of regions is associated with a different equation.

* * * * *